United States Patent
Richardson et al.

(10) Patent No.: US 12,526,272 B2
(45) Date of Patent: Jan. 13, 2026

(54) METHOD AND SYSTEM FOR VERIFICATION OF IDENTIFY OF A USER

(71) Applicant: Bankvault Pty Ltd, West Perth (AU)

(72) Inventors: Neil Richardson, West Perth (AU); Graeme Speak, West Perth (AU)

(73) Assignee: Bankvault Pty Ltd, West Perth (AU)

( * ) Notice: Subject to any disclaimer, the term of this patent is extended or adjusted under 35 U.S.C. 154(b) by 145 days.

(21) Appl. No.: 18/014,011

(22) PCT Filed: Jul. 5, 2021

(86) PCT No.: PCT/AU2021/050717
§ 371 (c)(1),
(2) Date: Dec. 30, 2022

(87) PCT Pub. No.: WO2022/000048
PCT Pub. Date: Jan. 6, 2022

(65) Prior Publication Data
US 2024/0089249 A1 Mar. 14, 2024

(30) Foreign Application Priority Data
Jul. 3, 2020 (AU) ................................ 2020902292

(51) Int. Cl.
*H04L 29/06* (2006.01)
*H04L 9/08* (2006.01)
(Continued)

(52) U.S. Cl.
CPC .......... *H04L 63/083* (2013.01); *H04L 9/0869* (2013.01); *H04L 9/3236* (2013.01); *H04L 63/0428* (2013.01)

(58) Field of Classification Search
CPC ... H04L 63/083; H04L 9/0869; H04L 9/3236; H04L 63/0428; H04L 9/3226; H04L 63/08; G06F 21/31; H04W 12/068
See application file for complete search history.

(56) References Cited

U.S. PATENT DOCUMENTS 6,751,736 B1 * 6/2004 Bowman ............... H04L 9/0866
713/176
8,095,786 B1 * 1/2012 Kshirsagar .......... H04L 63/0272
713/151

(Continued)

FOREIGN PATENT DOCUMENTS

EP 3407565 B1 12/2019

*Primary Examiner* — Shawnchoy Rahman
(74) *Attorney, Agent, or Firm* — patenttm.us

(57) ABSTRACT

A computer implemented method of providing identification to one of many online services, and a system comprises an interface system and an identifier manager. The interface system is configured to provide a secret identifier to a requesting one of the online services in a session. The secret identifier is received from the identifier manager. The secret identifier is stored in the identifier manager. The session in which the secret identifier is provided to the online service is identified by a session identifier provided from the online service to a device which the online service is to be provided. The session identifier is then provided to the identifier manager. The session identifier is then provided to the interface system. The session identifier is then provided to the online service so that interactions are allocated to the session.

24 Claims, 32 Drawing Sheets

(51) Int. Cl.
*H04L 9/32* (2006.01)
*H04L 9/40* (2022.01)

(56) References Cited

U.S. PATENT DOCUMENTS

| | | | |
|---|---|---|---|
| 8,850,546 B1* | 9/2014 | Field | H04L 63/102 |
| | | | 726/8 |
| 11,076,001 B1* | 7/2021 | Mohamed | H04L 47/803 |
| 2003/0200334 A1* | 10/2003 | Grynberg | H04L 51/48 |
| | | | 709/206 |
| 2008/0177812 A1* | 7/2008 | Brandle | H04L 9/0643 |
| | | | 708/250 |
| 2009/0313349 A1* | 12/2009 | Jeong | H04L 63/10 |
| | | | 709/217 |
| 2012/0265981 A1 | 10/2012 | Moon et al. | |
| 2013/0212666 A1* | 8/2013 | Mattsson | G06Q 20/385 |
| | | | 726/9 |
| 2013/0254858 A1 | 9/2013 | Giardina et al. | |
| 2013/0262858 A1 | 10/2013 | Neuman | |
| 2014/0040628 A1 | 2/2014 | Fort et al. | |
| 2014/0096220 A1 | 4/2014 | Da Cruz Pinto | |
| 2016/0308678 A1 | 10/2016 | Bhatnagar | |
| 2017/0244676 A1 | 8/2017 | Edwards | |

* cited by examiner

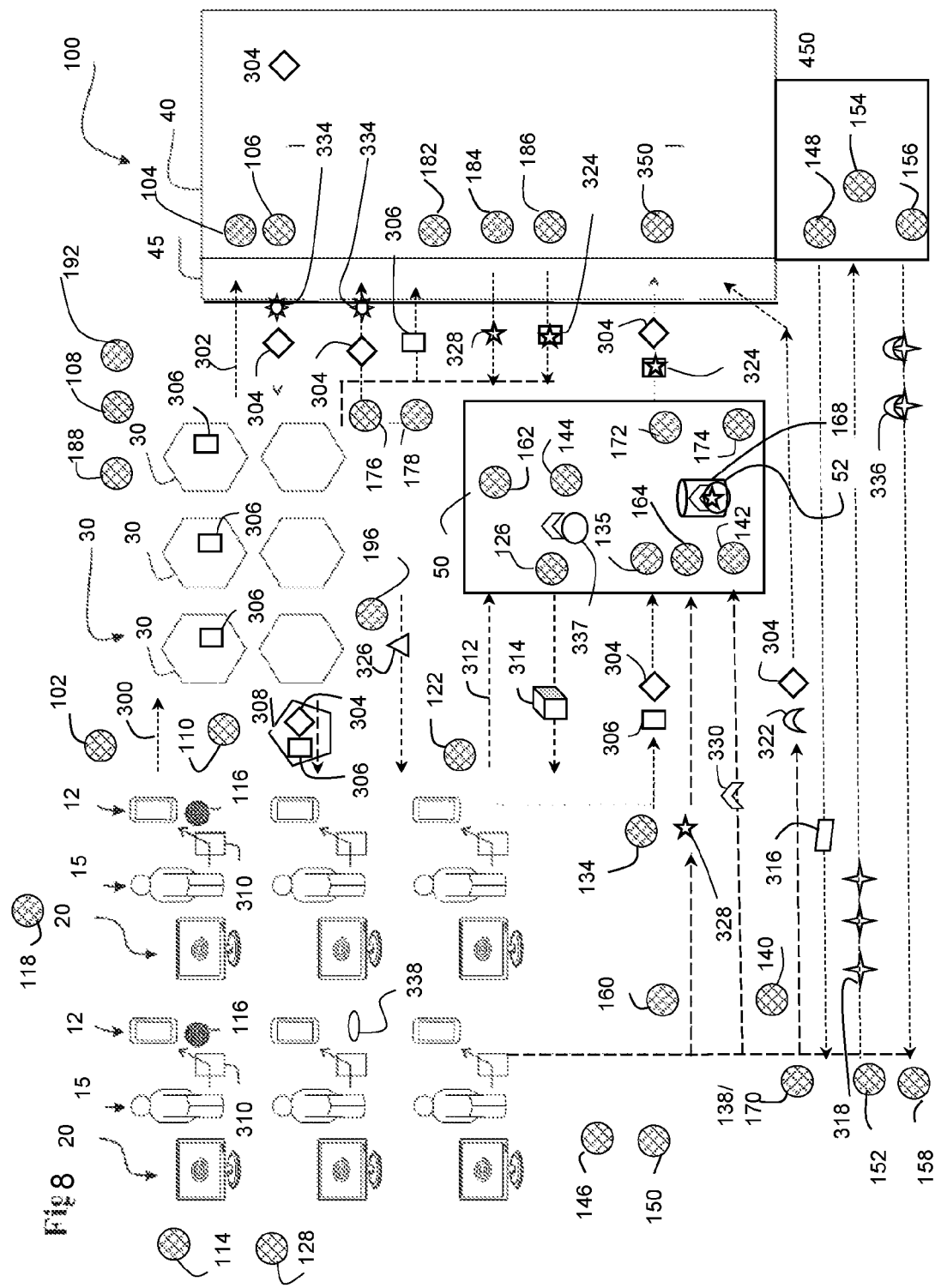

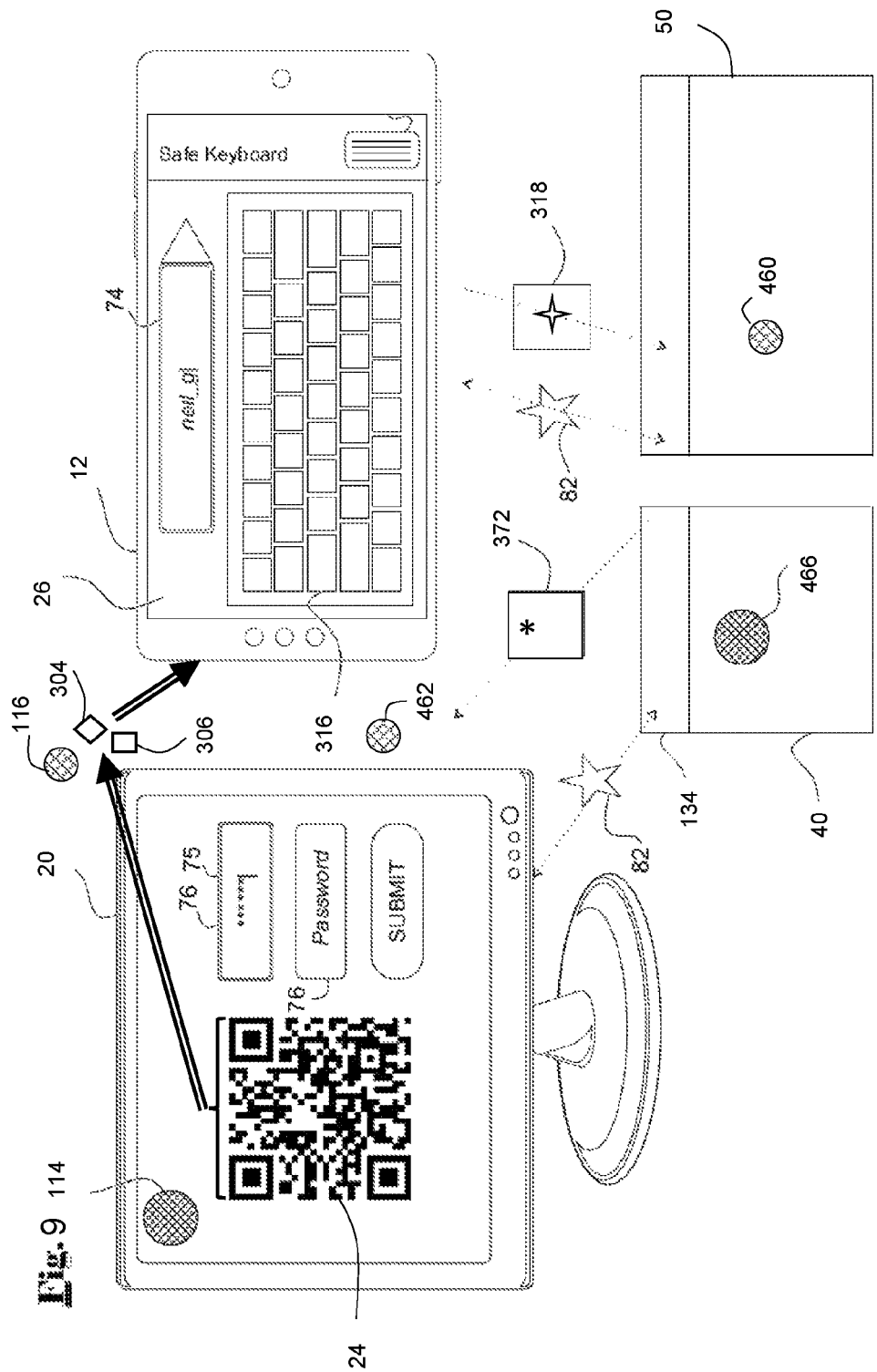

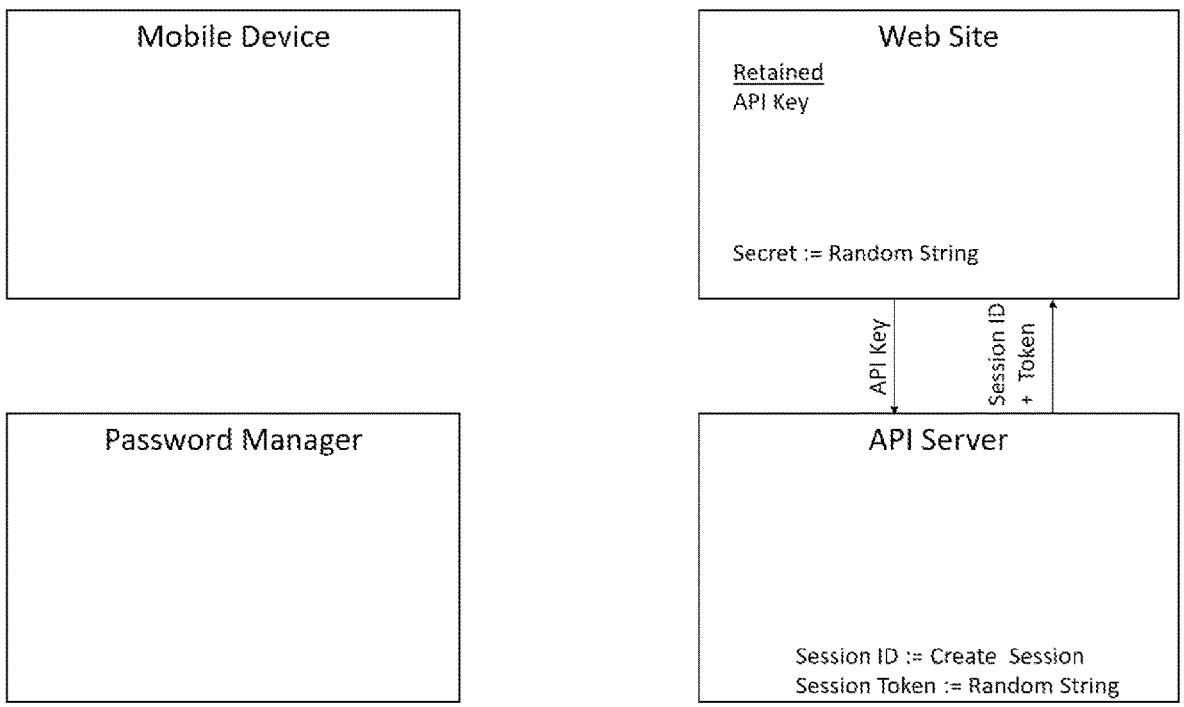
FIG. 13
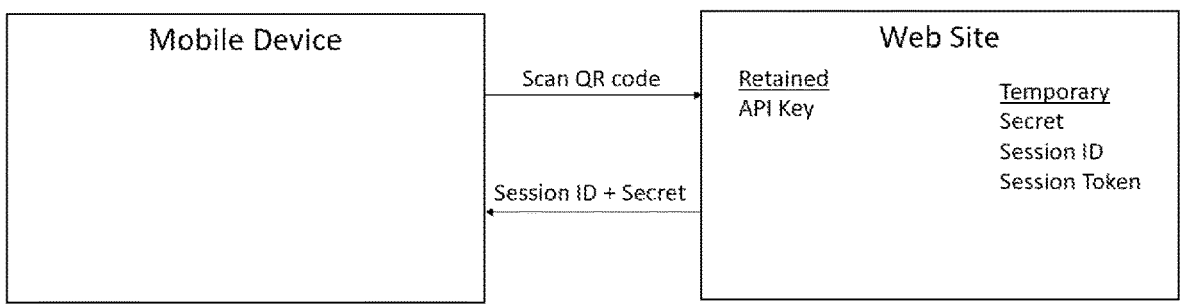
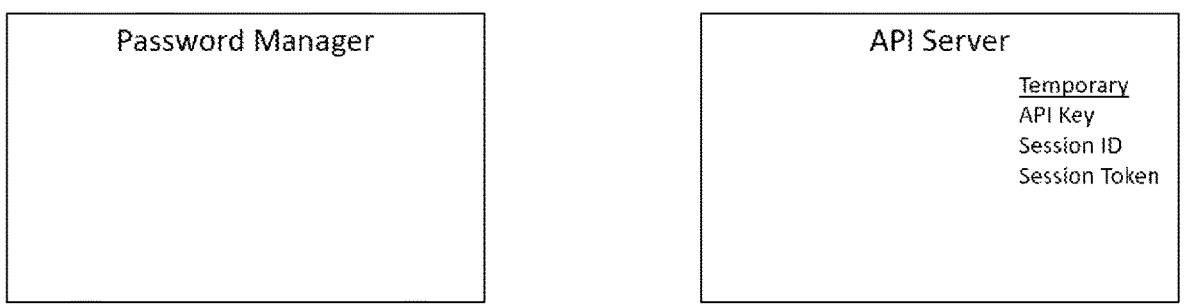
FIG 14

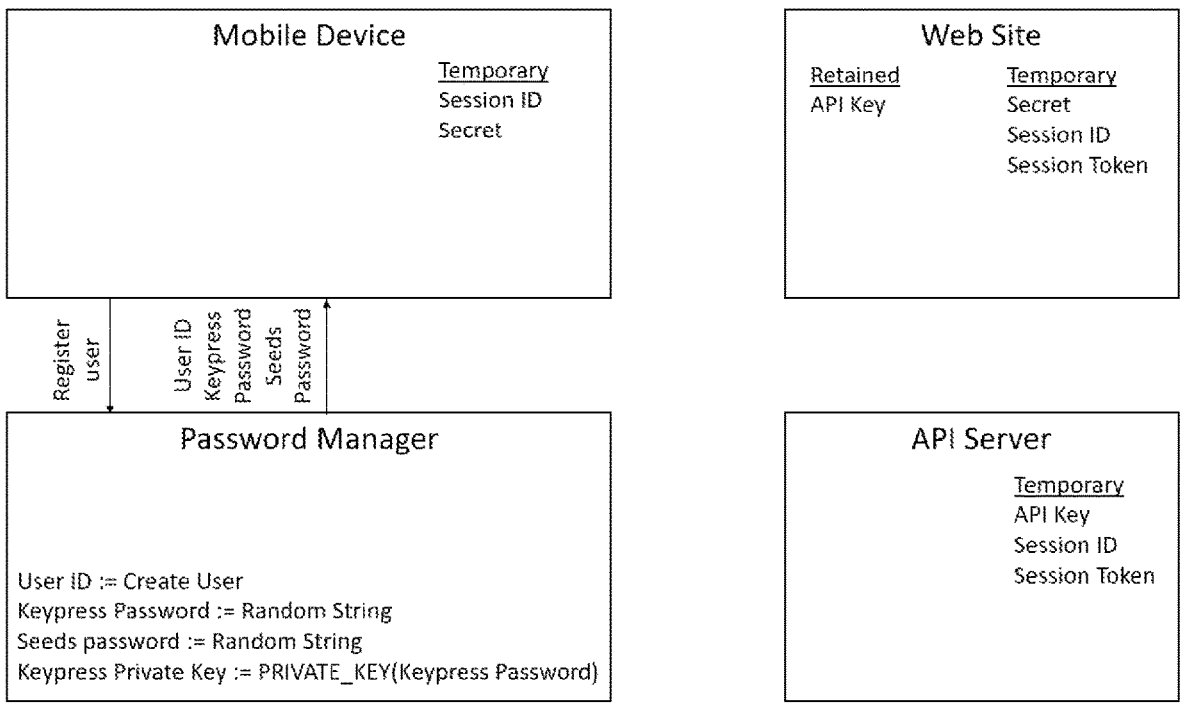
FIG 15
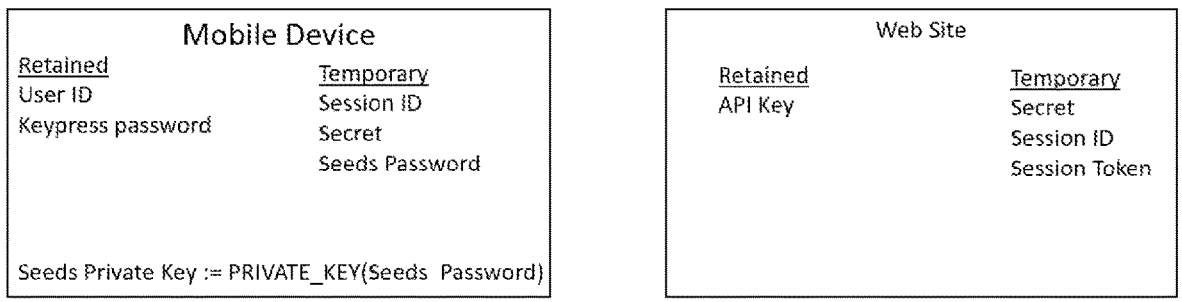
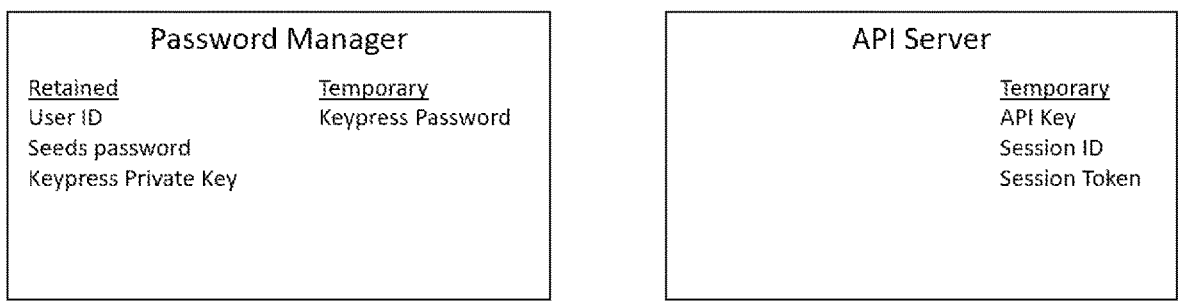
FIG 16

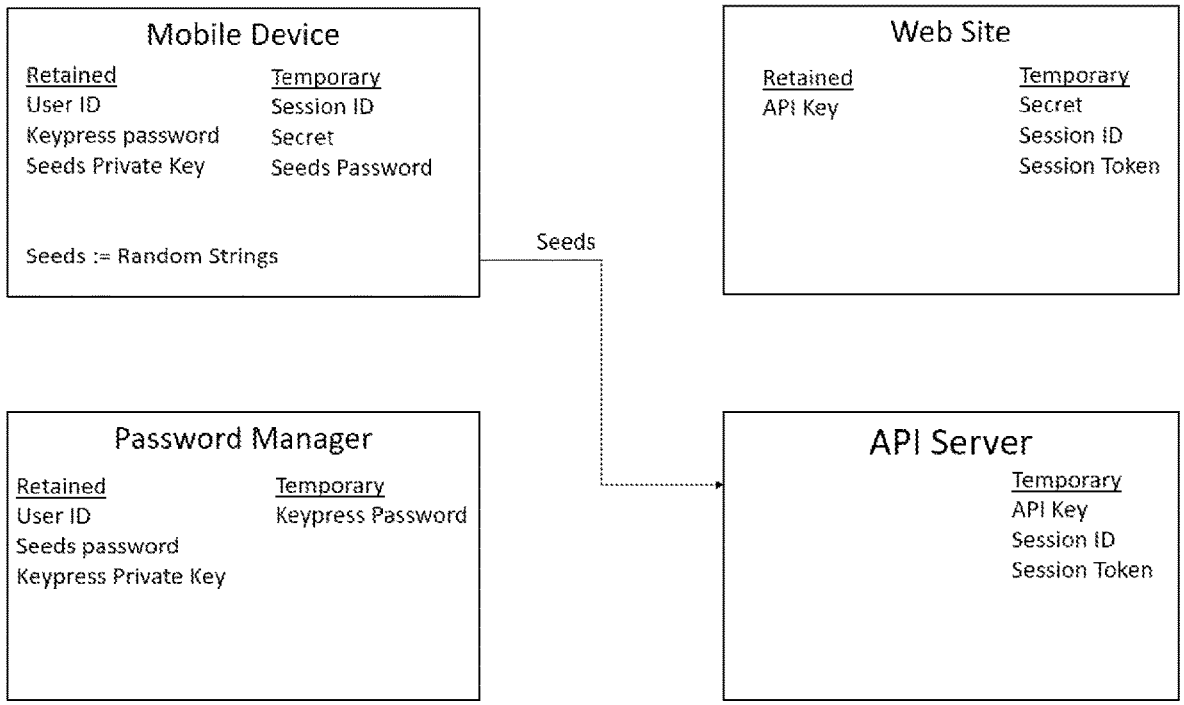
FIG 17
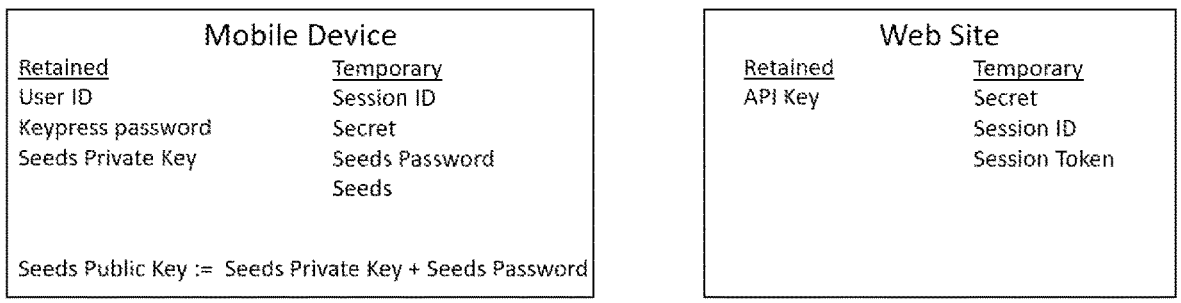
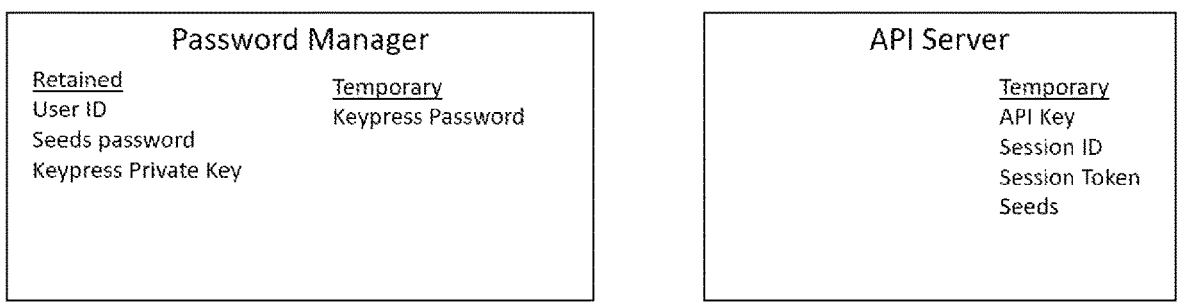
FIG 18

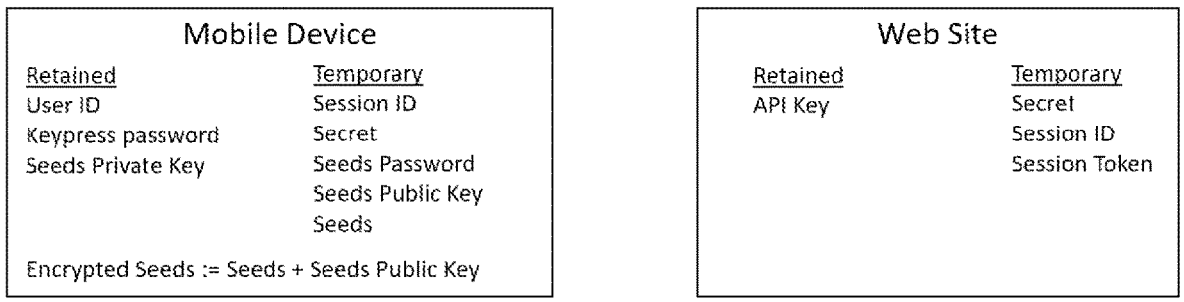
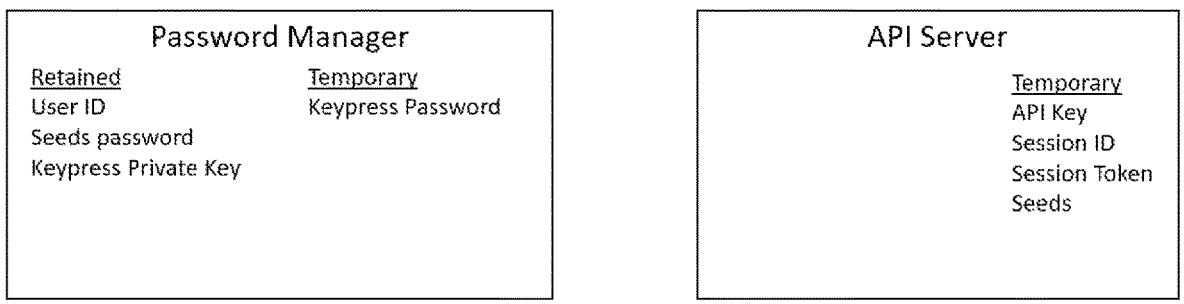
FIG 19
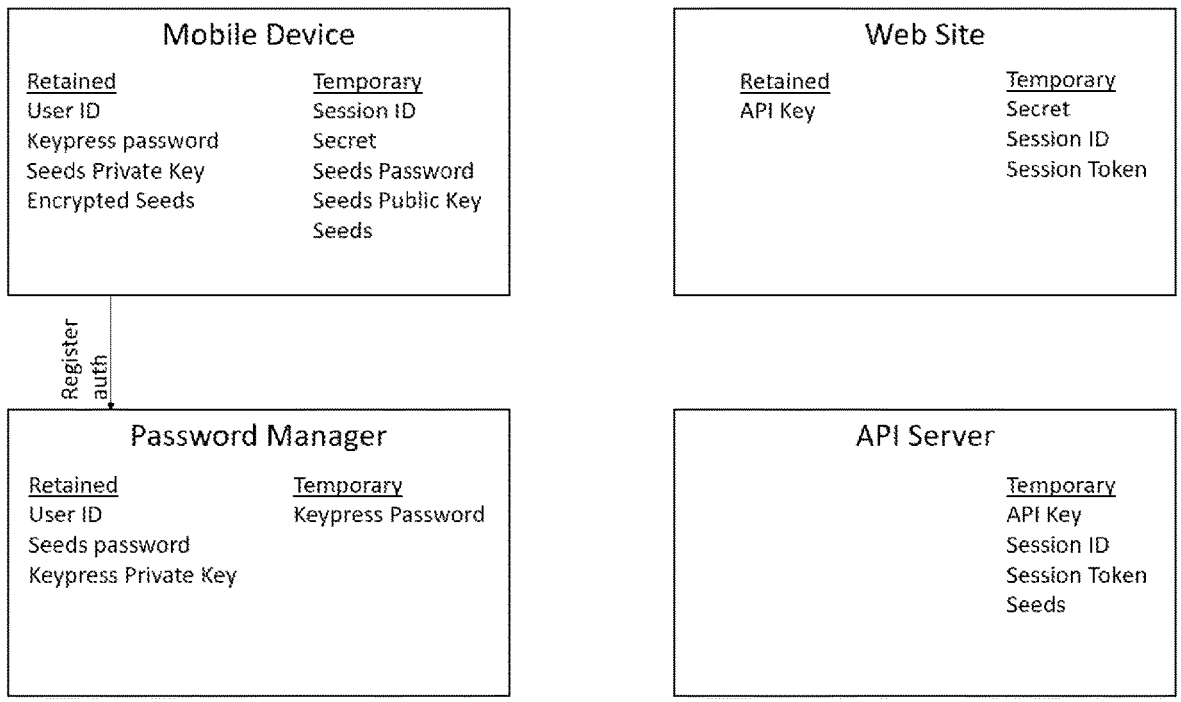
FIG 20

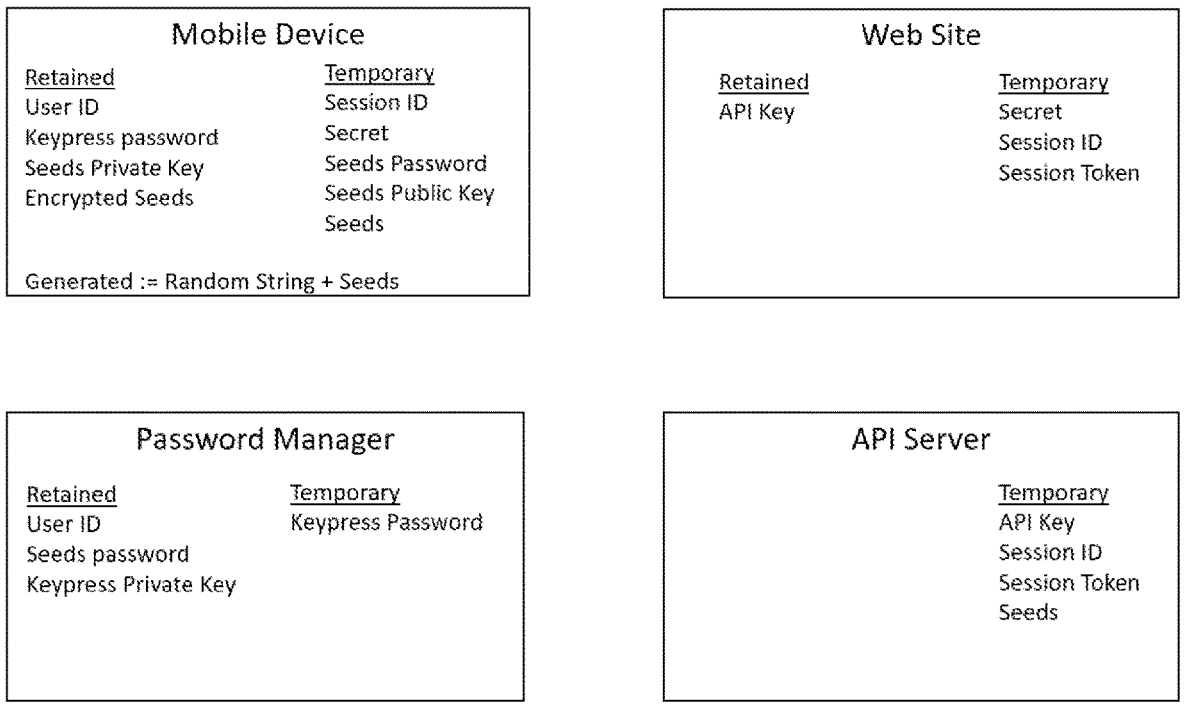
FIG 21
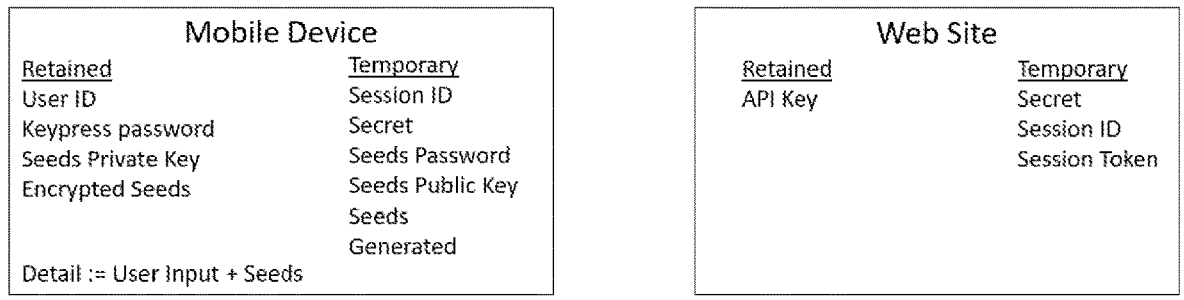
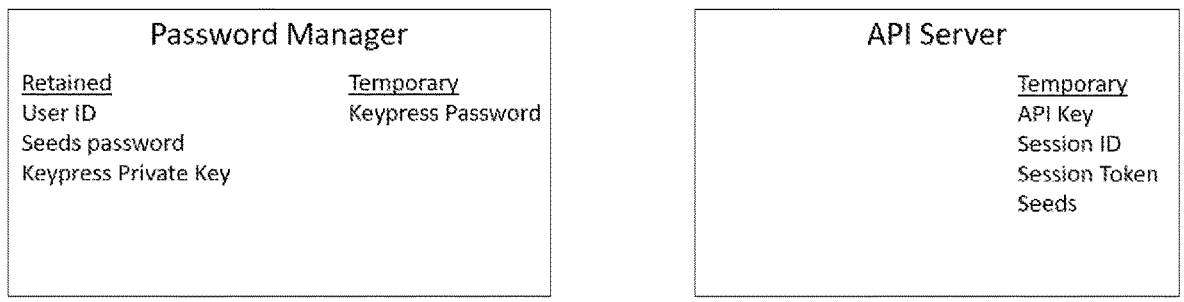
FIG 22

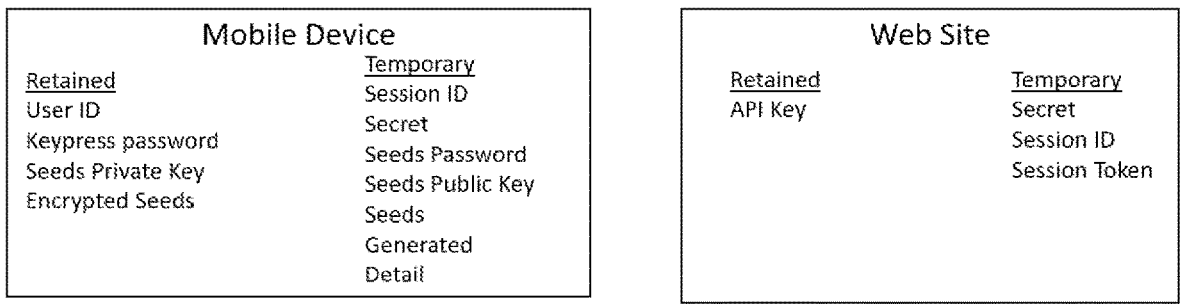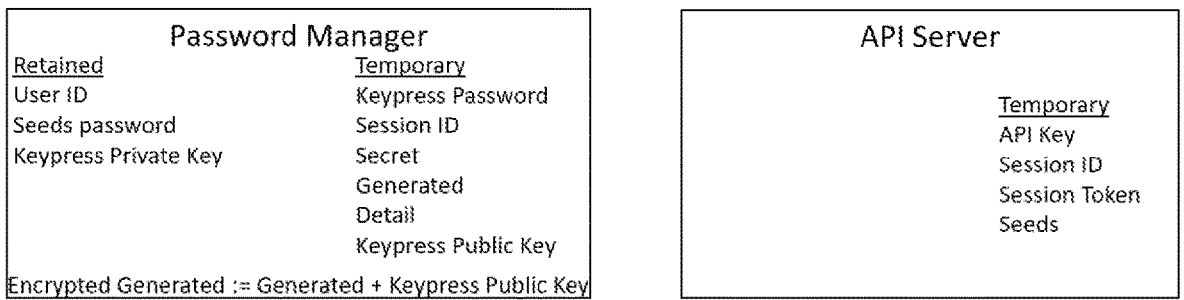
FIG 25
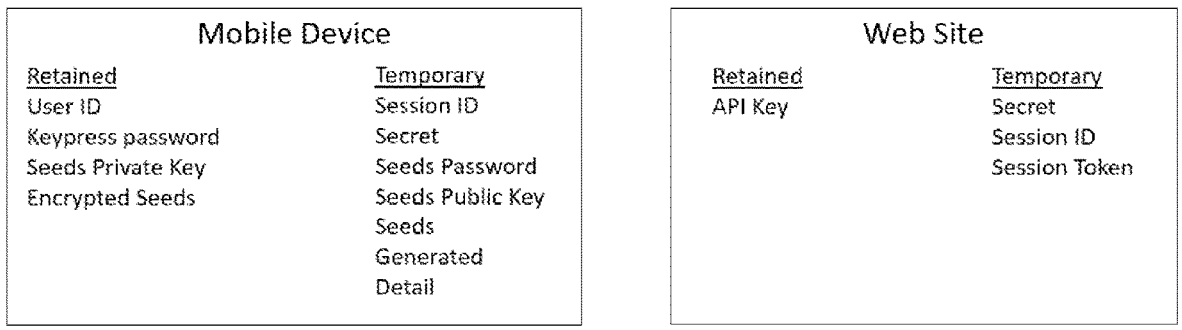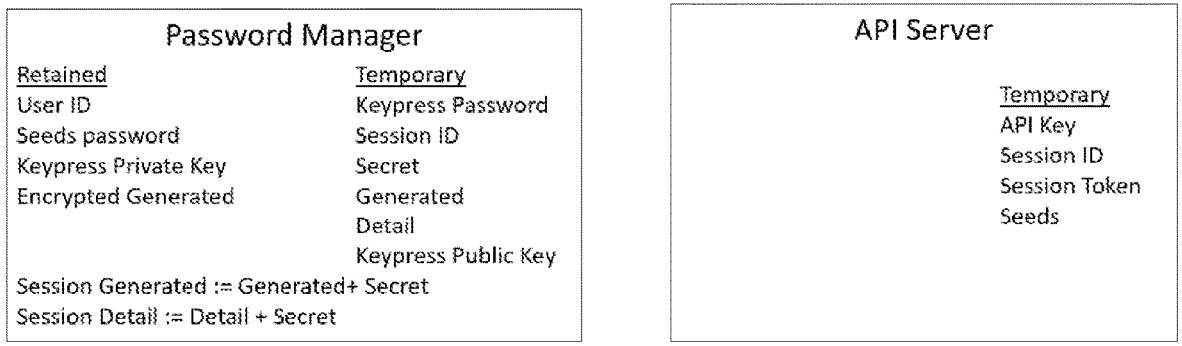
FIG 26

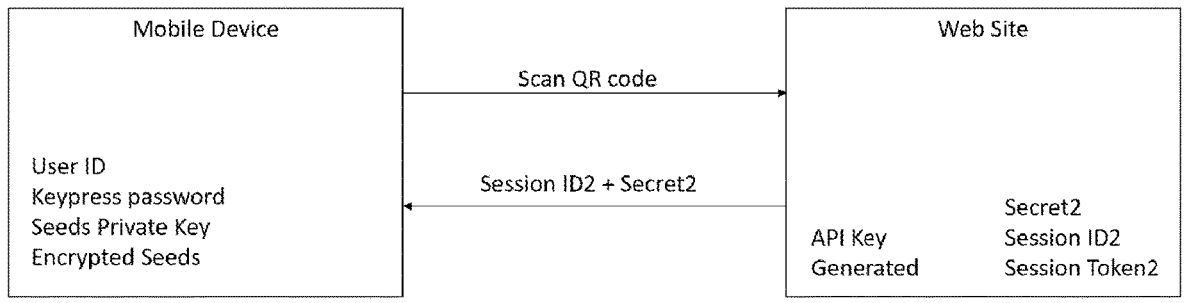
FIG 37
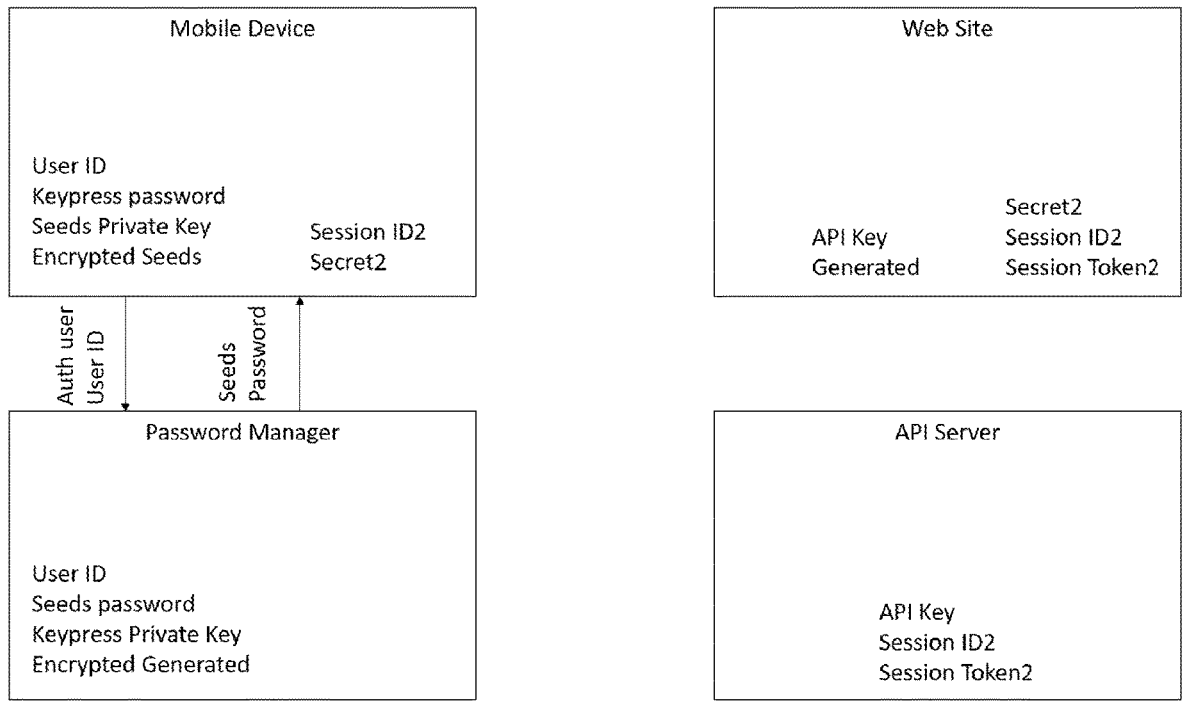
FIG 38

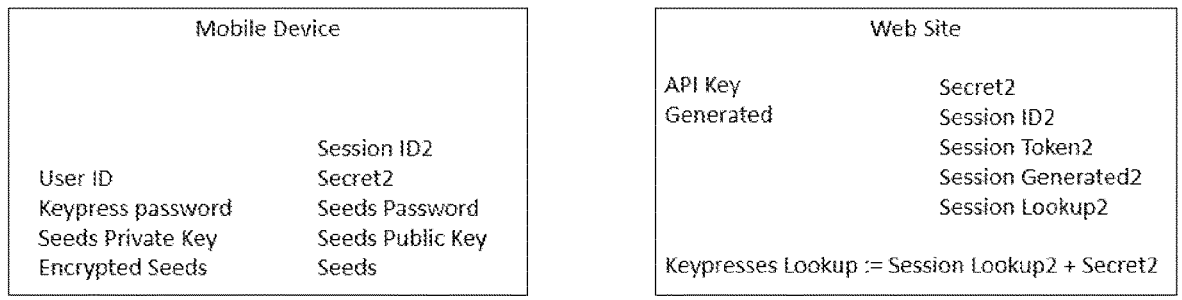
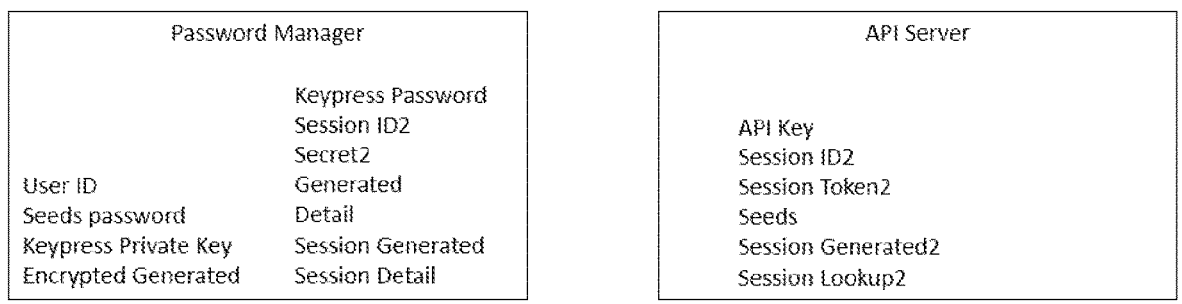
FIG 47
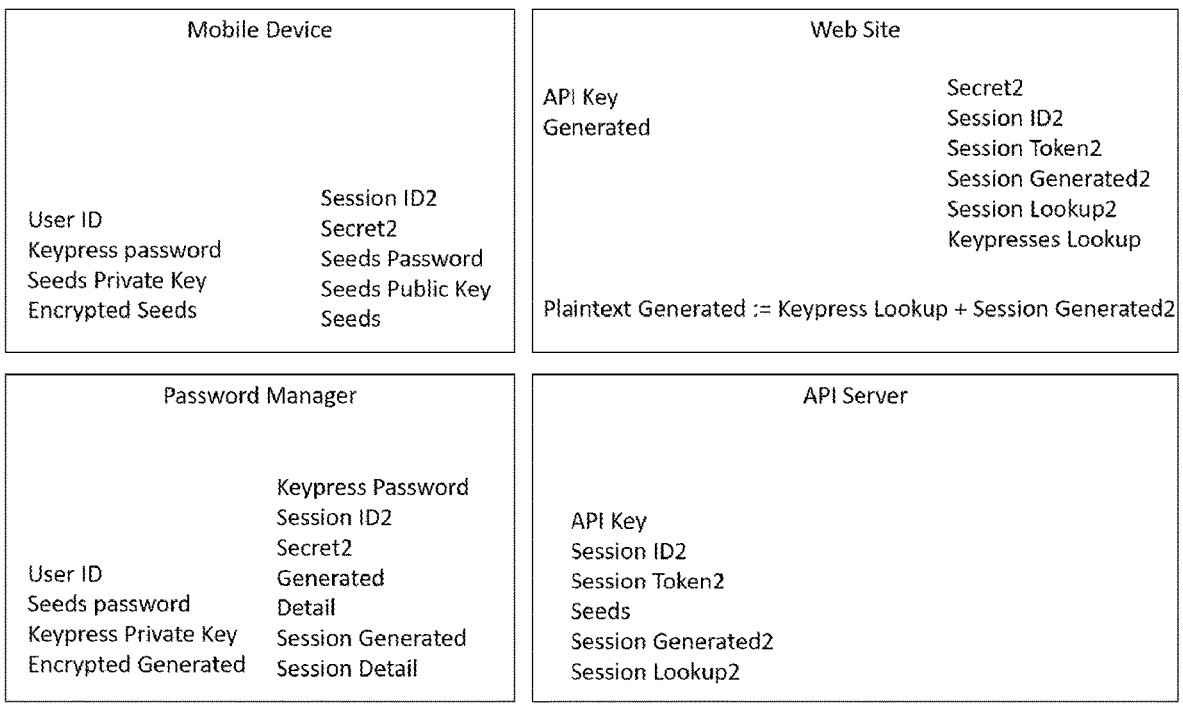
FIG 48

METHOD AND SYSTEM FOR VERIFICATION OF IDENTIFY OF A USER

INCORPORATION BY REFERENCE

All of International Patent Application PCT/AU2018/050349 dated 18 Apr. 2018 and entitled 'VIRTUAL MACHINES—COMPUTER IMPLEMENTED SECURITY METHODS AND SYSTEMS' and International Patent Application PCT/AU2020/050314 dated 30 Mar. 2020 and entitled 'COMPUTER SYSTEMS AND METHOD INCLUSING HTML BROWSER' are hereby fully incorporated by reference.

FIELD OF THE INVENTION

The present invention relates to verification of an identity of a user using an online service, such as a website.

BACKGROUND

Various systems are known that claim to provide security for access provider systems. These security systems commonly suffer from problems associated with key loggers, screen scraping, man-in-the-middle, man-in-the-browser attacks and other approaches that are able to circumvent the secure provision of content.

In addition to attack surface problems, security systems are also known to suffer from hardware and software problems associated with speed, resource and software architecture integration.

Problems associated with systems providing two factor authentication are also known. These systems typically suffer from anonymity and access code intrusion problems. SMS system services are considered to be particularly weak in security aspects due to the nature of the transmission protocols that are often employed. One-Time-Passcode systems such as a FOB can be breached by a man-in-the-browser either intercepting or altering data entered into the browser.

It is considered a security best practice to use a different password for each website, or other online service, that a user logs into. Nowadays an individual can access many online services, such as internet banking, service provider accounts etc. Remembering each unique and secure password is impractical. Password managers allow end users to store login credentials (generally username and password combinations) for individual websites and enter those credentials automatically, without having the user re-enter them.

Password managers programmatically enter login credentials directly into a web browser. These login details are entered as plain text and are therefore still vulnerable to being intercepted by malware that exists on the user's computer and/or running in a browser running on the computer.

Password-less authentication protects both website providers and end users from phishing and brute force attacks. Most password-less solutions are costly in terms of time and resources, and can have wide reaching impacts into technology and business processes.

It would be advantageous if an improved or useful alternate security systems and methods could be provided to those commonly used in the security industry.

The present invention seeks to provide an improvement or new approach to verification of a user's identity and manner of implementation of the same.

SUMMARY OF THE INVENTION

According to an aspect disclosed there is a method of providing identification to one of many online services, comprising:
  providing an interface system and an identifier manager;
  the interface system being configured to provide a secret identifier to a requesting one of the online services in a session, the secret identifier being received from the identifier manager, the secret identifier being stored in the identifier manager, preferably in an encrypted form;
  the session in which the secret identifier is provided to the online service is identified by a session identifier provided from the online service to a device which the online service is to be provided, then to the identifier manager, then to the interface system and then to the online service so that interactions are allocated to the session.

Preferably the interface system does not retain the secret identifier. Preferably the secret identifier is encoded when received from the identifier manager and when sent to the requesting one of the online services.

Preferably the identifier manager does not interact with the online service.

Preferably a key for decryption of the stored secret identifier is known to the device to which the online service is to be provided and is not stored by the identifier manager.

Preferably an encryption key for encryption of the stored secret identifier is known by the identifier manager but is not provided to the online service or the interface system.

Preferably the secret identifier is first entered using the device via a virtual machine for enabling the user of the device to enter the identifier. Preferably the virtual machine provides the secret identifier to the identifier manager. Alternatively the secret identifier is generated by the online service or the mobile device and is provided to the identifier manager. Alternatively the secret identifier is generated by the identifier manager.

In an embodiment the secret identifier is generated by the device based on a random string of characters. Preferably the secret identifier is encoded using randomly generated character seeds. Preferably the secret identifier is encoded by hashing each character of the random string of characters with a respective one of each of the randomly generated character seeds. In an embodiment the randomly generated character seeds are provided to the interface system, preferably in a point to point secure communication.

In an embodiment the secret identifier is encoded using a secret provided to the device from the respective online service.

In an embodiment the interface system creates a first lookup table from the randomly generated character seeds. Preferably the online service creates a second lookup table from the first lookup table and the secret for decoding the secret identifier.

According to an aspect disclosed there is a method of providing a secret identifier to one of many online services where the secret identifier has already been provided to a identifier manager for a particular one of the online services from a device recognizable by the identifier manager, comprising:
  receiving from the particular online service a session identifier on a device; recognizing the device by the identifier manager;
  sending the session identifier to the identifier manager;

retrieving and decrypting/decoding the secret identifier stored by the identifier manager (preferably the decryption uses a secret provided by the recognized device during a different session);

sending the decrypted secret identifier to an interface service in an encoded form (preferably the encoding into the encoded form uses a key known to the online service);

sending the secret identifier from the interface service to the particular online service.

Preferably recognizing the device comprises authentication of the identity of the device being recognized.

According to an aspect disclosed there is a method of providing a secret identifier to one of many online services comprising:

in a first session:
receiving at an identifier manager the secret identifier for a particular one of the online services from a device recognizable by the identifier manager;
storing the secret identifier in an encrypted form (preferably using a secret provided by the particular online service);

in a subsequent session:
receiving from the device a request to provide the particular online service with the secret identifier;
recognizing the device by the identifier manager;
receiving a session identifier of the subsequent session by the identifier manager;
retrieving and decrypting the secret identifier stored by the identifier manager (preferably the decryption uses the secret provided by the particular online service in the subsequent session);
sending the decrypted secret identifier to an interface service in an encoded form for the interface service to send to the secret identifier from the interface service to the particular online service.

Preferably, the identifier manager does not know where to send the decrypted secret identifier on to from the interface service and/or the identifier manager is unable to send the secret identifier to a destination that is not the interface service.

According to another aspect of the present disclosure there is provided a method of verification of an identify of a user of an online service, the method comprising: providing a first device, an interface server, and an identifier manager interconnected by a computer network;

accessing an online service which requires the identity of a user of the online service to be identified, the access using the first device, or a second device connected to the computer network;

generating a session identifier in the interface server;

generating a secret with the online service;

providing the session identifier and the secret to the first device via the online service;

sending the session identifier and secret from first device to the identifier manager;

sending the session identifier from first device to the interface server;

obtaining a secret identifier in the identifier manager;

encoding the secret identifier by the identifier manager using the secret to produce an encoded user identifier;

sending the session identifier and the encoded user identifier from the identifier manager to the interface server;

decoding the secret identifier from the encoded user identifier using the secret;

sending the session identifier and the secret identifier from the interface server to the online service, preferably the online service to which these are to be sent is identified according to the session identifier received from the identifier manager; and verifying the identity of the user of the online service using the secret identifier, preferably the online service associates the user seeking to use the online service according to the session identifier received from the interlace server.

In an embodiment the secret identifier is obtained by the user entering it into a virtual machine via input received by the first device. Alternatively the secret identifier is generated by the first device and stored in the identifier manager in an encrypted/encoded form which only a key known the first device is able to decrypt/decode. In an embodiment the secret identifier is not, or alternatively does not need to be, provided to the user of the first device.

In an embodiment the method further comprises:
obtaining a username in the identifier manager;
encoding the username by the identifier manager using the secret to produce an encoded username;
sending the encoded username from the identifier manager to the interface server;
decoding the username from the encoded username using the secret;
sending username from the interface server to the online service; and
verifying the identity of the user of the online service comprises also using the username.

In an embodiment the method further comprises providing the session identifier and the secret to a downloaded executable module executing on the first device.

In an embodiment the providing the session identifier and the secret to the downloaded executable module comprises the online service encoding the session identifier and the secret in a computer readable encoding. Preferably the computer readable encoding is an image, and more preferably is a QR code displayed on the second device, or displayable on the first device and decoded by the executable module.

In an embodiment the computer readable encoding comprises an address for the download of the executable module.

In an embodiment the method further comprises identifying the first device to the identifier manager. In an embodiment the identification uses a first identification code generated by the identifier manager. In an embodiment the first identification code is sent to and stored on the first device so that it can be sent to the identifier manager so as to identify the first device to the identifier manager. In an embodiment the first identification code is a cookie provided to the first device during a first connection to the identifier manager.

In an embodiment the method further comprises sending an encryption passphrase from the identifier manager to the first device and storing the encryption passphrase in the first device. In an embodiment the method further comprises generating the encryption passphrase with the identifier manager. Preferably this only occurs when there is no encryption passphrase already stored in the first device. Preferably the encryption passphrase is or is contained in a cookie. Preferably the passphrase is sent from the first device to the identifier manager. In an embodiment the method further comprises generating an encryption private key with the encryption passphrase being used as a passphrase for access to the private key encryption. Preferably the private key is generated by the identifier manager. Preferably the passphrase is generated by the first device.

In an embodiment the secret identifier is encrypted in the identifier manager using a key, preferably a public key. In an embodiment the public key is generated from the private key. Preferably the identifier manager generates the public key.

In an embodiment the session identifier is sent from the first device to the identifier manager and the then from the identifier manager to the interface server so that the interface server is able to verify that the session identifier is valid prior to making the executable module available for download by the first device.

In an embodiment the method further comprises generating a first set of seeds each suitable for use as a seed in an encoding. In an embodiment the generation of the first set of seeds is in the first device. Preferably the generation of the first set of seeds is conducted by the executable module. In an embodiment the first set of seeds is stored in the first device for reuse, preferably in an encrypted form. In an embodiment the first set of seeds is associated with the online service and only used in relation to that online service.

In an embodiment the method comprises sending the session identifier and the first set of seeds from executable module to interface server.

In an embodiment the method further comprises generating a second seed suitable for use as a seed in encoding another identifier, such as a username. In an embodiment the generation of the second seed is in the identifier manager. In an embodiment the second seed is associated with the online service and only used in relation to that online service. In an embodiment the identifier manager encodes the other identifier using the second seed. In an embodiment the identifier manager sends the encoded other identifier and the session identifier to the interface server.

In an embodiment the method comprises sending the session identifier and the second seed from identifier manager to interface server.

In an embodiment obtaining the secret identifier in the user identifier manager when it is stored in the identifier manager comprises retrieving the encrypted secret identifier and getting the encryption passphrase from first device, retrieving the private key from first device and decrypting the encrypted secret identifier using private key and encryption passphrase.

In an embodiment obtaining the secret identifier in the identifier manager when it is not already stored in the identifier manager comprises:
- receiving inputs representing a user entered identifier, such as a password, on first device,
- encoding each input using the first set of seeds to form elements of the secret identifier;
- sending each element of the secret identifier to the executable module for entry into the online service as a character by character entry of a user entered password;
- sending the secret identifier to the identifier manager; and
- encrypting the secret identifier and storing it in the identifier manager.

In an embodiment encoding each input comprises appending together a hash of an element of each of the first set of seeds with an encoding of each input. Preferably the encoding of each input comprises using the Unicode of the input character.

In an alternative embodiment obtaining the secret identifier in the identifier manager when it is not already stored in the identifier manager comprises randomly generating the secret identifier, such as a password, as a plurality of characters, on first device. Preferably, further comprising encoding each character with a corresponding one of the first set of seeds, preferably the encoding is by hashing each randomly generated character (and preferably its Unicode) with the corresponding seed. Preferably further comprising concatenating each of the encoded characters together to form an encoded secret identifier. Preferably further comprising sending the encoded secret identifier to the identifier manager; and encrypting the encoded secret identifier and storing it in the identifier manager.

In an embodiment encoding the secret identifier using the secret to produce the encoded user identifier comprises appending together a hash of the secret with each element in the secret identifier.

In an embodiment decoding the secret identifier from the encoded user identifier comprises decoding each element in the encoded user identifier into a Unicode table pointer/key and appending each Unicode table pointer together to form the secret identifier. Preferably the decoding each element comprises looking up each element in the encoded user identifier in a lookup table to determine the corresponding Unicode from the Unicode table pointer. In an embodiment the lookup table is created by hashing the secret with a hash of a respective seed from the first set of seeds and each possible Unicode table pointer.

In an embodiment obtaining the username in the identifier manager when it is not stored in the identifier manager comprises:
- receiving inputs representing a user entered username on first device, encoding each input using the second seed to form the username;
- sending each element of the username to the executable module for entry into the online service as a character by character entry of the first time user entered username;
- sending the username to the identifier manager; and
- storing the username in identifier manager.

In an embodiment encoding each input for the username comprises appending together a hash of the second seed with an encoding of each input. Preferably the encoding of each input comprises using the Unicode of the input character.

In an embodiment encoding the username using the secret to produce an encoded username comprises appending together a hash of the secret with each element in the username.

In an embodiment decoding the username from the encoded username comprises decoding each element in the encoded username into a Unicode table pointer/key and appending each Unicode table pointer together to form the username. Preferably the decoding each element comprises looking up each element in the encoded username in a lookup table to determine the corresponding Unicode from the Unicode table pointer. In an embodiment the lookup table is created by hashing the secret with a hash of each possible code and the second seed and each possible Unicode table pointer.

In an embodiment the lookup table for the secret identifier is a combined lookup table with the lookup table for the username.

In an embodiment when the online service sends the secret to the interface server the interface server generates the combined lookup table. In an embodiment when the interface server decodes the secret identifier and the username, the interface server sends the username and secret identifier (preferably as the password) to the online service.

In an alternative embodiment the interface server sends the encoded username and the encoded user identifier to the online service and the online service generates the combined lookup table. The online service decodes the secret identifier and the username.

In an embodiment the interface server deletes the first set of seeds, the second seed, the encoded user identifier and the encoded username when the identity of the user is verified.

In an embodiment a subsequent use of the same online service by the same user will use the same secret identifier. In an embodiment a subsequent use of the same online service by the same user will use the same username. In an embodiment the secret identifier may be changed by using the same procedure to first set the secret identifier (such as when a 'password reset' is needed or the user changes their mobile device).

In an embodiment a seeds password is created, preferably by the password manager. In an embodiment the seeds password is send to the first device. In an embodiment the seeds password is used to create a seeds private key. In an embodiment the seeds password and the seeds private key are used to create a seeds public key. In an embodiment the seeds are encrypted using the seeds public key and the encrypted seeds are stored for use in a later session. The encrypted seeds may be decrypted using the seeds private key and the seeds password. In an embodiment the decrypted seeds are used as the seeds in a subsequent session.

In an embodiment the user accesses different online services, where each online service has a different secret identifier. In an embodiment when the user accesses different online services the user uses the same username.

In an embodiment each different online service has a different first set of seeds, and second seed.

In an embodiment each use of each online service has a different session identifier.

In an embodiment each use of the same online service by the same user will use the same secret. In an embodiment each different online service will use a different secret. In an embodiment each different user is provided with a different secret.

In an embodiment each use of the first device uses the same identification code. In an embodiment each different first device is provided with a different identification code.

In an embodiment each use of the first device uses the same encryption passphrase. In an embodiment each different first device is provided with a different encryption seed.

In an embodiment the secret is randomly generated.

In an embodiment each seed in the first set of seeds is randomly generated. In an embodiment the second seed is randomly generated.

In an embodiment the encryption passphrase is randomly generated.

In an embodiment the identification code is randomly generated.

According to another aspect of the present invention there is provided a method of providing a secret identifier to an online service, the method comprising:
   receiving a secret at a first device from the online service;
   generating a set of seeds with the first device, preferably encrypting the set of seeds and storing the encrypted set of seeds in the first device;
   sending a copy of the set of seeds from the first device to an interface system;
   generating a secret identifier, (preferably randomly), such as a password, as a plurality of characters, on the first device;
   encoding each character with a corresponding one of the set of seeds, preferably the encoding is by hashing each character with the corresponding seed;
   concatenating each of the encoded characters together to form an encoded secret identifier; sending the encoded secret identifier and the secret to an identifier manager;
   preferably encrypting the encoded secret identifier and storing it in the identifier manager for later use;
   encoding the encoded secret identifier with the secret from the online service to form a double encoded secret identifier, preferably by hashing each element of the encoded secret identifier with the secret from the online service;
   sending the double encoded secret identifier to the interface system from the identifier manager; generating a first lookup table from the set of seeds received by the interface system and each possible character of one of the elements in the encoded secret identifier;
   sending the double encoded secret identifier and the first lookup table to the online service; generating a second look up table from the first look up table and the secret sent to the first device in the online service;
   decoding the double encoded secret identifier with the second lookup table to reform the secret identifier.

According to another aspect of the present invention there is provided a method of providing a secret identifier to an online service, the method comprising:
   receiving a secret at a first device from the online service;
   generating a set of seeds from a set of encrypted seeds stored in the first device;
   sending a copy of the set of seeds from the first device to an interface system;
   sending a password and the secret to the identifier manager;
   generating a decryption key from the password in the identifier manager;
   decrypting an encoded secret identifier stored in the identifier manager using the decryption key;
   preferably the stored encoded secret identifier is encrypted using an encryption key generated from the decryption key which was generated from the password which preferably was sent to the first device in a previous session, preferably the encoded secret identifier is a concatenation of characters each being a randomly generating character encoded with a corresponding one of the set of seeds;
   sending the encoded secret identifier and the secret to an identifier manager; and
   encoding the encoded secret identifier with the secret from the online service to form a double encoded secret identifier, preferably by hashing each element of the encoded secret identifier with the secret from the online service;
   sending the double encoded secret identifier to the interface system from the interface system; generating a first lookup table from the set of seeds received by the interface system and each possible character of one of the elements in the encoded secret identifier;
   sending the double encoded secret identifier and the first lookup table to the online service;
   generating a second look up table from the first look up table and the secret in the online service;
   decoding the double encoded secret identifier with the second lookup table to reform the secret identifier.

Preferably the set of seeds is unique to the online service.

Because the identifier manager does not have the set of seeds it is unable to decode the encoded secret identifier.

Because the interface system does not have secret it is unable to use the seeds. The seeds are only kept by the interface system for the duration of the session.

Because the online service has the secret it is able to know the received double encoded secret identifier is authentic.

According to another aspect of the present invention there is provided a method of authentication, the method comprising:
  receiving a secret at a first device from an online service;
  generating a set of seeds with the first device, preferably encrypting the set of seeds and storing the encrypted set of seeds in the first device;
  sending a copy of the set of seeds from the first device to an interface system;
  randomly generating a secret identifier, such as a password, as a plurality of characters, on the first device;
  encoding each character with a corresponding one of the set of seeds, preferably the encoding is by hashing each character with the corresponding seed;
  concatenating each of the encoded characters together to form an encoded secret identifier;
  sending the encoded secret identifier and the secret to an identifier manager.

According to another aspect of the present invention there is provided a method of authentication, the method comprising:
  receiving a secret at a first device from the online service;
  generating a set of seeds from a set of encrypted seeds stored in the first device;
  sending a copy of the set of seeds from the first device to an interface system;
  sending a password and the secret to the identifier manager.

Preferably the seeds are encrypted using an encryption key derived from a seeds password receiving form the identifier manager. Preferably the encrypted seeds is decrypted in subsequent sessions and the decrypted seeds are the copy of the set of seeds from the first device to the interface system.

Preferably a decoding password is received from the identifier manager in one session is stored and send to the identifier manager in subsequent sessions.

According to another aspect of the present invention there is provided a method of authentication, the method comprising:
  receiving an encoded secret identifier and a secret sent from a first device at an interface system; and
  encoding the encoded secret identifier with the secret to form a double encoded secret identifier, preferably by hashing each element of the encoded secret identifier with the secret from the online service;
  sending the double encoded secret identifier to an online system from the interface system.

According to another aspect of the present invention there is provided a method of authentication, the method comprising:
  receiving a password and a secret at an identifier manager;
  decrypting an encoded secret identifier stored in the identifier manager using the password or a decryption key generated from the password;
  preferably the stored encoded secret identifier is encrypted using an encryption key generated from the decryption key which was generated from the password which was sent to the first device in a previous session, preferably the encoded secret identifier is a concatenation of charactered each being a randomly generating character encoded with a corresponding one of the set of seeds;
  sending the encoded secret identifier and the secret to an interface system manager.

Preferably the identifier manager does not have the decoding key to decode the encoded secret identifier.

According to another aspect of the present invention there is provided a method of authentication, the method comprising:
  receiving a set of seeds from a first device at an interface system;
  receiving a double encoded secret identifier from an identifier manager at the interface system;
  generating a first lookup table from the set of seeds and each possible character of one of the elements in the encoded secret identifier;
  sending the double encoded secret identifier and the first lookup table to an online service.

According to another aspect of the present invention there is provided a method of authentication, the method comprising:
  sending a secret from an online service to a first device;
  receiving a double encoded secret identifier and a first lookup table sent from an interface system at the online service;
  generating a second look up table from the first look up table and the secret in the online service;
  decoding the double encoded secret identifier with the second lookup table to form a secret identifier.

According to another aspect of the disclosure there is provided a method of verification of an identify of a user of an online service via a first device, the method comprising:
  accessing an online service which requires the identity of a user of the online service to be identified, the access being from the first device;
  receiving from the online service a first session identifier generated by an interface server and a first secret generated the online service in the first device;
  entering a secret identifier in the first device and sending the secret identifier to an identifier manager;
  sending the first session identifier and first secret from first device to the identifier manager;
  sending the first session identifier from first device to the interface server;
  accessing the online service having been verified by the entry of the secret identifier;
  ending access to the online service;
  subsequently accessing the online service from the first device;
  receiving from the online service a second session identifier generated by the interface server and a second secret generated the online service in the first device;
  sending the second session identifier and second secret from first device to the identifier manager;
  sending the second session identifier from first device to the interface server;
  without again entering the secret identifier in the first device accessing the online service having been verified by the entry of the secret identifier.

According to another aspect of the disclosure there is provided a method of verification of an identify of a user of an online service which requires the identity of a user of the online service to be identified, the method comprising:
  providing an interface server;
  generating a session identifier in the interface server;
  sending the session identifier to the online service;
  receiving the session identifier in the interface server from a first device connected by a computer network to the interface server;

receiving the session identifier and an encoded user identifier from an identifier manager in the interface server;

receiving a secret generated by the online service and sent from the online service in the interface server;

decoding the encoded user identifier using the secret to provide a secret identifier;

sending the session identifier and the secret identifier from the interface server to the online service, so that the identity of the user of the online service can be verified from the secret identifier.

According to another aspect of the disclosure there is provided a method of verification of an identify of a user of an online service, the method comprising:

providing a first device, an interface server, and an identifier manager interconnected by a computer network;

accessing an online service which requires the identity of a user of the online service to be identified, the access using the first device, or a second device connected to the computer network;

receiving in the identifier manager a session identifier generated by an interface server and a secret generated by the online service both of which are sent from first device;

obtaining a secret identifier in the identifier manager;

encoding the secret identifier by the identifier manager using the secret to produce an encoded user identifier;

sending the session identifier and the encoded user identifier from the identifier manager to the interface server;

such that when the secret identifier is decoded from the encoded user identifier using the secret, the identity of the user can be verified so that access to the online service can be provided.

According to another aspect of the disclosure there is provided a system for verification of an identify of a user of an online service, the system comprising:

an online service server;
a first device;
an interface server;
an identifier manager; and
a computer network interconnecting the online service server, the first device, the interface server and the identifier manager;

wherein the online service server is configured so that access to the online service requires the identity of a user of the online service to be identified, and further configured to:
1) generate a secret;
2) request the interface server generate a session identifier;
3) receive the session identifier;
4) provide the session identifier and the secret to the first device;
5) verify the identity of the user of the online service using the secret identifier and when verified provide the online service;

wherein the interface server is configured to:
1) generate the session identifier when requested by the online service and send the session identifier to the on line service server;
2) receive the session identifier from first device;
3) receive the session identifier and the encoded user identifier from the identifier manager;

wherein the first device is configured to:
1) send the session identifier and secret to the identifier manager;
2) send the session identifier to the interface server;

wherein the identifier manager is configured to:
1) receive the session identifier and secret;
2) obtaining a secret identifier;
3) encode the secret identifier using the secret to produce an encoded user identifier;
4) send the session identifier and the encoded user identifier to the interface server;

wherein either or both of the interface server and on line service server are configured to decode the secret identifier from the encoded user identifier using the secret.

According to another aspect of the disclosure there is provided identifier manager comprising:

a receiver of a secret identifier provided by a first device in a first session;
a storage for storing the secret identifier;
a receiver of a second session identifier generated by an interface server and a secret generated by an online service;
a retriever for retrieving the stored secret identifier;
an encoder for encoding the secret identifier using the secret;
a transmitter for transmitting the session identifier and encoded user identifier to the interface server so that the online service can verify the identity of the user using the secret identifier when it is decoded from encoded user identifier.

According to another aspect of the invention there is provided a method of verifying the identity of a user comprising the steps of:

providing a first device (preferably a mobile device) with a connection to the Internet;

access an online service (preferably a website) using the first device or a second device (preferably a personal computer) during a first session;

obtaining a session identifier (preferably a session ID) from an interface server (preferably an API Server) with the device accessing the online service (the device being the first device or the second device) (and preferably a token);

generating a first device secret identifier (secret) with the online service; providing the session identifier and the first device secret identifier from the device accessing the online service (with a first device or second device) to a downloaded executable module (preferably an iframe app) executing on the first device;

{preferably the providing step is via a computer readable encoding} {preferably the computer readable encoding include an address of the executable module} {and preferably the computer readable encoding is a QR code}

{preferably the request for executable module is validated as arising from access of the online service}
{preferably the validation uses the session identifier}
{preferably the request for download of executable module comprises the session identifier}
{preferably the session identifier is validated with the server}

{preferably downloading from an identifier manager the executable module (preferably the identifier manager is a password manager) and commence execution of the executable module} identifying the first device to the password manager {preferably using an identification code generated by the password manager, send to and stored on the first device (preferably the identification code is an APPTOKEN cookie)}

{preferably, if this is the first time, creating the identification code
[generating a PASS cookie by password manager; generating a private key from the PASS cookie and sending the PASS to first device]}
sending the session identifier and first device secret identifier from executable module to password manager;
preferably, sending the session identifier from the password manager to the server; preferably the server verifies that the session identifier is valid to be able to download executable module;
sending the session identifier and a first set of seeds for encoding generated by the executable module and associated with online service from executable module to server;
  (preferably, generating and storing the first set of seeds with the executable module; and if generated, retrieve the first set of seeds into the executable module);
  (preferably, generating a second set of seeds for encoding with the password manager; and sending the second set of seeds from password manager to server);
preferably, obtaining username in password manager, which preferably comprises:
  if first time
    receiving the username from use via executable module;
    Sending the username to password manager;
    Saving the username in password manager;
  if not first time, retrieving the username stored in password manager;
preferably encoding the username in the password manager by using the second set of seeds and the first device secret identifier to produce an encoded username;
preferably sending the session identifier and the encoded username from the password manager to the server;
obtaining the password (which preferably is formed of appended Unicode pointers of each element of the user entered password) in password manager, which preferably comprises:
  if first time
    receiving inputs representing user entered password on first device;
    encoding each input using first set of seeds (preferably encoding is by appending together a hash of an element of each of the first set of seeds with encoding (preferably with Unicodes) of each input) to form a password;
    sending each element of the password to the executable module for entry into the online service as the user entered password;
    encrypting the password and storing in the password manager (preferably using a public key generated from private key);
  if not first time, retrieving the encrypted password stored in the password manager, preferably by:
    getting a PASS cookie from first device,
    retrieving private key from first device,
    decrypting encrypted password using private key and PASS;
the password manager encoding the password (preferably by appending together a hash of the first device secret identifier with each encoded element in the password) to produce an encoded password;

sending the session identifier and the encoded password from the password manager to the server;
requesting (preferably by sending a request from the online service to server) with the session identifier (and preferably the token) that keypress data be sent from server to online service;
decoding the password from the encoded password
  (preferably by obtaining decoded Unicode for each element in encoded password)
  (preferably the decoding is done by looking up from a lookup table the Unicode key, preferably the lookup table created by hashing the first device secret identifier with a hash of a seed from the respective set of seeds (first set of seeds and second set of seeds) and each Unicode key);
preferably, decoding the username from the encoded username;
  (preferably by obtaining decoded Unicode for each element in encoded username)
  (preferably the decoding is by looking up from the lookup table the Unicode key)
  (preferably, when the online service is sent the first device secret identifier to the server the server generates the lookup table and does the decoding of the password and the username, and the server sends the username and password to the online service) (preferably, otherwise, the server sends the encoded password (and preferably the encoded username) to the online service and the online service generates the lookup table and does the decoding of the password and the username);
authenticating the user with the online service using (preferably the username and) the password; (preferably, delete the first set of seeds and the second set of seeds the encoded password (and preferably the encoded username) from the interface server).

According to another aspect of the disclosure there is provided a system for verification of an identify of a user of an online service, the system comprising:
requesting by a mobile device a password manager register a user;
generating a first user identifier with the password manager;
generating a seeds password with the password manager;
generating a keypresses password with the password manager;
generating a keypresses private key from the keypresses password with the password manager;
sending the first user identifier from the password manager to the mobile device;
receiving a seeds password by the mobile device from the password manager;
generating a seeds private key from the seeds password with the mobile device;
generating seeds as an array of random characters with the mobile device;
sending the seeds from the mobile device to an interface system;
generating a seeds public key from seeds private key and the seeds password with the mobile device;
generating encrypted seeds from the generated seeds and the seeds public key with the mobile device;
the mobile device requesting the password manager authorize user;
generating the secret user identifier from a random string and the seeds with the mobile device;

optionally, generating an array of inputs from the seeds and optionally from a user input with the mobile device, preferably the user input comprises a username;

send the secret user identifier from the mobile device to the identifier (password) manager;

optionally, sending the array of inputs from the mobile device to the password manager;

sending the keypresses password, session ID and the secret from the mobile device to the password manager;

generating an encrypted secret user identifier from the secret user identifier and the keypresses public key with the password manager;

generating session secret identifier from secret user identifier and the secret with the password manager;

optionally, generating session detail using received array of inputs and secret with password manager;

sending the session ID, session secret identifier and optionally session detail from the password manager to the interface system;

generating a session look up from Unicode character set and seeds with the interface system;

receiving a request from online service at the interface system in respect of the session identified by the session ID;

sending to online service the session secret identifier, session look up and optionally the session detail from the interface system;

generating a keypresses lookup from the session lookup and the secret with the online service;

generating secret user identifier from the keypresses lookup and the session secret identifier with the online service;

sending the session id and optionally a message from online service to the interface system;

optionally, sending the message from the interface system the mobile device;

retaining in the mobile device the first user identifier, seeds password, seeds private key and encrypted seeds;

retaining in the password manager the first user identifier, seeds password, seeds private key and encrypted secret user identifier;

retaining in the online service the secret user identifier (and optionally detail); and deleting all temporary data.

According to another aspect of the disclosure there is provided a system for verification of an identify of a user of an online service, the system comprising:

requesting by a mobile device a identifier (password) manager register a user;

sending a first user identifier from the mobile device to the password manager;

decrypting encrypted seeds storing the mobile device using a seeds private key stored in the mobile device, the decrypted seeds being an array of random characters;

sending the decrypted seeds from the mobile device to an interface system;

sending a keypresses password, a session ID and a secret from the mobile device to the password manager;

decrypting an encrypted secret user identifier stored in the password manager using a keypress private key stored in the password manager;

generating a session secret identifier from the decrypted secret user identifier and the secret with the password manager;

sending the session ID, and session secret identifier from the password manager to the interface system;

generating a session look up from Unicode character set and seeds with the interface system;

receiving a request from online service at the interface system in respect of the session identified by the session ID;

sending to online service the session secret identifier, and session look up from the interface system;

generating a keypresses lookup from the session lookup and the secret with the online service;

generating secret user identifier from the keypresses lookup and the session secret identifier with the online service;

sending the session id and optionally a message from online service to the interface system;

optionally, sending the message from the interface system the mobile device;

deleting all temporary data.

According to a further aspect herein described there is provided a computer implemented method of enabling an online service (preferably an access provider system) to secure access to content on a first or second electronic device, the computer implemented method comprising: receiving encrypted/encoded input information, the encrypted/encoded input information being inputted by a user on the first electronic device; and transmitting input information to an identifier manager; the identifier manager securely storing the input information and when required transmitting the input information to the access provider system to allow the access provider system to determine whether to authorise access to the first/second electronic device.

This aspect can be applied to authorise access to multiple devices.

Accordingly in another aspect herein described there is provided a computer implemented method of enabling one or more access provider systems to secure access to content on first or second electronic devices, the computer implemented method comprising: receiving encrypted/encoded input information, the encrypted/encoded input information being inputted by users on first electronic devices; and transmitting input information to an identifier manager; the identifier manager securely storing the input information and when required transmitting the input information to the one or more access provider systems to allow the one or more access provider systems to determine whether to authorise access to the first/second electronic devices.

Preferably the method includes providing an interface server/system service having an application interface, the application interface for receiving the encrypted/encoded input information from the identifier manager and transmitting the received encrypted/encoded input information from the system service to the one or more access provider systems. In an embodiment, (i) each access provider system has access to decryption keys for decrypting/decoding the transmitted input information; and (ii) the system service does not have access to the decryption keys and is unable to decrypt/decode the received encrypted/encoded input information.

Preferably the method includes generating session identifiers; each session identifier for identifying an input session in association with a corresponding access provider system and a corresponding first/second electronic device.

Preferably the method includes each access provider system generating a secret key for each session identifier associated with the access provider system.

Preferably the method includes presenting each session identifier and the corresponding secret key as a visual representation on the second electronic devices for scanning by the first electronic devices.

Preferably the method includes using each secret key in the encryption of information provided by the identifier manager that is inputted by the user for the purposes of obtaining access to content on the corresponding first device.

Preferably the method includes using a secret passphrase provided by the first device to encrypt the information stored in the identifier manager.

Preferably the method includes collating encrypted/encoded input information inputted by the users using the first electronic devices; and providing collated input information associated with each session identifier to the one or more access provider systems based on the corresponding session identifiers.

Preferably the method also comprises storing a non-predicable number as a remembered identifier in the respective first device.

Preferably the method includes receiving requests from the one or more access provider systems to provide input session identifiers, each input session identifier being provided for use in providing secure access to content from an associated access provider system.

In an embodiment the method includes providing a software application on each of the first electronic devices, the software application for providing an input system for use in authorizing a user to access content on the first or second electronic device. In an embodiment, each first electronic device comprises a virtual input device. Preferably the virtual input device is displayed on the first electronic device for receipt of input.

According to a further aspect herein described there is provided a computer implemented method of enabling an online service, via an authentication system, to secure access to content on a first or second electronic device, the computer implemented method comprising: receiving encrypted/encoded input information, the encrypted/encoded identifier information being generated by the first electronic device with a set of seeds; transmitting the set of seeds to the access provider system; and transmitting identifier information to an identifier manager; the identifier manager securely storing the identifier information and when required transmitting the identifier information to the access provider system to allow the authentication system to determine whether to authorise access to the first/second electronic device.

According to an aspect described herein there is provided a computer implemented method of enabling an online service/access provider system to secure access to content on an electronic device via a first communication channel between the access provider system and the electronic device, the computer implemented method comprising: receiving encrypted/encoded input information via a second communication channel between a identifier manager and the access provider system, the encrypted/encoded input information being inputted by a user and securely stored in the identifier manager in a first session; and transmitting input information from the identifier manager to the access provider system in a second session to allow the access provider system to determine whether to authorise access to the first electronic device.

Preferably the method further comprises providing the encrypted/encoded input information to the access provider system via an interface system.

Preferably the inputted information is unable to be provided to the access provider system via the first communication channel.

Preferably the identifier manager is unable to provide the input directly to the access provider system and the identifier manager is unaware of which access provider system the input information is to be provided to.

Preferably the interface system knows which access provider system to provide the input information to by reference to a session identifier.

According to an aspect described herein there is provided a computer implemented method of enabling an online service, via an authentication system, to secure access to content on an electronic device via a first communication channel between the online service and the electronic device, the computer implemented method comprising: receiving encrypted/encoded identifier information via a second communication channel between a identifier manager and the access provider system, the encrypted/encoded identifier information being generated by the electronic device using a set of seeds; transmitting the set of seeds to the access provider system; securely storing the identifier information in the identifier manager in a first session; and transmitting identifier information from the identifier manager to the access provider system in a second session to allow the authentication system to determine whether to authorise access to the first electronic device.

According to an aspect herein described there is provided a computer implemented method of enabling an online service/access provider system associated with a corresponding session identifier to secure access to content on a first or second electronic device, the computer implemented method comprising: receiving, via an application interface provided by an interface server/system service, encrypted/encoded input information that is inputted by a user on the first electronic device along with the session identifier identifying an input session; the first device providing an encrypted communication channel independent of communication with the access provider systems; and transmitting, via an identifier manager and the application interface, input information inputted by the user using the first electronic device to the access provider system; securely storing the inputted information in the identifier manager.

Preferably the system service is agnostic of the decryption key required to decrypt the encrypted/encoded input information.

According to an aspect herein described there is provided a computer implemented method of enabling a plurality of online service/access provider systems to secure access to content on electronic devices, the computer implemented method comprising: receiving, via an application interface provided by a interlace server/system service, encrypted/encoded input information that is inputted by users on the electronic devices along with session identifiers each identifying an input session; the first devices providing encrypted communication channels independent of communication with the access provider systems; and transmitting, via an identifier manager and the application interface, input information inputted by the users using the first electronic devices to the access provider systems associated with corresponding session identifiers securely storing the inputted information in the identifier manager.

Preferably the method includes providing a session identifier and a secret key from a second device to a respective first device. Preferably the method includes providing the session identifier along with the secret key in a visual representation on each of the second electronic devices, the visual representation for being scanned using the respective first electronic device.

Preferably the method includes storing an access providing system identifier in the respective first device during a first session and transmitting the stored access provider system identifier to the respective access provider system in a subsequent session via the application interface.

According to an aspect herein described there is provided a computer implemented method of enabling an online service via an authentication system associated with a corresponding session identifier to secure access to content on a first or second electronic device, the computer implemented method comprising: receiving, via an application interface provided by an interface server/system service, encrypted/encoded identifier information that is generated by the first electronic device along with the session identifier identifying a session; the first device providing an encrypted communication channel independent of communication with the authentication systems; and transmitting, via an identifier manager and the application interface, the identifier information generated using a set of seeds send from the first electronic device to the authentication system; securely storing the identifier information in the identifier manager.

According to an aspect herein disclosed there is provided a computer implemented method of enabling an online service/access provider system associated with a corresponding session identifier to secure access to content on an electronic device via a first communication channel, the computer implemented method comprising: receiving, via a second communication channel with an application interface provided by an interface server/system service, encrypted/encoded input information that is inputted by a user along with the session identifier identifying an input session; the second communication channel being encrypted and independent of the first commination channel; and transmitting to the access provider system in a subsequent session, from an identifier manager and via the application interface, the encrypted/encoded input information inputted by the user in the input session.

According to an aspect herein described there is provided a computer implemented system for enabling one or more online service/access provider systems to secure access to content on an electronic device, the computer implemented system comprising: a receiver for receiving encrypted/encoded input information from an identifier manager that is inputted by a user on the electronic device; and a transmitter for providing input information to the access provider system to allow the access provider system to determine whether to authorise access to the content on the electronic device.

Preferably the system includes a generator for generating session identifiers; each session identifier for identifying a user input session in association with a corresponding access provider system and a corresponding first electronic device.

Preferably each access provider system includes a secret key generator for generating a secret key for each session identifier associated with the access provider system.

Preferably the system includes an encryptor using each secret key in the encryption of information that is inputted by the user for the purpose of obtaining access to content on the corresponding first device.

Preferably the system includes a collator for collating encrypted/encoded input information inputted by the users using the second electronic devices, based on the corresponding session identifiers; the transmitter for providing collated input information associated with the session identifiers to the one or more access provider systems based on the corresponding session identifiers.

Preferably the system includes a session identifier request receiver for receiving requests from the one or more access provider systems to create input session identifiers, each input session identifier for use in providing secure access to content from an associated access provider system to a user.

Preferably the system includes an input receiver on each of the first electronic devices, the input receiver comprising an application for use in authorizing a user to access content on the first or a second electronic device.

Preferably the system includes a display selection receiver for receiving display element selection information from the first or second devices as further input information from the users in connection with the monitoring of display elements on each first or second user device.

Preferably the system includes a monitor for monitoring the display elements on each first user device.

Preferably the system includes an informer for informing corresponding second electronic devices of display element selection on the first electronic devices.

According to an aspect herein described there is provided a computer implemented system for enabling one or more online service/access provider systems to secure access to content on an electronic device, the computer implemented system comprising: a receiver for receiving encrypted/encoded input information from the electronic device; a storage for storing the input information in a different encrypted form; an encrypter for encrypting/encoding the input information in another encrypted form so that it can be decrypted by the access provider system using a decryption key known to the access provider system; and a transmitter for providing input information in the other encrypted form to the access provider system to allow the access provider system to determine whether to authorise access to the content on the electronic device.

According to an aspect herein described there is provided a computer implemented method of securing access to content stored by one or more online service/access provider systems, the method comprising: providing a web system service for the one or more access provider systems that enables the access provider systems to authorize secure user access to content on first or second electronic devices, each first or second electronic device being associated with a user; providing each user with an application for communicating with the web system service using the first electronic devices, each being associated with a user; receiving encrypted/encoded input information inputted by the users on first user devices; and forwarding the received encrypted/encoded input information to the one or more access provider systems with the one or more access provider systems having the ability to decrypt/decode the encrypted/encoded input information for determining whether to authorise access to the users to content on the first or second user devices.

According to an aspect herein described there is provided a computer implemented method of securing access to content stored by one or more online service/access provider systems, the method comprising: providing a receiver for receiving encrypted/encoded input information from an electronic device; storing the input information in a different encrypted form; encrypting/encoding the input information in another encrypted form so that it can be decrypted by the access provider system using a decryption key known to the access provider system; and transmitting input information in the other encrypted form to the access provider system to allow the access provider system to determine whether to authorise access to the content on the electronic device.

According to an aspect herein described there is provided a computer implemented system of securing access to content stored by one or more online service/access provider systems, the system comprising: a web system service for the one or more access provider systems that enables the access provider systems to authorize secure user access to content on first or second electronic devices, each first or second electronic device being associated with a user; an input system for communicating with the web system service using first electronic devices, each being associated with a user; a receiver for receiving and storing encrypted/encoded input information inputted by the users on first user devices; a retriever for receiving stored encrypted information and encrypting/encoding the input information in an encrypted form able to be decrypted by the access provider systems; and a forwarder for forwarding the received encrypted/encoded input information to the one or more access provider systems with the one or more access provider systems having the ability to decrypt/decode the encrypted/encoded input information for determining whether to authorise access to the users to content on the first or second user devices.

According to an aspect herein described there is provided a method comprising: receiving a request from a first or second device to access a service, the request being received at an online service/access provider system via a first communication channel; responding to the first or second device via the first communication channel with a webpage including a session identifier, an encryption key, an identifier of the access provider system providing the response and a call to provide a virtual input device for receiving input from a user either via the virtual input device being implemented on the first device or via the virtual input device being implemented on the first or second device; receiving input information entered using the virtual input device which is encrypted using the encryption key and which is send to and stored in an identifier manager via a second communication channel different from the first communication channel and where a decryption key for decrypting/decoding the encrypted/encoded input information is only known to the access provider system and the identifier manager, or the encryption key for encrypting/encoding the encrypted/encoded input information provided to the access provider system is provided by the access provider system; sending the input information to the access provider system via third communication channel different to the first and second communication channels; associating the received encrypted/encoded input information with a first session linked to the session identifier of the access provider system having the access provider system identifier; associating a second session linked to the session identifier of the access provider sent with the retrieved stored input information; decrypting/decoding the encrypted/encoded input information at the access provider system using the decryption key; verifying that the decrypted input information is as expected and when that is the case providing access to the service.

According to an aspect herein described there is provided a method comprising: receiving a request from a device for providing a virtual input device with a session identifier, a first encryption key, and an identifier of an access provider system; implementing the virtual input device in a manner in which the virtual input device encrypts input by a user of the device using a second encryption key provided by the input device; sending the encrypted/encoded input to an identifier manager which stores the encrypted/encoded input; subsequently retrieving the stored input decrypting/decoding the stored input using the second encryption key and encrypting/encoding the input using the first encryption key, whereby the input by the user is not accessible in a non-encrypted form from outside of the virtual input device, other than by the access provider system identified by the identifier of the access provider system, which has a decryption key; sending the encrypted/encoded input with the session identifier from the identifier manager to the access provider system as identified by the identifier of the access provider system.

In an embodiment of the above aspects, part of the input information is provided via the first device and part is provided via a third device. Preferably each of the first and third devices implement a virtual input device where the inputs are combined. Preferably the combination is according to the timing of input by respective users. Alternatively, the combination is according to an identity of the respective users of the respective first and third devices.

According to an aspect herein described there is provided a computer program product comprising instructions stored in a tangible form which when executed by a processor cause a computing system to perform any one or more of the methods herein described, or to configure a computer system or device to be configured as herein described.

From the perspective of an access provider system, one advantage is that several preferred embodiments are addressed toward the problem of man-in-the-browser and/or key logger attacks on the first electronic devices.

Another advantage of aspects is that the integration work required for an access provider system is limited. Each access provider system is able to readily integrate with a system service API. The system service itself is content-agnostic of the user information inputted using the second electronic devices. Furthermore, in several preferred embodiments, there is no need to substantially modify the access provider system's current web system service architecture or modify the password authentication system.

In the case of access provider systems, the providers are provided (in several embodiments) with a second communication path that is isolated from their web architecture. The second communication path preferably allows the provider to authenticate a user using the second communication path and then account access is provided through the user's local browser on the user's local machine.

The access provider systems are provided with the ability to communicate with an API and decrypt/decode collated inputs that are inputted by the user on the second devices. The access provider is able to communicate directly with the users providing their own secret for data encryption of an input session. The system service providing the API is content-agnostic in the sense of being unable to decrypt/decode the input information inputted by the users.

From the context of the users, each user is able to login using a second authentication path that bypasses their local machine for authorization, while after authorization still being able to use their own web browser. For this reason, users can readily employ their own customizations in the form of installed browser extensions or otherwise.

The users are able to use a single input means on the second electronic devices. Using the input application the users are able to access different access provider systems that use the security of several embodiments. The system service is input content-agnostic and the browser is isolated from access input entry. A clientless infrastructure is provided by the user's local machine. Furthermore users are provided with a seamless experience by virtue of preferred form synchronisation approaches with the browser display elements being updated in a content-agnostic manner. Users are able to see keypress events on their browser without having to be provided with virtual machine software.

From the context of the system service provider employing various embodiments, a collator is able to readily collate input information from users and forward the input information to access provider systems in a content-agnostic manner. The system service provider is unaware of the content of the input made using the second device and does not necessarily have to allocate a virtual machine before authenticating a user and providing browser access to the content. The system service provider does not store any relevant user information at all in various embodiments for the reason that the information is encrypted using keys with decryption known only to the access provider systems.

The identifier manager allows the system to operate without the user entering their password after the first time they enter it or after it is generated by the system. This avoid the problems of remembering the password for a particular online service. From the user's point of view the login to the online service effectively becomes passwordless. However from the access providers systems' point of view the password system remains.

It is to be recognised that other forms and advantages of preferred embodiments will be apparent from the drawings and description of preferred embodiments, and the claims provided below.

Further advantages and preferred features will be apparent from the drawings and a reading of the specification as a whole.

BRIEF DESCRIPTION OF DRAWINGS

In order to facilitate a better understanding of the present invention, several preferred embodiments will now be described with reference to the accompanying drawings.

FIG. 8 is diagram of a system according to an embodiment of the present invention;

FIG. 9 is schematic diagram of a method according to an embodiment of the present invention;

FIGS. 12 to 35 are state diagrams of steps of the system of FIG. 4 performing a method according to an embodiment of the present invention in an initial session; and FIGS. 36 to 53 are state diagrams of steps of the system of FIG. 4 performing a method according to an embodiment of the present invention in a subsequent session.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

In general terms, this disclosure moves the input of sensitive information from the user's PC to another device by having the user authenticate to an identifier manager server, and then having the identifier manager communicate directly to the website the user is logging into. This solution both shields the end user from entering their password on a potentially malware infected device, as well as allowing the website provider to add seemingly password-less logins at least after the first use from the user's perspective with little change to their existing systems (as it allows them to continue to use passwords internally to authenticate users).

Figure 1:
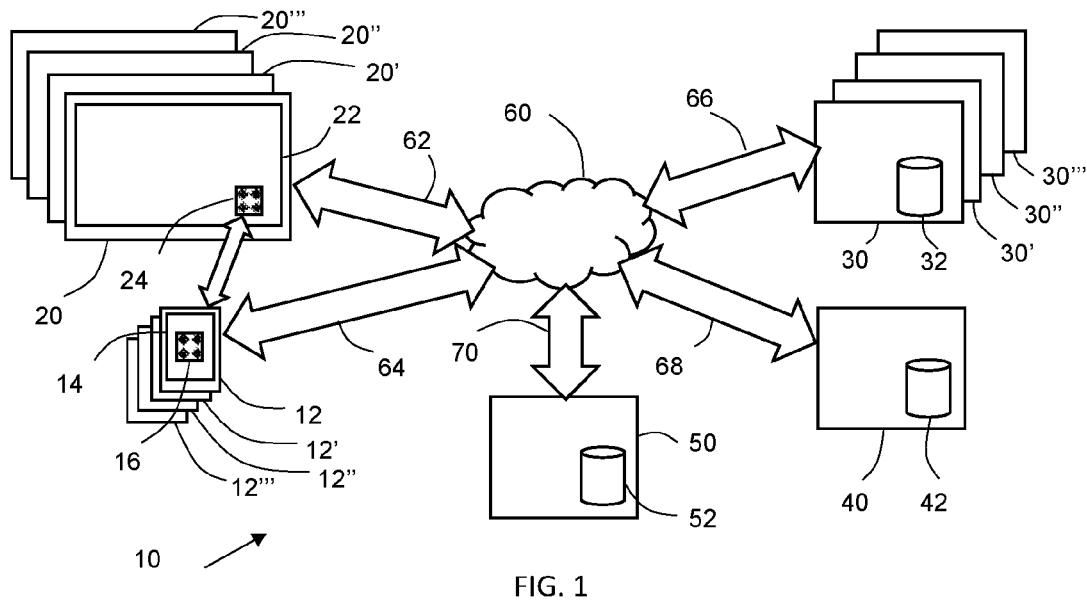
FIG. 1 is a diagram of a system according to an embodiment of the present invention.

Referring to FIG. 1 there is shown a computer system 10 comprising one or more first devices 12, 12', 12'', 12''', one or more second devices 20, 20', 20'', 20''', online service provider systems 30, 30', 30'', 30''' also referred to herein as access provider systems, an interface server 40 also referred to herein as a service system, an identifier manager 50 and a network 60 connecting these together. In an embodiment, the online service provider systems are access provider systems for providing access to online content or services.

The first devices 12, 12', 12'', 12''', second devices 20, 20', 20'', 20''', access provider systems 30, 30', 30'', 30''', and interface server 40 may be configured to operate as described in PCT/AU2020/050314 in addition to being configured to operate as described below.

Each of the first devices 12, 12', 12'', 12''' may be in the form of a mobile computing device, such as a smartphone with a camera and able to download and run a software application via the internet 60. Each of the second devices 20, 20', 20'', 20''' may be in the form of a computer capable of accessing a website or other online service via the internet 60 provided by a respective one or more online service provider systems 30. Each of the access provider systems 30, 30', 30'', 30''' may be in the form of a website server providing the respective first device 12, 12', 12'', 12''' (or for simplicity 12 only is referred to in the examples) or second device 20, 20', 20'', 20''' (or for simplicity 20 only is referred to in the examples) with a requested website. Further, and applicable to the present invention, the website or online service requires identification in order to provide the requested access to the online service(s). The interface server 40 is preferably configured with an interface, such as an application programming interface, for providing the identification to the access provider systems 30, 30', 30'', 30''' as described below.

Communication between the first devices 12 and the other elements in the system 10 is indicated by 64. Communication between the second devices 20 and the other elements in the system 10 is indicated by 62. Communication between the access provider systems 30 and the other elements in the system 10 is indicated by 66. Communication between the interface server 40 and the other elements in the system 10 is indicated by 68. Communication between the identifier manager 50 and the other elements in the system 10 is indicated by 70.

Figure 2:
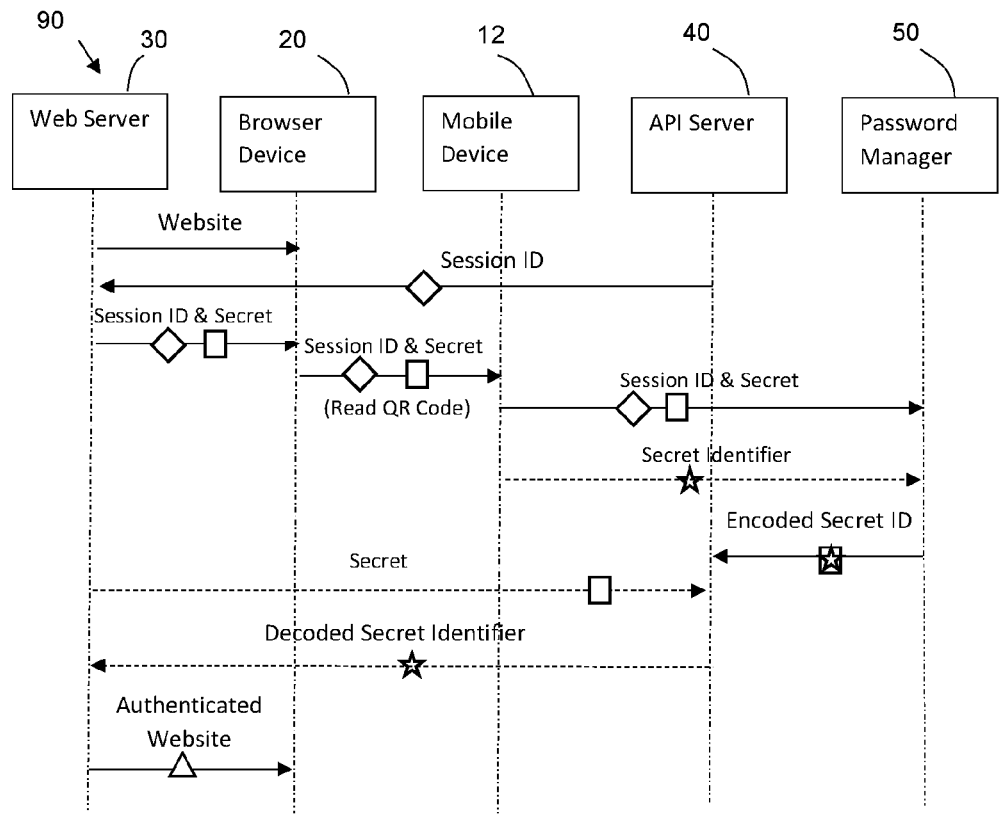
FIG. 2 is message transfer diagram of a method according to an embodiment of the present invention.

Referring to FIG. 2, which shows an embodiment of the method of operation 90 of the system 10. An online service provider system, such as webserver 30, provides a website to a second device, such as browser device 20, typically in response to the browser device 20 requesting the website from the web server 20. For example, a user of the browser device goes to their bank internet banking login page.

The interface server, such as API server 40, provides a session identifier to the webserver 30, typically in response to a request for the session identifier from the web server 30. The webserver 30 sends the session identifier and a secret to the browser device 20 in an encoded form. Typically, the secret is a key generated by the webserver 30. Typically, the encoded form is a 2-dimensional barcode, such as a Quick Response (QR) code which also has a Uniform Resource Locator (URL) encoded therein. The browser device 20 displays the QR code 24.

The mobile device 12 reads the QR code with its camera (shown displayed on a screen of the mobile device 12 as 16), decodes the bar code and extracts the URL. Typically, the session identifier and secret will be parameters (or a query string) in the URL. The mobile device 12 then calls the URL. The URL destination will be the identifier manager, which is typically a password manager server 50. Due to the session identifier and secret being parameters in the URL, the password manager 50 will have them.

In an embodiment, when the user first uses this embodiment a secret identifier, such as a password, is entered into the mobile device 12 (or in the embodiment described in relation to FIG. 10 below is generated by the mobile device) and then provided to the password manager 50. The secret identifier could take other forms. It could be a username and password combination (such as is the case for FIG. 3). It could be a cryptocurrency key, or personal identification number (PIN), or a CVV number, as just some examples. The secret identifier may be entered by use of a virtual machine keyboard as described in more detail below.

In another embodiment, after the user first uses this embodiment the secret identifier is stored by the password manager 50. Typically, it is stored in an encrypted form.

The password manager 50 encodes the secret identifier using the secret key. The password manager 50 then sends the encoded secret identifier to the interface server 40, typically implemented as an API server.

In one embodiment the website 30 sends the secret key to the API server 40. In this embodiment the API server 40 can decode the encoded secret identifier using the secret key and can then send the decoded secret identifier to the webserver 30. Alternatively, when the secret key is not sent to the API server 40, the API server 40 does not decode the encoded secret identifier, but instead sends the encoded secret identifier to the webserver 30, and the webserver 30 uses the secret key to decode the encoded secret identifier. Typically, the API server 40 sends the session identifier with the encoded/decoded secret identifier to the webserver 30 so that the webserver 30 knows which session the encoded/decoded secret identifier is for.

The webserver 30 uses the decoded secret identifier to verify the identity of the user/service, and can then provide the authenticated website, such as the internet banking application, to the browser device 20.

Preferably the API Server 40 is configured so that it does not retain the secret identifier either in encoded or decoded form, particularly once it has an acknowledgement that the secret identifier has been received by the webserver 30. This minimises the opportunity for the API server 30 to be prone to an attack attempting to obtain the secret identifier.

Preferably the password manager 50 is configured so that it does not know or at least retain in unencrypted form, which webserver 30 the stored encrypted secret identifier is for. This minimises the opportunity for the password manager 50 to be prone to an attack attempting to obtain the secret identifier.

Figure 3:
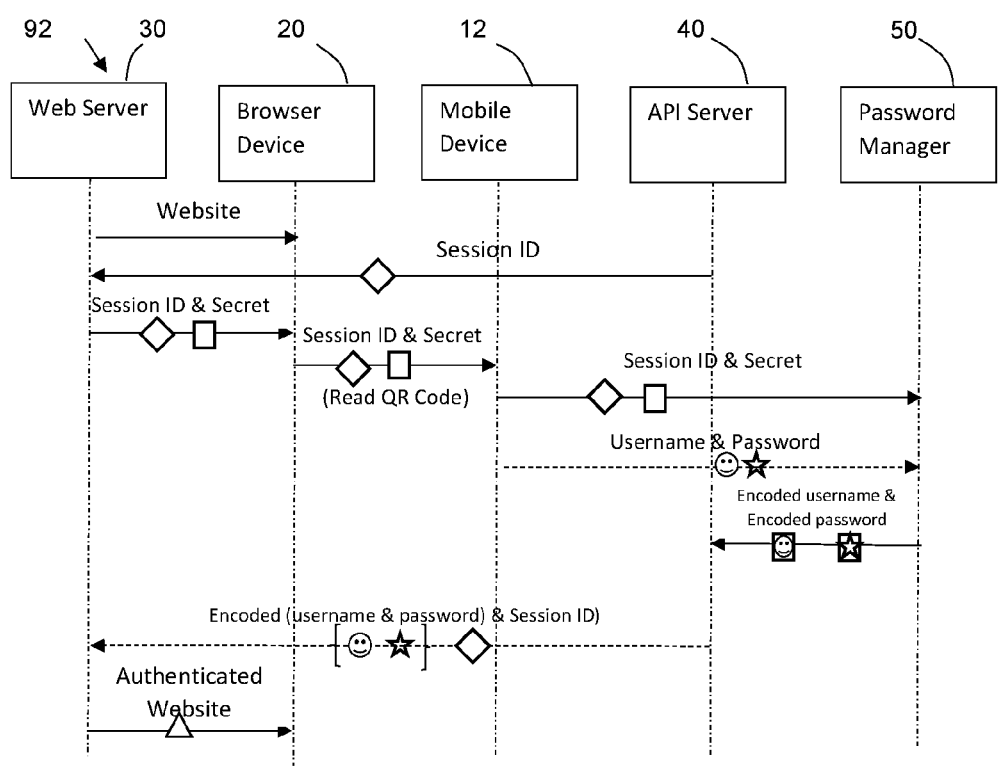
FIG. 3 is another message transfer diagram of another method according to an embodiment of the present invention.

Referring to FIG. 3, which shows another embodiment of the method of operation 92 of the system 10. The online service provider system (webserver 30) provides an online service, such as a website to a second device (browser device 20).

The interface server (API server 40) provides a session identifier to the webserver 30. The webserver 30 sends the session identifier and a secret to the browser device 20 with a URL of the password manager 50 in an encoded form (QR code). The browser device 20 displays the QR code.

The mobile device 12 reads the QR code with its camera, decodes the bar code and extracts the URL, then calls the URL with the session identifier and secret being parameters in the URL.

In this embodiment, when the user first uses this method a secret identifier (password) and a username are entered into the mobile device 12 which are then provided to the password manager 50.

Further, after the user first uses this method the username and password are stored by the password manager 50 in an encrypted form.

The password manager 50 encodes username and password using the secret key and then sends the encoded username and password to the interface server 40 (API server).

When the mobile device 12 sends the secret key to the API server 40, the API server 40 decodes the username and password using the secret key and then sends them in an encrypted form to the webserver 30. Alternatively, when the secret key is not sent to the API server 40, the encoded username and password are sent to the webserver 30, and the webserver 30 uses the secret key to decode the username and password.

The webserver 30 uses the decoded username and password to verify the identity of the user/service, and can then provide the authenticated online service to the browser device 20.

Figure 4:
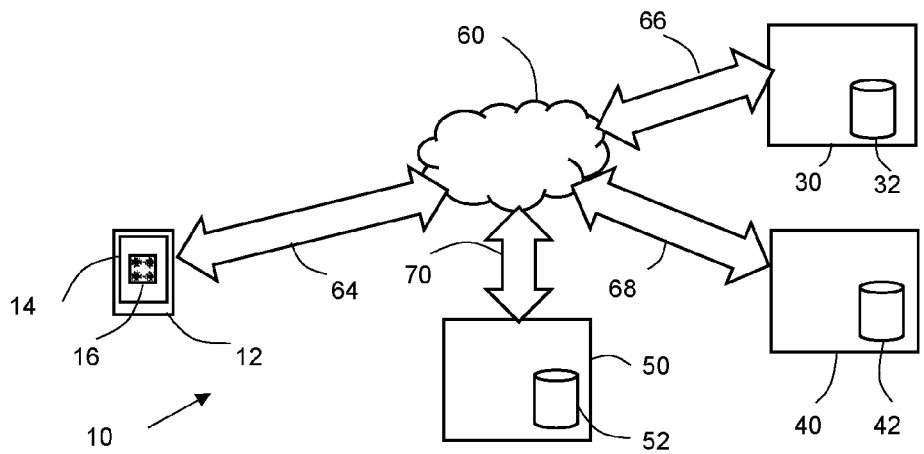
FIG. 4 is a diagram of a system according to an embodiment of the present invention.

Referring to FIG. 4 there is shown a computer system 11, similar to system 10 but without the second devices. System 11 comprises one or more first devices (for convenient only 12 is shown), online service provider systems (for convenient only 30 is shown), an interface server 40, an identifier manager 50 and a network 60 connecting these together.

Figure 5:
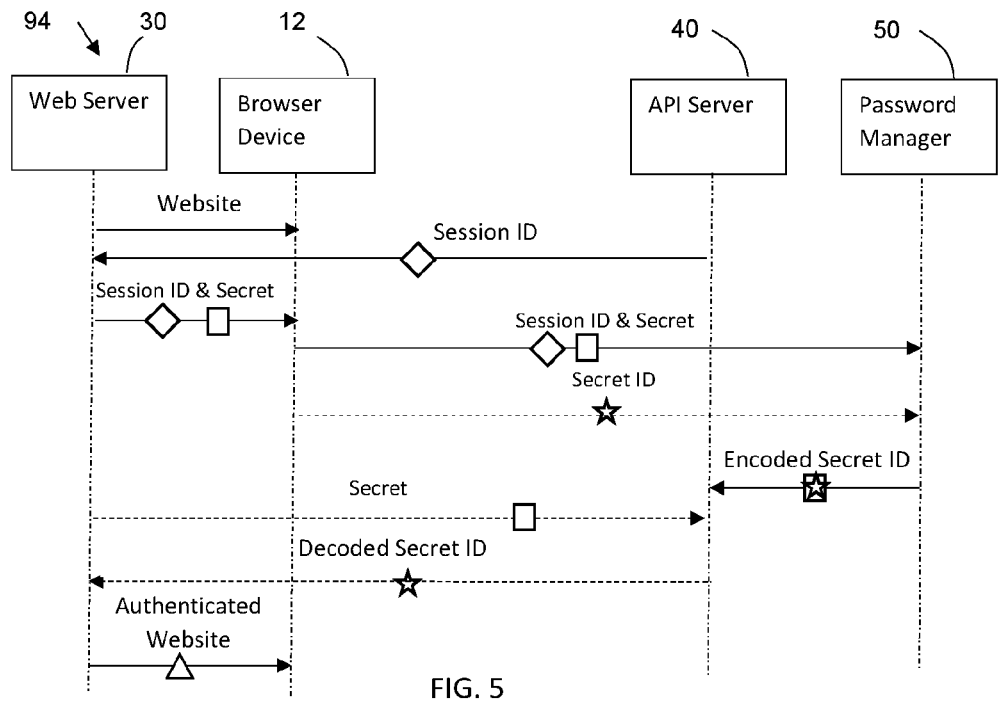
FIG. 5 is another message transfer diagram of another method according to an embodiment of the present invention.

Referring to FIG. 5, which shows an embodiment of the method of operation 94 of the system 11. The online service provider system (webserver 30) provides a website to a first device (mobile device 12) which is the browser device used to access the website.

The interface server (API server 40) provides a session identifier to the webserver 30. The webserver 30 sends the session identifier and a secret to the browser device 12 with a URL of the password manager 50 in an encoded form (QR code). The browser device 12 reads the QR code in software, decodes the bar code and extracts the URL then calls the URL with the session identifier and secret being parameters in the URL.

In this embodiment, when the user first uses this method a secret identifier is entered into the mobile device 12 which is then provided to the password manager 50.

Further, after the user first uses this method the secret identifier is stored by the password manager 50 in an encrypted form.

The password manager 50 encodes the secret identifier using the secret key and then sends the encoded secret identifier to the interface server 40 (API server).

When the website 30 sends the secret key to the API server 40, the API server 40 decodes the secret identifier using the secret key and then sends it in an encrypted form to the webserver 30. Alternatively, when the secret key is not sent to the API server 40, the encoded secret identifier is sent to the webserver 30, and the webserver 30 uses the secret key to decode the secret identifier.

The webserver 30 uses the decoded secret identifier to verify the identity of the user/service, and can then provide the authenticated website to the browser device 20.

Figure 6A:
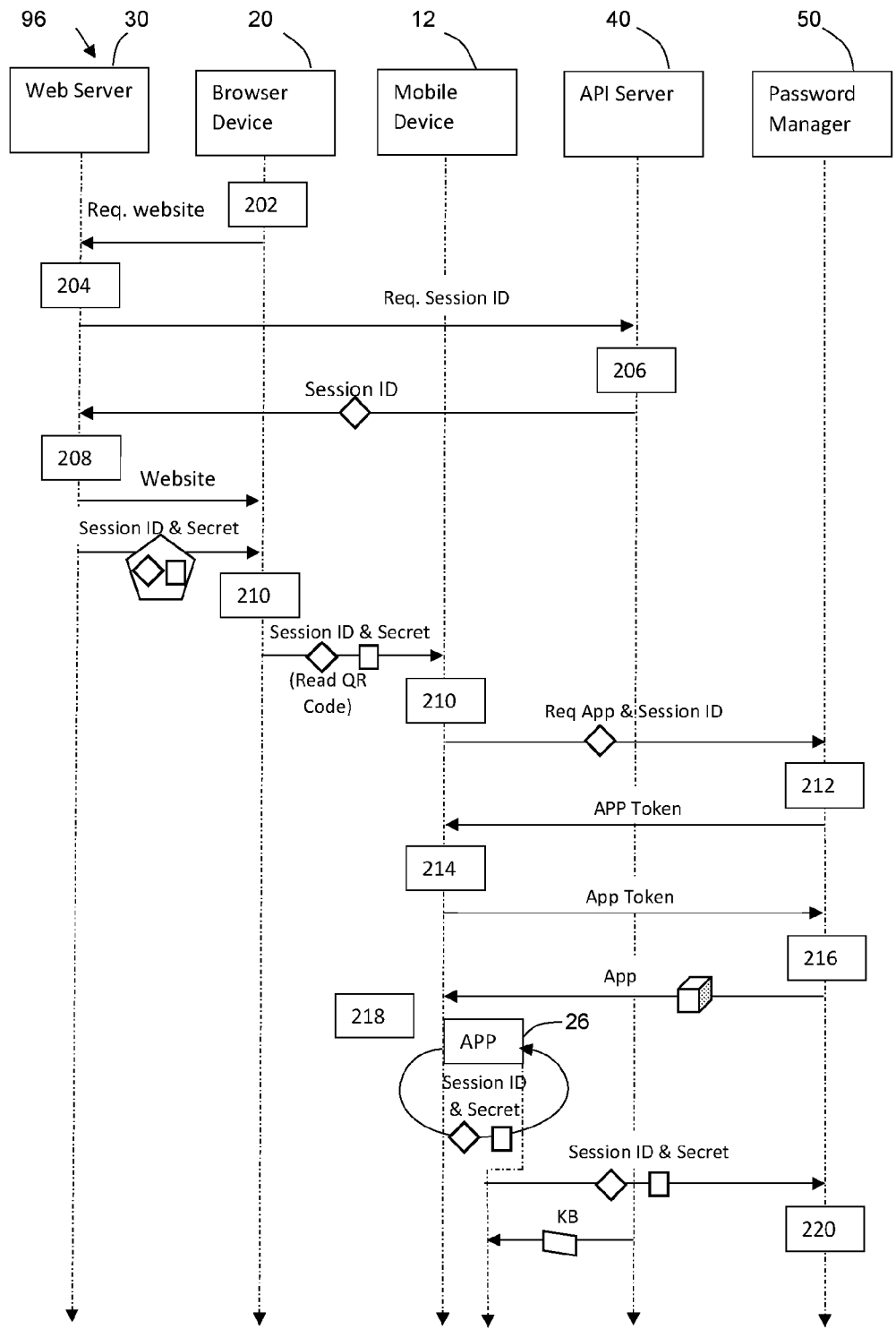
FIGS. 6A and 6B are respective parts of another message transfer diagram of another method according to an embodiment of the present invention.
Figure 6B:
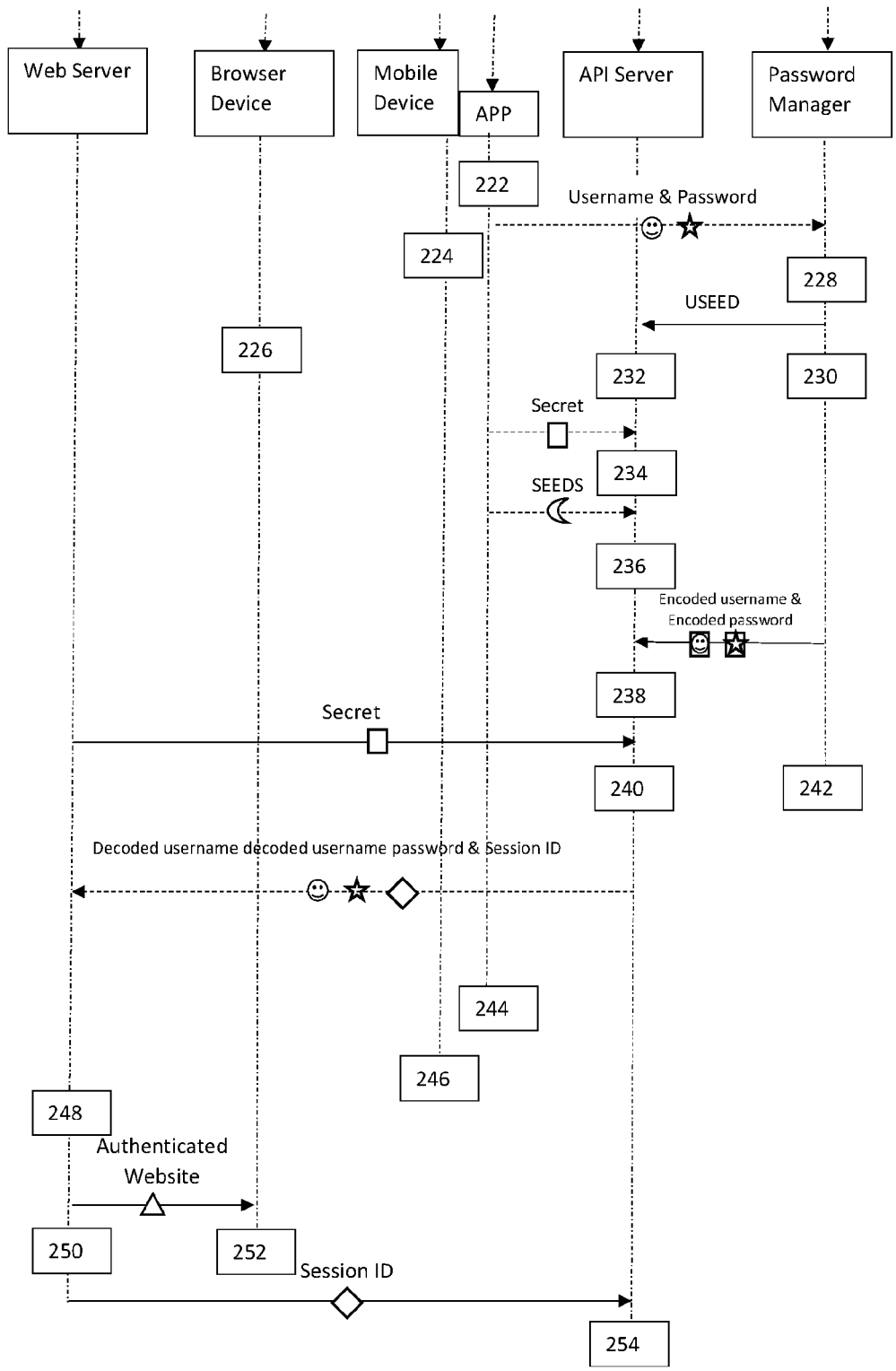

Referring to FIGS. 6A and 6B, a more detailed embodiment of a method 96 of using the system 10 or system 11 is described.

Commencing at 202 the browser device 20 requests a website from the web server 30. This might comprise for example the entry of a URL of a bank's internet banking website and the browser requesting the website from the web server 30. The web server 30 having received this request sends a request at 204 to the API server for a session identifier. The API server in response to receiving this request generates 206 the session identifier and sends it to the webserver 30. In an embodiment the API server in response to receiving this request also generates a token and sends it to the webserver 30 with the session identifier.

At 208 the webserver 30 generates a secret and encodes a URL of a password manager 50 into an encoded form, such as a QR code. The URL includes the session identifier and the secret as parameters of the URL. Commands to display the QR code are formed into a login webpage which is send to the browser device 20. At 210 the login webpage is displayed on the browser device 20, including display of the QR code.

The mobile device 12 reads the QR code with its camera, and at 210 decodes the QR code and extracts the URL. The mobile device 12 requests the resource at the URL, which is an interface with the password manager 50, preferably via an application (App) but could be for example a secure webpage. The URL acts as a request for the App to be downloaded or activated. The session identifier is sent with the request for the App so that when the App is downloaded into the mobile device 12 and talking to the password manager 50 it knows which mobile device it is talking to.

If the mobile device 12 has not requested the App from the password manager 50 before, at 212 the password manager 50 sends an APP token in the form of a cookie to the mobile 12, which at 214 stores it. Alternatively, if the mobile device 12 has requested the App before then it provides the App token which at 216 is authenticated and the App is then provided to the mobile device 12 for download. Preferably the App is lightweight and efficient being small in size so that it downloads quickly, takes up only a small amount of memory and only has functionality as required.

At 218 the App is loaded and is run on the mobile device 12 as 26. The session identifier and the secret are passed from memory of the mobile device 12 to the App 26. The session identifier and the secret are then provided by the App 26 to the password manager 50.

In an embodiment, when the user first uses this embodiment a secret identifier, such as a password, is entered into the mobile device and then provided to the password manager 50. The secret identifier could take other forms. It could be a username and password combination. It could be a cryptocurrency key, or personal identification number (PIN), or a CVV number as just some examples. Preferably the secret identifier is entered as presses, where the mobile device 12 is unaware of the characters entered. Preferably the secret identifier is entered as location presses, which are translated into key presses external to the mobile device. Preferably the presses are translated by the interface server 40 into characters. The secret identifier may be entered by use of a virtual machine keyboard.

In an embodiment the App 26 provides a keyboard for the user to enter their username for the website. In an embodiment the username may be entered with a keyboard of the mobile device 12 and encoded using a username seed (USEED). In an embodiment the App 26 obtains a virtual machine keyboard for entering and encoding the user's password for the website. In an embodiment each character of the password may be encoded using password seeds (SEEDS). The USEED may be generated 228 by the password manager 50 and provided to the API Server 40. The SEEDS may be generated at 222 by the App 26 and provided to the API server 40 and temporarily stored at 236.

In one embodiment the webserver 30 sends the secret key to the interface server 40, typically implemented as an API server 40. In this embodiment the API server 40 can decode the encoded secret identifier using the secret key and can then send the decoded secret identifier to the webserver 30. The API server 40 is able to decode the username using the USEED. Depending on the implementation, in one embodiment the API server 40 is sent the secret and it will decode the password with the SEEDS, otherwise the API server 40 sends the username and encoded password to the online server 30 for the online sever 30 to decode password.

Alternatively, when the secret key is not sent to the API server 40, the API server 40 does not decode the encoded secret identifier, but instead sends the encoded secret identifier to the webserver 30, and the webserver 30 uses the secret key to decode 244 the secret identifier. Typically, the API server 40 sends the session identifier with the encoded/decoded secret identifier to the webserver 30 so that the webserver 30 knows which session the encoded/decoded secret identifier is for.

The online server 30 uses the received username and password to verify the identity of the user at 248. When verified the authenticated website (such as the internet banking website) is provided to the browser device 20 for use by the user at 252. The online service 30 sends the session identifier to the API server 254 so that the API server 40 can delete all instances of the username and password related to that session.

Figure 7:
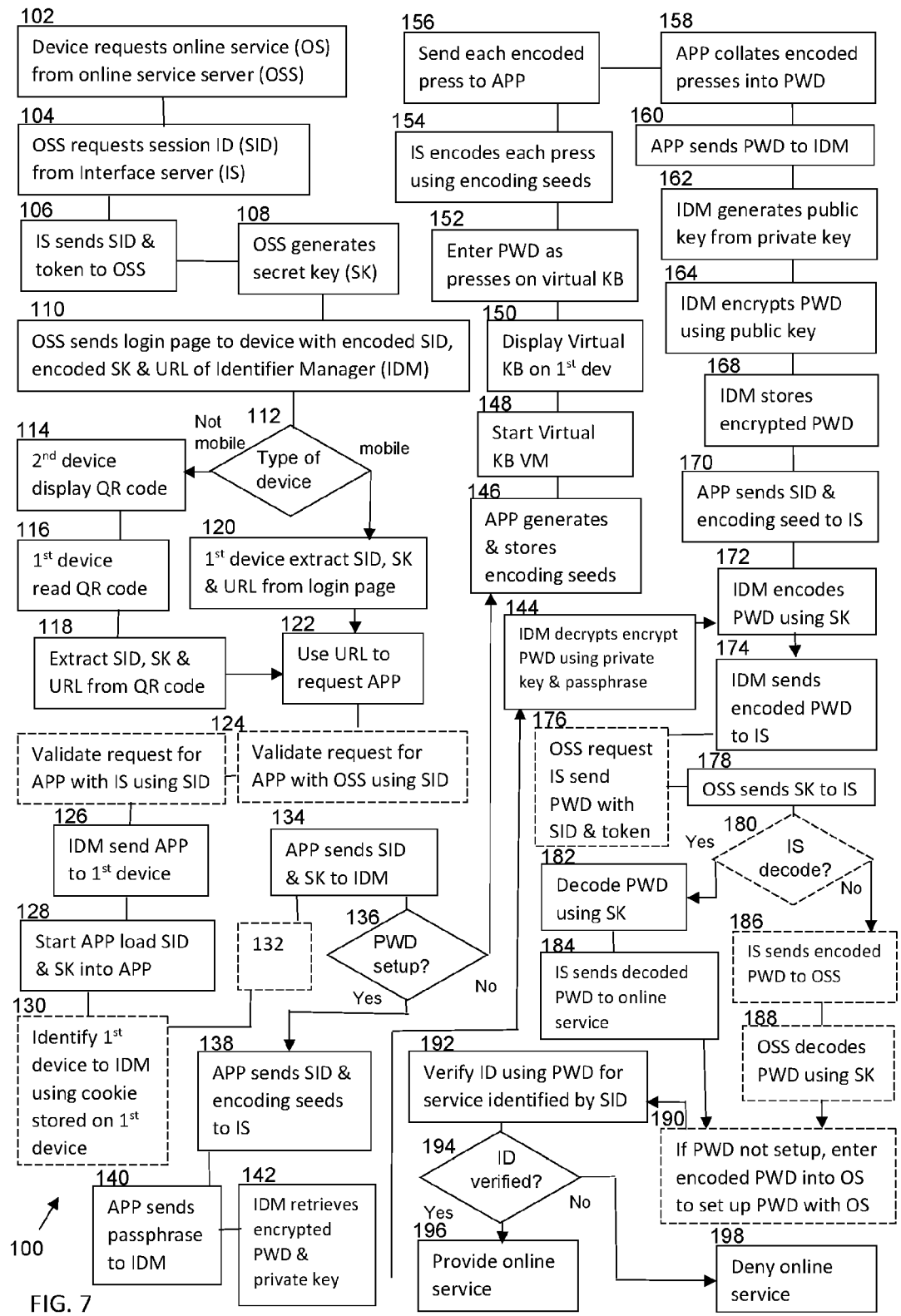
FIG. 7 is flowchart of a method according to an embodiment of the present invention.
Figure 7A:
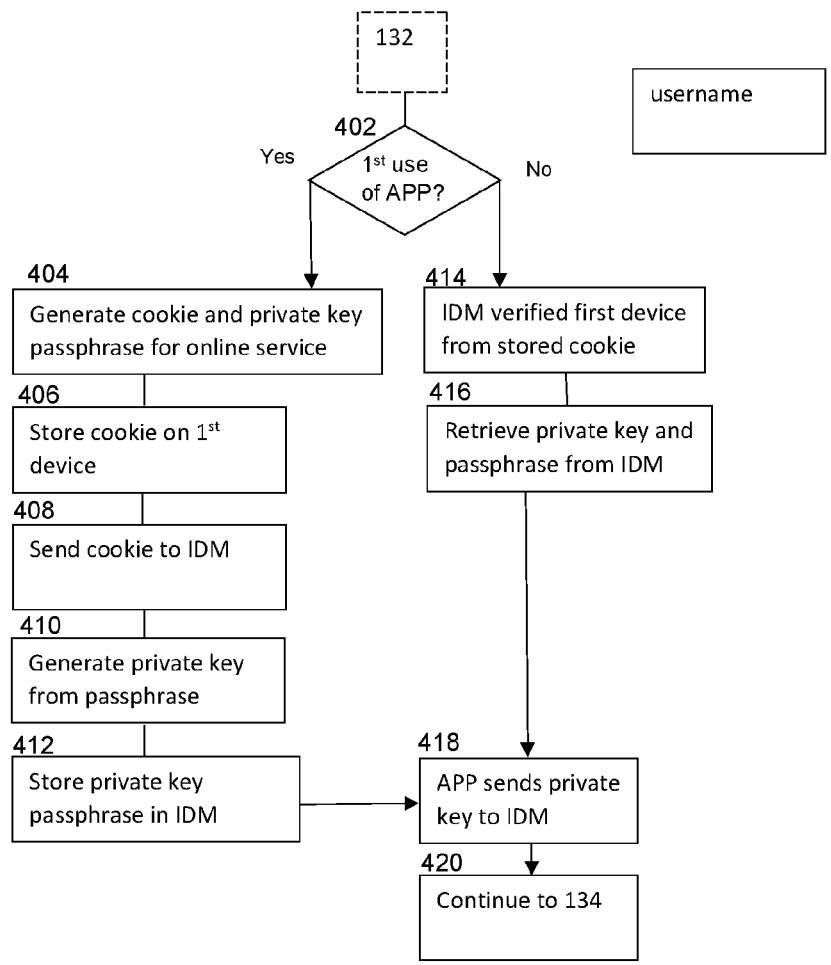
FIG. 7A is flowchart of part of the method of FIG. 7.

Referring to FIGS. 7, 7A and 8 there is shown a flowchart (FIGS. 7 and 7A) and a schematic system diagram (FIG. 8) showing a more detailed embodiment of a method of transmitting encrypted/encoded input information entered by a number of users 15 to the one or more access provider systems 30 to allow the one or more access provider systems 30 to determine whether to authorise access to content on corresponding second electronic devices 20, which may coincide with the implementation described in relation to FIGS. 6A and 6B. Advantageously the access provider systems 30 may comprise financial institution systems for providing customers with secure access to their financial account information or for otherwise securely dealing with their financial accounts (such as for instance the transfer of funds). Preferred systems are considered to be particularly suitable for banks and other financial service providers as well as systems where security and/or privacy are important.

Commencing at 102 a user 15 requests their browser device 20 navigate to an online service (such as a website) and so the browser device 20 sends a request 300 for the website from one of the online service servers 30. The online service server 30 sends 104 a request 302 for a session identifier from the interface server 40. The interface server 40 sends 106 the session identifier 304, and in an embodiment a token 334, to the online service server 30. The online service server 30 generates 108 a secret key 306. The online service server 30 sends 110 a login page 308 to the browser device 20 and encodes a URL of a password manager 50 into a QR code along with the session identifier 304 and the secret key 306 as parameters of the URL. In an embodiment next steps of the method depend on whether the device is a mobile device or not a mobile device. FIG. 8 shows the browser device not being a mobile device.

In the branch 112 of it not being a mobile, the second device 20 displays 114 the QR code as a part of the login webpage. The first device 12 reads 116 the QR code with its camera. The mobile device 12 extracts 118 the session identifier 304, secret key 306 and URL from the QR code.

In the branch 112 of the device being a mobile, the first device 12 extracts 120 the session identifier 304, secret key 306 and URL from the QR code.

In either case, the URL is send 122 a request 312 for an App from the device 12 to the identifier manager 50.

As optional steps, the device 20 may validate 124 the request for the App with the online service server 30 using the session identifier 304. If the session identifier 304 is valid for the requested online service 30, then the request is validated. Alternatively, the request of the device 12 may be validated 124 by sending the session identifier 304 to the interface server 40 and if the session if is valid for the online service the request is validated.

The identification manager 50 sends 126 the App 314 to the first device 12. The App is started (as 26 in FIG. 6A) and loads 128 the session identifier 304 and the secret key 306 into the App 26.

In an embodiment the first device 12 is identified to the identification manager 50 using a cookie stored on the first device 12.

In an embodiment, step 132 is performed. Step 132 is shown in FIG. 7A. If this is the first use of the App on the first device 12, then a cookie 338 is generated 404 as well as a passphrase 330 for the online service 30. The cookie 338 is stored 406 on the first device 12 and the cookie is sent 408 to the identifier manager 50. A private key 336 is generated by the password manager 50 from the passphrase 330. The private key 336 is stored in the password manager 50 and the passphrase 330 is stored 412 on the first device 12.

If this is not the first use of the App on the first device 12, then the identifier manager 50 verifies 414 the first device 12 from the cookie 338 stored on the first device 12. The passphrase 330 is retrieved 416 by the identifier manager 50 from the first device 12.

In either case, the identifier manager 50 retrieves 418 the private key 336 from storage 52 of the identifier manager 50.

Returning to FIG. 7, the App sends 134 the session identifier 304 and secret key 306 to the identity manager 50. It is noted that this step may occur later in the process.

It is then determined 136 whether the password has been setup. If it has, then the App sends 138 the session identifier 304 and encoding seeds 322 to the interface server 40. The App sends 140 the passphrase 330 to the identifier manager 50. The identifier manager 50 retrieves 142 the encrypted password and private key 336.

The identifier manager 50 decrypts 144 the password encrypted using the private key 336 and passphrase 330. The process proceeds to step 172 described further below.

Going back to 136, if the password has not been setup, then the App generates 146 and stores encoding seeds 322. In an embodiment described further below the App generates the password. However, in this embodiment, the App calls a keyboard virtual machine server 450 (which may comprise a part of the interface system 40 and/or may be as described in PCT/AU2018/050349 and/or PCT/AU2020/050314) to provide a virtual machine keyboard, which is started at 148. The virtual keyboard 316 is provided to and displayed 150 in the first device 12. The user 15 enters 152 the password as presses 318 on the virtual keyboard 316. The virtual machine encodes 154 each press using the encoding seeds 322. Each encoded press 336 is sent 156 to the App. The App collates 158 encoded presses 336 into the password 328. The App sends 169 the password 328 to the identifier manager 50. The identifier manager 50 generates 162 a public key 337 from the private key 330. The identifier manager 50 encrypts 164 the password 328 using the public key 337 and stores it in storage 52 at 168. The App 26 sends 170 the session identifier 304 and encoding seeds 322 to the interface server 40. The process proceeds to step 172.

At 172 the identifier manager 50 encodes the password 328 using the secret key 306. The identifier manager 50 sends 174 the encode password 324 to the interface server 40.

In an optional step the online service server 30 requests 176 the interface server 40 send the password with the session identifier 304 and preferably the token 334. The token 334 allows the interface server 40 to know that the request is from the online service server 30. In an embodiment the online service server sends 178 the secret key 306 to the interface service 40.

In one implementation the interface server 40 decodes the password 324. A determination of whether the interface service 40 may be made at 180. If that is the case the interface server 40 decodes 182 the password 324 using the secret key 306. The interface server 40 sends 184 the decoded password 328 to the online server 30. If the interface server 40 is not to do the decoding, then at 186 the interface server 40 sends the encoded password 324 to the online service server 30. The online service server 30 decodes 188 the encoded password 324 using the secret key 306.

Either way, as an optional step, if the password is not setup with the online service, the online service uses 190 the decoded password 328 as the password entered into the online service 30 for future logins. The identity is verified 192 using the password 328 for the service identified by the session identifier 304. In the case that the identity is verified 196 then the online service 326 is provided 196 to the user. In the case that the identify is not verified then the online service is denied at 198.

Figure 10:
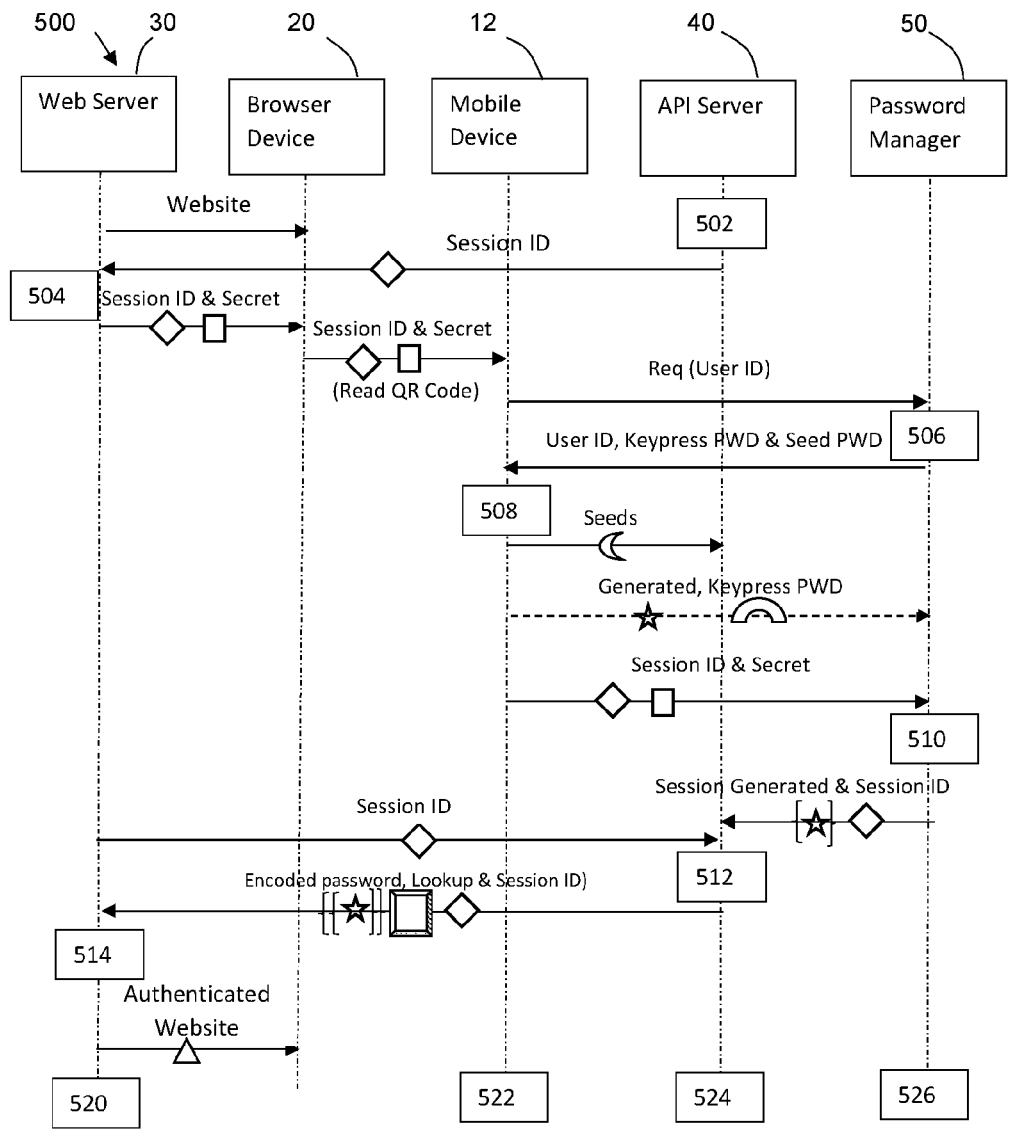
FIG. 10 is message transfer diagram of a method according to an embodiment of the present invention.

Referring to FIG. 10, in this alternative method 500, the secret identifier (password) is generated by the system, and in particular the mobile device 12. Steps 502 to 508 are substantially the same as steps 202 to 218 in FIG. 6A and step 514 is substantially the same as step 248 in FIG. 6B.

The browser device 20 requests a website from the web server 30. The web server 30 having received this request sends a request to the API server for a session identifier. The API server 40 in response to receiving this request generates the session identifier and sends it to the webserver 30. In an embodiment the API server in response to receiving this request also generates a token and sends it to the webserver 30 with the session identifier.

At 504 the webserver 30 generates a secret and encodes a URL of a password manager 50 into an encoded form, such as a QR code. The URL includes the session identifier and the secret as parameters of the URL. The login webpage is displayed on the browser device 20, including display of the QR code.

The mobile device 12 reads the QR code with its camera, and at decodes the QR code and extracts the URL. The mobile device 12 requests the resource at the URL, which is an interface with the password manager 50, preferably via an application (App).

At 506 the User ID, a keypresses password and a seeds password are generated by the password manager 50 and are sent to the mobile device 12. The User ID is used in the next session to identify the device 12 to the password manager 50. The seeds password is used for generating encryption keys for the seeds by the mobile device 12. The keypress password is used to generate encryption keys for the secret identifier by the password manager 50.

At 508 the App is loaded and is run on the mobile device 12. The keypress password is stored in the mobile device 12. The seeds password is used to generate a seeds private key. The seeds private key and seeds password are used to generate a seeds public key for encrypting the seeds. The seeds are generated as a string of random of characters/values. The seeds are encrypted using the seeds public key and stored in the mobile device 12. The seeds are provided to the API server 40.

The password is generated as a set of random characters, typically compliant with best method practise in password generation (mixture of lower case and capitals, numbers and special characters, and of a minimum length). Each character of the password is encoded with the respective seeds of the set of seeds, preferably by hashing the character with the respective seed. This is the encoded secret identifier is referred to as the generated secret identifier. The generated secret identifier and the keypress password are sent to the password manager 50.

The session identifier and the secret are passed from memory of the mobile device 12 to the password manager 50. This may be in the same communication as the generated secret identifier and preferably the keypress password.

The user may enter and input, such as a username, which may be encoded and transferred to the password manager 50 as described in relation to FIG. 3/FIGS. 6A and 6B.

At 510, the password manager 50 may compare the keypress password received from the mobile device 12 with the keypress password it generated to ensure the communication of the generated secret identifier is authentic.

The password manager 50 generates a keypress public key with the keypress private key and the keypress password received from the mobile device 12. The keypress public key is used to encrypt the generated secret identifier, which his stored in the encrypted form for later sessions.

The password manager 50 encodes again the generated secret identifier (such that the secret identifier is double encoded) using the secret, preferably by hashing each character in the generated secret identifier with the secret. The encoded generated secret identifier will be unique to the session because the secret is unique to the session and is thus a session generated secret identifier. The session generated secret identifier and the session ID are send from the password manager 50 to the API server 40.

The online (web) server 30 requests the API server 40 send the secret identifier and sends the session ID.

At 512, the API Server 40 creates a lookup table from all of the possible characters that could be in the password and the seeds received from the mobile device.

API server 40 sends the encoded password (and preferably the username) and the session ID to the online server 30 for the online sever 30 to decode password.

At 514, the online server 30 uses the lookup and the secret to generate a second lookup table by hashing each entry in the first lookup table with the secret. The lookup table is then used to decode the password from the received session generated secret identifier.

Alternatively, the secret may be sent to the API server 40 for it to decode the session generated secret identifier and then send it to the webserver 30.

The online server 30 uses the received username and password are stored as authentication details to verify the identity of the user in subsequent sessions. When verified the authenticated website (such as the internet banking website) is provided to the browser device 20 for use by the user. The online service 30 may send a message to the API server 40 for the API server 40 to send to the mobile device 12. The message may be for example a password successfully set message.

In a subsequent session the request from the mobile device to the password manager to authenticate the user may include the User ID. The mobile device 12 uses the stored encrypted seeds, the stored seeds private key and the received seeds password to decrypt the seeds for sending to the API server 40.

The password manager 50 uses the stored encrypted generated secret identifier, the stored keypresses private key and the received keypress password to decrypt the generated secret identifier for encoding to generate the session generated secret identifier.

The online server 30 uses the decoded password (and optionally the username) to check against the stored password to authenticate the user.

At 520 to 526, the respective online server 30, mobile device 12, password manager 50 and API server 40 delete temporary data (that is, data not stored for use in subsequent sessions).

Figure 11:
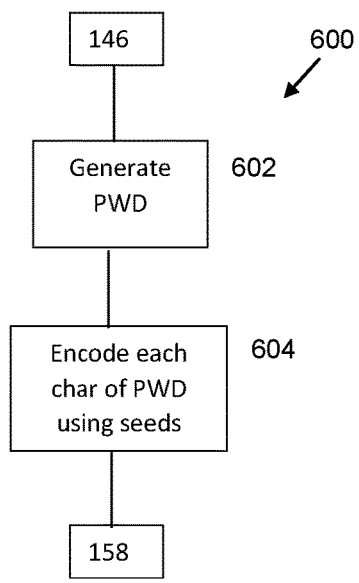
FIG. 11 is a flowchart of an alternative part of the method of FIGS. 7 and 7A.

Referring to FIG. 11, the method shown in FIG. 7 deviates with the embodiment of FIG. 10 is used after step 146. Instead of step 148, step 602 is used. In step 602 the password is generated by the mobile device 12 generating the password as a set of random characters. Less preferred options are for the online server 30, password manager 50 or the interface system 40 to generate password and provide it to the mobile device 12. These are less preferred as they either complicate the process and/or create a possible vulnerability.

The password is then encoded, preferably by hashing each character in the password with a respective one of the seeds in the set of seeds. These equate to the encoded presses in FIG. 7. The process in FIG. 7 then resumes at step 158. Further the 'yes' branch at 180 is not preferred in this embodiment.

In an embodiment the interface server 40 comprises an application interface 45 comprises a REST based application programming interface. Different forms of interface (such as by using Simple Object Access Protocol (SOAP), GraphQL or Remote Procedure Calls (RPC)) may be utilized in other embodiments.

From the view point of the interface server 40, the application interface 45 receives requests for session identifiers 304 from the access provider systems 30, generates 106 each session identifier 304 in response to each request and provides the respective access provider system 30 with the generated session identifier 304.

The application interface 45 also receives 350 each encoded identifier 324 from the password manager 50 along with the session identifier 304. The application interface 45 is then able to provide 186 the encoded identifier 324 to the respective access provider system 30 based on the session identifier 304 received with encoded identifier 324.

From the view point of the access provider systems 30, they receive requests 300 from the online services. For each request received a session identifier is requested of the application interface 45 and a corresponding session identifier 304 is received. Each access provider system 30 uses the session identifiers 304 for identifying input encoded identifier 324/decoded identifier 328 (depending on implementation) corresponding to each request 300 for an online service and if authenticated to provide the online content requested. The access provider systems do this by providing to a first device 12 a URL encoded with a secret key 306 to be used when the identifier is encoded (and thus can be used when the identifier is decoded) and the session identifier 304.

In an embodiment a hash based encoding and decoding approach is employed with the decoding making use of hash tables. In this embodiment the secret key 306 is generated by each access system provider for each session identifier 304. Each secret key 306 provides both an encoding and decoding key (using hash tables) that is associated with a session identifier 306.

The system service 40 can be decryption-agnostic by not having access to the secret keys 306. In that embodiment, the system service 40 is advantageously unable to readily decode the received encrypted identifier 324. This implementation may be desired by organisations running the webserver 30 that prefer/require the decoding not to be external.

In this embodiment, each session identifier 304 is associated with a single input session in relation to a corresponding browser device 12/20. Preferably session identifiers 304 are not reused on termination of an input session.

From the view point of the identifier manager 50, each input session via the App uses the respective secret key 306 entered into the corresponding first device 12 to encode the entered identifier/password 328 when it is provided to the interface system 40. Further the identifier 328 can be stored in an encrypted manner for reuse in subsequent sessions (each identified by a subsequent session identifier 304) when the first device 12 that was used to first provide the identifier 328 is authenticated with the password manager 50. Further first device 12 is able to provide a seed (in the form of a passphrase 330) for the encryption which is also able to be used as part of the identification of the first device 12 that first provided the identifier/password 328.

In the first input session an authorisation mechanism for the user 15 to enter a name and password (or another form of identifier) for user authorisation is provided via a second channel remote from the corresponding second device 20, or the App running in the first device 12 (the remote channel being the virtual keyboard 316 displayed on the first device 12 but running remotely on the virtual machine server 450).

Having described the above, it is to be appreciated that various approaches are possible in computing systems to achieve the same result. In this embodiment the system service 40 generates the unique session identifiers 304. In other embodiments an application provider 30 may generate a session identifier that is unique to the application provider which may be combined with a unique access provider system identifier (unique to the system service 40) to generate a unique session identifier. Such generation approaches could be performed by the access provider systems 30 and not the system service 40. Other variations are possible.

Referring to FIG. 9, the method 100 includes providing the software application 26 (App) on each of the first electronic devices 12. In this embodiment the software applications 26 provide a virtual keyboard 316 having standard entry keys a to z, 0 to 9, special characters including !"£$%^& and a shift key. Other input systems could of course be provided such as different alphabets/characters. The software applications 26 provide the keyboard for use in authorizing a user to access content on a second electronic device 20. In this embodiment each software application 26 provides a virtual keyboard through a virtual machine connection to an external machine. In an embodiment the virtual keyboard 316 registers each key touch and sends the key (character) touched as the input information 318. In a preferred embodiment the virtual keyboard 316 registers each position of the touch of a microcell (area) under the displayed key in the input information 316 and the virtual machine (VM) 450 converts the position of the microcell touched into a key entered. In a further alternative the interface system 40 does the conversion to the key touched. With the latter two cases the virtual keyboard can be morphed between instances, such as by changing the position of each microcell of each virtual key (for example, by shuffling between alphabetic order keyboard, QWERTY, AZERTY and DVORAK keyboard) thereby preventing the same key being in the same position every time.

At step 460 the method 100 advantageously includes transmitting input content-agnostic and length-aware information 372 to corresponding second electronic devices 20 after receiving input information 318 from the VM 450. In this embodiment, when a first electronic device 12 is used by a user to input access information 318, the access system 30, via the interface system 40 sends the second electronic device 20 associated with the session identifier 304 the content-agnostic and length-aware information 372. The information 372 comprises an indicator 372 of the total character length that has been entered into the associated first device 12 for being shown by the second device 20 in a selected display element 75. The entered information is shown on the first device 12 in field 74. In embodiments employing HTML display elements 76 to display information, symbols having no association with the content such as a number of asterisks are displayed to indicate the character length. Should a backspace have been entered, this would be a negative character length change, should a first character be present for a field selection. In the present embodiment both display element 76 updates to the first device 14 are shown using asterisks. The position is shown using a vertical line (pipe). Thus the user is able to enter his or her password into the first device 12 with only symbols (content agnostic information) being known to the second device 20. In other embodiments no field information may be shown on the second device 20 at display element 75. This is presently not preferred as confirmation of keypresses and display field changes provides an advantageous approach.

In yet another embodiment, the transmitted input information 372 may be length-agnostic in that only an indicator of completed input information for a field is transmitted to the associated second device 20 from the system service 40. For example, a user may enter their email address neil_g@bv.net.au and a display element may show "ENTERED" or another similar/standard expression. In this manner the second electronic devices 20 are updated with content-agnostic information.

Returning to FIG. 9, the method 100 at step 462 includes monitoring display elements 76 on each second user device 20 for selection changes made directly (by using the keyboard or mouse of the second device 20) by the corresponding user 15. The method 100 at step 466 further includes receiving display element selection information 82 from each second device 20 as further input information from the respective users 15. In input sessions, users are able to select display fields 76 directly on the respective second input devices 20 and have that selection reflected on the corresponding first electronic device 12.

The method 100 includes informing each of the corresponding first electronic devices 12 of the selection of the display elements 76 by users 15 directly on the respective second electronic devices 20. The display element selection information 82 is recorded by the system service 40 as an input in connection with the corresponding session identifier 304. The corresponding first device 12 is advised of the input via the system service 40. Other methods of advising the first device 12 are possible.

A monitor (which in this embodiment is written in JavaScript or another language) is connected to an interface server/system service from the web browser of the second device 20 and sends the display element selection and session identifier to the system service. The display element selection on the second device 20 is considered a user input. The user is also able to select a display element on the first device 12. The selection on the first device 12 is considered a user input and is transmitted along with a session identifier to the system service. In this manner there is provided advantageous selection of input elements. Advantageously the web browser is entirely content-agnostic for the purpose of authorisation to content.

In an embodiment, the monitor knows which form element is active, and is informed by the system service when a key has been pressed on the mobile app 26. The monitor also advantageously knows the session id for communicating with the system service.

The monitor is provided as JavaScript for easy integration with the application provider's system and communication with the system service. The monitor communicates with the system service via a websocket. Other TCP/IP communication approaches are of course possible. As would be known, the 'WebSocket' protocol is a computer communications protocol, providing full-duplex communication channels over a single TCP connection. The WebSocket protocol was standardized by the IETF as RFC 6455 in 2011. Other communications protocols that could be used include the Hypertext Transfer Protocol with a Restful or non-Restful API. TCP/IP protocols are of course preferred, however other protocols could also be used.

In this embodiment the monitor provides a websocket for communicating display field changes to the system service. More particularly, in this embodiment, websockets are used to provide communication between (i) the first device and the system service; (ii) and the second device and the system service. With the first device, a browser such as Chrome provides support websockets. With the second device, a websocket library can be used for the mobile application 26. With the system service websocket server libraries are available for web servers. The channels of communication could of course be provided by other protocols.

In this embodiment a fall-back mechanism is provided using standard web transfer protocols using standard request handlers. In the fall-back mechanism when active element is changed in the form, the web browser sends send a POST request to the API server with the name of the new active element.

In this embodiment, the system service maintains a store of inputs made by the user on the second device along with the session identifier that is sent with the inputs made on the second device to the system service. The system service informs the web browser of inputs in a content-agnostic but length aware manner.

The user is able to initiate a submit request on the second device 20 by pressing submit element. A submission request is also able to be sent to the system service by pressing submit element on the first device 12. After a submit request the encrypted/encoded inputs are collated and pushed from or pulled to the identifier manager 50 in association with the session identifier 304. Advantageously the neither the identifier manager 30 nor system service 40 need to know the secret keys associated with the session identifiers. The account provider, and the first device 12 know the session identifier and secret key associated with the first device 12. Once the account provider has the inputted information associated with the session, the account provider can use the secret key to decrypt/decode the inputted information and make a determination as to whether to provide access.

The method 100 can be applied to circumstances involving a plurality of access provider systems 30. In such circumstances there is provided a method 100 of enabling a plurality of access provider systems 30 to secure access to content on second electronic devices 20.

From one viewpoint, the method includes receiving, via an application interface 45, encrypted/encoded input information 324 that is inputted by users 15 on first electronic devices 12 along with session identifiers 304 each identifying an input session, the first user devices 12 providing a first encrypted communication channel (64, 70) independent of the second electronic devices 20 with the identifier manager 50; the identifier manager 50 providing a second encrypted communication channel (70, 68) to the interface system 40; and transmitting, via the application interface 40 in a third communication channel (68, 66), input information 324 inputted by the users 15 using the first electronic devices 12 to the access provider systems 30 associated with corresponding session identifiers 304.

In another embodiment there is provided a computer implemented system comprising an identifier manager 50 for enabling one or more access provider systems 30 to secure access to content on electronic devices 12, 20. The computer implemented system comprises: a receiver for receiving encrypted/encoded input information 328 that is inputted by users 15 on electronic devices 12. The identifier manager 50 includes a storage 52 for storing the information 168 in an encrypted form and a transmitter for providing input information 324 to the one or more access provider systems 30 via an interface system 40 to allow the one or more access provider systems 30 to determine whether to authorise access to content on the electronic devices 12, 20.

The identifier manager 50 has an encryptor for encrypting/encoding the stored information 168. The encryptor uses an encryption key 336 based on a passphrase 330 provided by the respective first device 12.

The identifier system 50 has a retriever for retrieving the stored information 168, a decryptor for decrypting/decoding the encrypted stored information 168 using the passphrase 330.

The system 40 includes a service providing an application interface 45 for receiving the encrypted/encoded inputted information 324 and transmitting the received encrypted/encoded input information 324 to each access provider system 30. Additionally, each access provider system 30 has access to decryption keys 306 for decrypting/decoding the transmitted input information 324.

The computer system 40 includes a generator for generating session identifiers 304. Each session identifier 304 is provided for identifying a user input session in association with a corresponding access provider system 30 and a corresponding electronic device 12.

The VM 450 or App 26 includes a collator for collating encrypted/encoded input information elements 318 inputted by the users 15 using the electronic devices 12 based on the corresponding session identifiers 304 to form the combined input information 328 (eg. password). The transmitter is provided for transmitting collated input information 328 associated with the session identifiers 304 to the one or more access provider systems 30, via the interface system 40, based on the corresponding session identifiers 304.

The computer interface system 40 includes a session identifier request receiver for receiving requests 302 from the one or more access provider systems 30 to provide input session identifiers 304.

The systems and methods described above provide embodiments of the present invention. Each component could be considered a system operating in the context of its own method. In the embodiments described the access provider systems provide content that is processed and displayed on html browsers on the electronic user's devices. The systems and methods of the access provider systems could be considered a further embodiment of the present invention.

The access provider systems provide secure access to content to the users. In an access provider method according to one embodiment there is provided at a first step maintaining a web application for providing users with access to content via html browsers installed on user devices.

The method includes maintaining session identifiers and a secret key that is associated with each session identifier.

An access provider system embodiment is provided as a web application for providing users with access to content via html browsers installed on user devices. The web application includes an authorizer having a decryptor for decrypting/decoding input information inputted by the users on user devices, the authorizer for using the decrypted input information to determine whether to authorise access to content. A maintainer is provided for maintaining session identifiers and a secret key that is associated with each session identifier. The system includes a provider for providing one or more display elements.

In a further embodiment there is provided a computer implemented method of securing access to content stored by one or more access provider systems. At a first step the method includes providing a web system service for the one or more access provider systems that enables the access provider systems to authorize secure user access to content on electronic devices, each electronic device being associated with a user. At a second step the method includes providing each user with an application for communicating with the web system service using first electronic devices, each being associated with a user. At a third step the method includes receiving encrypted/encoded input information inputted by the users on user devices. At a fourth step the method includes forwarding the received encrypted/encoded input information to the one or more access provider systems with the one or more access provider systems having the ability to decrypt/decode the encrypted/encoded input information for determining whether to authorise access to the users to content on the first user devices.

The service system 40 that communicates with a number of access provider systems 30. The service system 40 provides an Application Programming Interface 45 that is accessible by TCP/IP. The API 45 receives and handles input information 324.

A number of secrets 306 are generated by the web applications of the access providers 30. Each secret 306 comprises a randomly generated string created by and known to the web application. Each secret 306 is associated with a corresponding session-ID 304 of an access provider system's 30 web application. Each session-ID 304 comprises a randomly generated session identifier known by the associated web application as well as the system service 40.

Each secret 306 is provided to each user 15 via device 20 for receiving and encrypting/encoding information inputted by the user. In this embodiment the encryption comprises a one-way hash function that is applied to an input 318 made by the corresponding user 15.

Decryption of the user input information entered on the device 12 by the web application is possible by using hash tables and knowledge of the secret of the input session. In this embodiment the hash function comprises a message digest ('one-way hash') function, such as MD5, SHA1, SHA256, SHA 384, SHA 512 or BLAKE2.

In an embodiment first device 12 session authentication occurs with SC (the system service-generated challenge) being randomly generated by the identifier manager 50 and sent to the mobile application 26. A CC (the client-generated challenge) is randomly generated by the mobile application 26. A CR (the client response) is computed by the mobile application 26 as HASH(CC+SC+SESSION-ID). The mobile application sends CC, CR and SESSION ID to the API. Various approaches are of course possible.

The identifier manager 50 calculates the expected value of CR and verifies that the mobile application 26 responded correctly. This is the preferred approach after scanning the QR CODE to send the Session-id along with CC and CR.

A SR (server response) is computed by the system service 158 as HASH(SC+CC+SESSION-ID) and is sent to the mobile application 26. The mobile application 26 calculates the expected value of SR and verifies that the identifier manager 50 responded correctly. The values of SC and CC are stored by the identifier manager 50.

A GET Phase of the procedure is followed by an Input Phase. The Input Phase comprises encoding key presses on the mobile applications installed on the second devices. Once authentication between the mobile application 186 (the client) and the system service 158 has succeeded, the client-server session shares a SC and CC value that are unique to that connection.

Various encoding methods are able to be utilised. In the present embodiment a keycode value could be provided as a unique index of the key pressed on a virtual keyboard provided by the mobile application 26. A Unicode value could be provided as the Unicode value mapped from the keycode value.

As part of the keypress encoding, on the mobile application 26 a loop could run as follows:
UnicodeKey:=GetLastKeyPressed( )
EncryptedKey:=HASH(HASH(SC+CC+UnicodeKey)+SECRET)
SecureChannelSend (Encrypted Key, API)

As noted above, the identifier manager 50 does not know the secret 306. This is considered advantageous as the identifier manager 50 and the service system 40 operate in a status of user data anonymity. To decode the keypresses a hash table is generated with all the possible encoded keypress values. The generated hash table is then used as a lookup table to retrieve the original values. In this manner decryption of the hashed key values occurs.

Importantly the session-id is send with the encrypted HASH(HASH(SC+CC+UnicodeKey)+SECRET). The system service spools the HASH(HASH(SC+CC+UnicodeKey)+SECRET) in an associated channel, the associated channel being associated with the session-id.

As part of the keypress encoding, the identifier manager 50 records an encoded key list in a queue associated with the session-id. Advantageously the user can use either the web application or the mobile application 26 to make a submit request. On receipt of a submit request associated with a session-id 304, the identifier manager 50 performs the following functions and returns the result to the web application.

PartialEncodedKeyTable:=EMPTYTABLE
For UnicodeKey in UnicodeKeySet:
PartialEncodedKey:=HASH(SC+CC+UnicodeKey)
PartialEncodedKeyTable [PartialEncodedKey]:=UnicodeKey
return PartialEncodedKeyTable, EncodedKeyList The web application (if it makes the submit request) initiates a transfer of the PartialEncodedKeyTable and EncodedKeyList for a session-id from the identifier manager 50. If the mobile application 26 makes the submit request, then the identifier manager 50 could initiate the request of the data. Various approaches of achieving a similar effect are of course possible including streaming individual keypresses to the access provider system.

More particularly, examples are provided below.

It is to be appreciated that once the application provider has authorised the user, the user can be provided with access to a resource such as a virtual computer embedded in the webbrowser. Upon authorization, the virtual machine can be provisioned as described in related application PCT/AU2014/050050 filed 23 May 2014.

When the smart phone 12 navigates to the website provided by the webserver 30 in a window (this operates as the second device 20). The webserver 30 also provides another window, such as an Inline Frame (iFrame), which acts as the first device 12 that calls the App and provides a virtual keyboard 316. The keyboard 316 in the iFrame sends the input information 318 to the VM 450. The VM 450 then sends it back to the App 26 to then send it to the identifier manager 50. The App informs the access provider system 30 and the webserver indicates an input has been made in the display element 75.

In an embodiment the username is entered with a keyboard of the device 12 shown in the iFrame. This iFrame is sandboxed from the parent webpage and communication can only be done via the known window.postMessage( ) browser mechanism.

As mobile phone operating systems generally only allow one application to hold the screen at a time, when the browser is doing this, then nothing else should be able to intercept the image in the iFrame. Thus, there is an input device that can only be interpreted by the webserver 30, thus ensuring user data input should not be able to be intercepted by any malware on the device. Further, the only place that context (by use of the session identifier 304) exists to marry the non-secret (such as username entered through the normal workstation keyboard) and the secret (such as a password or other sensitive/confidential information entered through the Web Client Keyboard (keyboard 316) on a mobile), is inside the identifier manager 50 or access provider system 30. When completed, the user can select the 'submit' element, indicating to the webserver that the user has finished entering information, and the verification of their identify can be performed based on the entered information 328. There may be an acknowledgement when there is a verification or a negative acknowledgement when there isn't.

The computer systems may be provided as a distributed computer environment containing a number of individual computer systems (computers/computing devices) that cooperate to provide the preferred arrangements. In other embodiments the computer system is provided as a single computing device.

A first one of the computing devices includes a memory facility. The memory facility includes both 'general memory' and other forms of memory such as virtual memory. The memory facility is operatively connected to a processing facility including at least one processor. The memory facility 468 includes computer information in the form of executable instructions and/or computer data. The memory facility is accessible by the processing facility in implementing the preferred arrangements.

Each of the computing devices includes a system bus facility, a data store facility, an input interface facility and an output interface facility. The data store facility includes computer information in form of executable instructions and/or computer data. The data store facility is operatively connected to the processing facility. The data store facility is operatively connected to the memory facility. The data store facility is accessible by the processing facility in implementing the preferred arrangements.

Computer information may be located across a number of devices and be provided in a number of forms. For example, the data store facility may include computer information in the form of executable instructions and/or computer data. The computer data information may be provided in the form of encoded data instructions, data signals, data structures, program logic for server side operation, program logic for client side operation, stored webpages and so forth that are accessible by the processing facility.

On one level, input interfaces allow computer data to be received by the computing devices. On another level, input interfaces allow computer data to be received from individuals operating one or more computer devices. Output interfaces, on one level, allow for instructions to be sent to computing devices. On another level, output interfaces allow computer data to be sent to individuals. The input and output interface facilities provide input and output interfaces that are operatively associated with the processing facility. The input and output facilities allow for communication between the computing devices and individuals.

The computing devices provide a distributed system in which several devices are in communication over network and other interfaces to collectively provide the preferred arrangements. Preferably there is provided at least one client device in the system of computing devices where the system is interconnected by a data network.

The client device may be provided with a client side software product for use in the system which, when used, provides systems and methods where the client device and other computer devices communicate over a public data network. Preferably the software product contains computer information in the form of executable instructions and/or computer data for providing the preferred arrangements.

An example pseudo code for saving the user's credentials on a desktop is set out below:

A User visits Website via a desktop PC. The User uses their Mobile Device to enter login credentials for Website and saves those details inside the Password Manager for later re-use.

1. User requests login page from Website
2. Website requests new session from API Server
3. API Server sends SESSIONID and TOKEN to Website
4. Website generates a random string as SECRET
5. Website encodes SESSIONID+SECRET into app URL in QR
6. Website returns login page to user with QR
7. User scans QR code with Mobile Device
   a. Mobile Device extracts SESSIONID & SECRET from QR
8. Mobile Device requests app from Password Manager from URL with SESSIONID
   a. Password Manager validates SESSIONID from API Server
   b. If SESSIONID does not exist on API Server
      i. Send HTTP 404 error to User
      ii. Exit
9. Password Manager identifies Mobile Device via APPTOKEN cookie
   a. If APPTOKEN is not set
      i. Generate APPTOKEN as random string
      ii. Generate PASS as random string
      iii. Generate PRIVATEKEY with PASS as passphrase
      iv. Store APPTOKEN in Password Manager storage
      v. Store PRIVATEKEY in Password Manager storage
      vi. Set APPTOKEN cookie on HTTP Response
      vii. Set PASS cookie on HTTP Response
   b. If APPTOKEN does not exist in Password Manager storage
      i. Generate APPTOKEN as random string
      ii. Generate PASS as random string
      iii. Generate PRIVATEKEY with PASS as passphrase
      iv. Store APPTOKEN in Password Manager storage
      v. Store PRIVATEKEY in Password Manager storage
      vi. Set APPTOKEN cookie on HTTP Response
      vii. Set PASS cookie on HTTP Response
10. App is loaded by web browser on Mobile Device
11. Keyboard iframe is load from API Server via HTTP request
12. User inputs USERNAME to app as plain text
13. App checks local storage on Mobile Device for SEEDS associated with Website
    a. If SEEDS does not exist or is empty
       i. Generate 1 . . . N random strings as SEEDS
       ii. Store SEEDS in Mobile Device local storage
       iii. Return SEEDS
    b. else
       i. Return SEEDS
14. Send SEEDS to keyboard iframe via window.postMessage mechanism
15. Display keyboard iframe
16. User enters password via keyboard iframe keys
    a. App creates KEYPRESSES as empty array
    b. For each user keypress action on the keyboard iframe
       i. Uchar:=Unicode value of keypress
       ii. Seed:=select random entry from SEEDS
       iii. Enckey:=HASH(Seed+Uchar)
       iv. Send Enckey to App via window.postMessage mechanism
       v. App appends Enckey to KEYPRESSES
17. User clicks Save button on App
18. App sends USERNAME to Password Manager
19. App sends SESSIONID to Password Manager
20. App sends KEYPRESSES to Password Manager
21. USERNAME is saved in Password Manager storage
22. Password Manager generates PublicKey from PRIVATEKEY
23. Password Manager encrypts KEYPRESSES with PublicKey
    a. ENCKEYPRESSES:=encrypt(KEYPRESSES, PublicKey)
24. Password Manager saves ENCKEYPRESSES in storage
25. App sends SECRET to Password Manager
26. App sends SESSIONID+SEEDS to API Server
27. API Server spools SEEDS in temp storage
28. Password Manager generates USEED as random string
29. Password Manager sends USEED to API Server
30. API Server spools USEED in temp storage
31. Password Manager encodes USERNAME
    a. USERNAMEKEYS:=EMPTYTABLE
    b. For each Char in USERNAME
       i. Uchar:=Unicode value of Char
       ii. Enckey:=HASH(HASH(USEED+Uchar)+SECRET)
       iii. Append Enckey to USERNAMEKEYS
    c. Password Manager sends SESSIONID & USERNAMEKEYS to API Server
32. API Server spools USERNAMEKEYS in temp storage
33. Password Manager encodes password keypresses
    a. PASSWORDKEYS:=EMPTYTABLE
    b. For each Enckey in KEYPRESSES
       i. Passkey:=HASH(Enckey+SECRET)
       ii. Append Passkey to PASSWORDKEYS
    c. Password Manager sends SESSIONID & PASSWORDKEYS to API Server
34. API Server spools PASSWORDKEYS in temp storage
35. Website requests keypress data with SESSIONID & TOKEN
    a. If Website sends SECRET to API Server
       i. API Server generates lookup table from SECRET, SEEDS and USEED
          1. Lookup:=EMPTYTABLE
          2. For UnicodeKey in UnicodeKeySet
             a. For Seed in (SEEDS, USEED)
                i. EncKEy:=HASH(HASH(Seed+UnicodeKey)+SECRET))
                ii. Lookup[EncKEy]:=UnicodeKey
       ii. API Server decodes USERNAME from USERNAMEKEYS
          1. USERNAME:=EMPTYSTRING
          2. For Key in USERNAMEKEYS
             a. Uchar:=Lookup[Key]
             b. USERNAME:=USERNAME+Uchar
       iii. API Server decodes PASSWORD from KEYPRESSES
          1. PASSWORD:=EMPTYSTRING
          2. For Key in KEYPRESSES
             a. Uchar:=Lookup[Key]
             b. PASSWORD:=PASSWORD+Uchar iv. API Server send USERNAME and PASSWORD to Website
 v. Website authenticates User
b. Else
 i. API Server send USERNAMEKEYS and KEYPRESSES to Website
 ii. Website generates keypress lookup table from SECRET and SEEDS, USEED
  1. Lookup:=EMPTYTABLE
  2. For UnicodeKey in UnicodeKeySet
   a. For Seed in (SEEDS, USEED)
    i. EncKEy:=HASH(HASH(Seed+UnicodeKey)+SECRET))
    ii. Lookup[EncKEy]:=UnicodeKey
 iii. Website decodes USERNAME from USERNAMEKEYS
  1. USERNAME:=EMPTYSTRING
  2. For Key in USERNAMEKEYS
   a. Uchar:=Lookup[Key]
   b. USERNAME:=USERNAME+Uchar
 iv. Website decodes PASSWORD from KEYPRESSES
  1. PASSWORD:=EMPTYSTRING
  2. For Key in KEYPRESSES
   a. Uchar:=Lookup[Key]
   b. PASSWORD:=PASSWORD+Uchar
 v. Website authenticates User 36. Website sends SESSIONID to API Server to delete session storage
 a. API Server deletes SEEDS,USEED,USERNAMEKEYS,PASSWORDKEYS from temp storage An example pseudo code using saved credentials on a desktop is set out below:

A User visits Website via a desktop PC. The User has previously saved their login credentials via their Mobile Device inside the Password Manager.

37. User requests login page from Website
38. Website requests new session from API Server
39. API Server sends SESSIONID and TOKEN to Website
40. Website generates a random string as SECRET
41. Website encodes SESSIONID+SECRET into app URL in QR
42. Website returns login page to user with QR
43. User scans QR code with Mobile Device
 a. Mobile Device extracts SESSIONID & SECRET from QR
44. Mobile Device requests app from Password Manager from URL with SESSIONID
 a. Password Manager validates SESSIONID from API Server
 b. If SESSIONID does not exist on API Server
  i. Send HTTP 404 error to User
  ii. Exit
45. Password Manager identifies Mobile Device via APPTOKEN cookie
 a. If APPTOKEN is not set
  i. Return HTTP 403 error to user
  ii. Exit
 b. If APPTOKEN does not exist in Password Manager storage
  i. Return HTTP 404 error to user
  ii. Exit
46. App is loaded by web browser on Mobile Device
47. App checks local storage on Mobile Device for SEEDS associated with Website
 a. If SEEDS does not exist or is empty
  i. Display error to user
  ii. Exit
 b. else
  i. Return SEEDS
48. User clicks Login button on App
49. App sends SESSIONID&SECRET to Password Manager
50. App sends SESSIONID&SEEDS to API Server
51. API Server spools SEEDS in temp storage
52. Password Manager generates USEED as random string
53. Password Manager sends USEED to API Server
54. API Server spools USEED in temp storage
55. Password Manager retrieves USERNAME from storage
56. Password Manager encodes USERNAME
 a. USERNAMEKEYS:=EMPTYTABLE
 b. For each Char in USERNAME
  i. Uchar:=Unicode value of Char
  ii. Enckey:=HASH(HASH(USEED+Uchar)+SECRET)
  iii. Append Enckey to USERNAMEKEYS
 c. Password Manager sends SESSIONID & USERNAMEKEYS to API Server
57. API Server spools USERNAMEKEYS in temp storage
58. Password Manager retrieves ENCKEYPRESSES from storage
59. Password Manager reads PASS cookie
 a. If PASS is not set
  i. Return HTTP 500 error to user
 b. Else
  i. Password Manager retrieves PRIVATEKEY from storage
  ii. KEYPRESSES:=decrypyt(ENCKEYPRESSES, PRIVATEKEY, PASS)
60. Password Manager encodes password keypresses
 a. PASSWORDKEYS:=EMPTYTABLE
 b. For each Enckey in KEYPRESSES
  i. Passkey:=HASH(Enckey+SECRET)
  ii. Append Passkey to PASSWORDKEYS
 c. Password Manager sends SESSIONID & PASSWORDKEYS to API Server
61. API Server spools PASSWORDKEYS in temp storage
62. Website requests keypress data with SESSIONID & TOKEN
 a. If Website sends SECRET to API Server
  i. API Server generates lookup table from SECRET, SEEDS and USEED
   1. Lookup:=EMPTYTABLE
   2. For UnicodeKey in UnicodeKeySet
    a. For Seed in (SEEDS, USEED)
     i. EncKEy:=HASH(HASH(Seed+UnicodeKey)+SECRET))
     ii. Lookup[EncKEy]:=UnicodeKey
  ii. API Server decodes USERNAME from USERNAMEKEYS
   1. USERNAME:=EMPTYSTRING
   2. For Key in USERNAMEKEYS
    a. Uchar:=Lookup[Key]
    b. USERNAME:=USERNAME+Uchar iii. API Server decodes PASSWORD from KEY-PRESSES
  1. PASSWORD:=EMPTYSTRING
  2. For Key in KEYPRESSES
    a. Uchar:=Lookup[Key]
    b. PASSWORD:=PASSWORD+Uchar
iv. API Server send USERNAME and PASSWORD to Website
v. Website authenticates User
b. Else
  i. API Server send USERNAMEKEYS and KEYPRESSES to Website
  ii. Website generates keypress lookup table from SECRET and SEEDS, USEED
    1. LOOKUP:=EMPTYTABLE
    2. For UnicodeKey in UnicodeKeySet
      a. For Seed in (SEEDS, USEED)
        i. EncKEy:=HASH(HASH(Seed+UnicodeKey)+SECRET))
        ii. Lookup[EncKEy]:=UnicodeKey
  iii. Website decodes USERNAME from USERNAMEKEYS
    1. USERNAME:=EMPTYSTRING
    2. For Key in USERNAMEKEYS
      a. Uchar:=Lookup[Key]
      b. USERNAME:=USERNAME+Uchar
  iv. Website decodes PASSWORD from KEYPRESSES
    1. PASSWORD:=EMPTYSTRING
    2. For Key in KEYPRESSES
      a. Uchar:=Lookup[Key]
      b. PASSWORD:=PASSWORD+Uchar
  v. Website authenticates User
63. Website sends SESSIONID to API Server to delete session storage
  a. API Server deletes SEEDS,USEED,USERNAMEKEYS,PASSWORDKEYS from temp storage An example pseudo code for saving the user's credentials on a mobile device is set out below:

A User visits Website via their Mobile Device. The User enters login credentials for Website via the BankVault mobile keyboard and saves those details inside the Password Manager for later re-use.
1. User requests login page from Website
2. Website requests new session from API Server
3. API Server sends SESSIONID and TOKEN to Website
4. Website generates a random string as SECRET
5. Website encodes SESSIONID+SECRET into app URL in QR
6. Website returns login page to user with QR
7. Mobile Device programmatically decodes QR
  a. Mobile Device extracts SESSIONID & SECRET from QR
8. Mobile Device requests and loads app iframe from Password Manager
9. Password Manager identifies Mobile Device via APPTOKEN cookie
  a. If APPTOKEN is not set
    i. Generate APPTOKEN as random string
    ii. Generate PASS as random string
    iii. Generate PRIVATEKEY with PASS as passphrase
    iv. Store APPTOKEN in Password Manager storage
    v. Store PRIVATEKEY in Password Manager storage
    vi. Set APPTOKEN cookie on HTTP Response
    vii. Set PASS cookie on HTTP Response
  b. If APPTOKEN does not exist in Password Manager storage
    i. Generate APPTOKEN as random string
    ii. Generate PASS as random string
    iii. Generate PRIVATEKEY with PASS as passphrase
    iv. Store APPTOKEN in Password Manager storage
    v. Store PRIVATEKEY in Password Manager storage
    vi. Set APPTOKEN cookie on HTTP Response
    vii. Set PASS cookie on HTTP Response
10. App iframe checks local storage on Mobile Device for SEEDS associated with Website
  a. If SEEDS does not exist or is empty
    i. Generate 1 . . . N random strings as SEEDS
    ii. Store SEEDS in Mobile Device local storage
    iii. Return SEEDS
  b. else
    i. Return SEEDS
11. Keyboard iframe is load from API Server via HTTP request
12. App iframe sends SEEDS to API Server via HTTP
13. Send SEEDS to keyboard iframe via window.postMessage mechanism
14. Display keyboard iframe
15. User inputs USERNAME to login page as plain text
16. User enters password via keyboard iframe keys
  a. App creates KEYPRESSES as empty array
  b. For each user keypress action on the keyboard iframe
    i. Uchar:=Unicode value of keypress
    ii. Seed:=select random entry from SEEDS
    iii. Enckey:=HASH(Seed+Uchar)
    iv. Send Enckey to App via window.postMessage mechanism
    v. App appends Enckey to KEYPRESSES
17. User clicks login button on login page
18. Login page sends USERNAME to app iframe
19. App iframe sends SESSIONID to Password Manager
20. App iframe sends KEYPRESSES to Password Manager
21. USERNAME is saved in Password Manager storage
22. Password Manager generates PublicKey from PRIVATEKEY
23. Password Manager encrypts KEYPRESSES with PublicKey
  a. ENCKEYPRESSES:=encrypt(KEYPRESSES, PublicKey)
24. Password Manager saves ENCKEYPRESSES in storage
25. App iframe sends SECRET to Password Manager
26. App iframe sends SESSIONID+SEEDS to API Server
27. API Server spools SEEDS in temp storage
28. Password Manager generates USEED as random string
29. Password Manager sends USEED to API Server
30. API Server spools USEED in temp storage
31. Password Manager encodes USERNAME
  a. USERNAMEKEYS:=EMPTYTABLE
  b. For each Char in USERNAME
    i. Uchar:=Unicode value of Char
    ii. Enckey:=HASH(HASH(USEED+Uchar)+SECRET)
    iii. Append Enckey to USERNAMEKEYS
  c. Password Manager sends SESSIONID & USERNAMEKEYS to API Server 32. API Server spools USERNAMEKEYS in temp storage
33. Password Manager encodes password keypresses
   a. PASSWORDKEYS:=EMPTYTABLE
   b. For each Enckey in KEYPRESSES
      i. Passkey:=HASH(Enckey+SECRET)
      ii. Append Passkey to PASSWORDKEYS
   c. Password Manager sends SESSIONID & PASSWORDKEYS to API Server
34. API Server spools PASSWORDKEYS in temp storage
35. Website requests keypress data with SESSIONID & TOKEN
   a. If Website sends SECRET to API Server
      i. API Server generates lookup table from SECRET, SEEDS and USEED
         1. Lookup:=EMPTYTABLE
         2. For UnicodeKey in UnicodeKeySet
            a. For Seed in (SEEDS, USEED)
               i. EncKEy:=HASH(HASH(Seed+UnicodeKey)+SECRET)
               ii. Lookup[EncKEy]:=UnicodeKey
      ii. API Server decodes USERNAME from USERNAMEKEYS
         1. USERNAME:=EMPTYSTRING
         2. For Key in USERNAMEKEYS
            a. Uchar:=Lookup[Key]
            b. USERNAME:=USERNAME+Uchar
      iii. API Server decodes PASSWORD from KEYPRESSES
         1. PASSWORD:=EMPTYSTRING
         2. For Key in KEYPRESSES
            a. Uchar:=Lookup[Key]
            b. PASSWORD:=PASSWORD+Uchar
      iv. API Server send USERNAME and PASSWORD to Website
      v. Website authenticates User
   b. Else
      i. API Server send USERNAMEKEYS and KEYPRESSES to Website
      ii. Website generates keypress lookup table from SECRET and SEEDS, USEED
         1. Lookup:=EMPTYTABLE
         2. For UnicodeKey in UnicodeKeySet
            a. For Seed in (SEEDS, USEED)
               i. EncKEy:=HASH(HASH(Seed+UnicodeKey)+SECRET)
               ii. Lookup[EncKEy]:=UnicodeKey
      iii. Website decodes USERNAME from USERNAMEKEYS
         1. USERNAME:=EMPTYSTRING
         2. For Key in USERNAMEKEYS
            a. Uchar:=Lookup[Key]
            b. USERNAME:=USERNAME+Uchar
      iv. Website decodes PASSWORD from KEYPRESSES
         1. PASSWORD:=EMPTYSTRING
         2. For Key in KEYPRESSES
            a. Uchar:=Lookup[Key]
            b. PASSWORD:=PASSWORD+Uchar
      v. Website authenticates User
36. Website sends SESSIONID to API Server to delete session storage
   a. API Server deletes SEEDS,USEED,USERNAMEKEYS,PASSWORDKEYS from temp storage An example pseudo code using the user's saved credentials on a mobile is set out below:

A User visits Website via their Mobile Device. The User has previously saved their login credentials via their Mobile Device inside the BankVault Password Manager.

37. User requests login page from Website
38. Website requests new session from API Server
39. API Server sends SESSIONID and TOKEN to Website
40. Website generates a random string as SECRET
41. Website encodes SESSIONID+SECRET into app URL in QR
42. Website returns login page to user with QR
43. Mobile Device programmatically decodes QR
   a. Mobile Device extracts SESSIONID & SECRET from QR
44. Mobile Device requests app iframe from Password Manager from URL with SESSIONID
   b. Password Manager validates SESSIONID from API Server
   c. If SESSIONID does not exist on API Server
      i. Send HTTP 404 error to User
      ii. Exit
45. Password Manager identifies Mobile Device via APPTOKEN cookie
   d. If APPTOKEN is not set
      i. Return HTTP 403 error to user
      ii. Exit
   e. If APPTOKEN does not exist in Password Manager storage
      i. Return HTTP 404 error to user
      ii. Exit
46. App iframe is loaded by web browser on Mobile Device
47. App iframe checks local storage on Mobile Device for SEEDS associated with Website
   f. If SEEDS does not exist or is empty
      i. Display error to user
      ii. Exit
   g. else
      i. Return SEEDS
48. User clicks Login button on App
49. App iframe sends SESSIONID&SECRET to Password Manager
50. App iframe sends SESSIONID&SEEDS to API Server
51. API Server spools SEEDS in temp storage
52. Password Manager generates USEED as random string
53. Password Manager sends USEED to API Server
54. API Server spools USEED in temp storage
55. Password Manager retrieves USERNAME from storage
56. Password Manager encodes USERNAME
   h. USERNAMEKEYS:=EMPTYTABLE
   i. For each Char in USERNAME
      i. Uchar:=Unicode value of Char
      ii. Enckey:=HASH(HASH(USEED+Uchar)+SECRET)
      iii. Append Enckey to USERNAMEKEYS
   j. Password Manager sends SESSIONID & USERNAMEKEYS to API Server
57. API Server spools USERNAMEKEYS in temp storage
58. Password Manager retrieves ENCKEYPRESSES from storage 59. Password Manager reads PASS cookie
   k. If PASS is not set
      i. Return HTTP 500 error to user
   l. Else
      i. Password Manager retrieves PRIVATEKEY from storage
      ii. KEYPRESSES:=decrypyt(ENCKEYPRESSES, PRIVATEKEY, PASS)
60. Password Manager encodes password keypresses
   m. PASSWORDKEYS:=EMPTYTABLE
   n. For each Enckey in KEYPRESSES
      i. Passkey:=HASH(Enckey+SECRET)
      ii. Append Passkey to PASSWORDKEYS
   o. Password Manager sends SESSIONID & PASSWORDKEYS to API Server
61. API Server spools PASSWORDKEYS in temp storage
62. Website requests keypress data with SESSIONID & TOKEN
   p. If Website sends SECRET to API Server
      i. API Server generates lookup table from SECRET, SEEDS and USEED
         1. Lookup:=EMPTYTABLE
         2. For UnicodeKey in UnicodeKeySet
            a. For Seed in (SEEDS, USEED)
               i. EncKEy:=HASH(HASH(Seed+UnicodeKey)+SECRET))
               ii. Lookup[EncKEy]:=UnicodeKey
      ii. API Server decodes USERNAME from USERNAMEKEYS
         1. USERNAME:=EMPTYSTRING
         2. For Key in USERNAMEKEYS
            a. Uchar:=Lookup[Key]
            b. USERNAME:=USERNAME+Uchar
      iii. API Server decodes PASSWORD from KEYPRESSES
         1. PASSWORD:=EMPTYSTRING
         2. For Key in KEYPRESSES
            a. Uchar:=Lookup[Key]
            b. PASSWORD:=PASSWORD+Uchar
      iv. API Server send USERNAME and PASSWORD to Website
      v. Website authenticates User
   q. Else
      i. API Server send USERNAMEKEYS and KEYPRESSES to Website
      ii. Website generates keypress lookup table from SECRET and SEEDS, USEED
         1. LOOKUP:=EMPTYTABLE
         2. For UnicodeKey in UnicodeKeySet
            a. For Seed in (SEEDS, USEED)
               i. EncKEy:=HASH(HASH(Seed+UnicodeKey)+SECRET))
               ii. Lookup[EncKEy]:=UnicodeKey
      iii. Website decodes USERNAME from USERNAMEKEYS
         1. USERNAME:=EMPTYSTRING
         2. For Key in USERNAMEKEYS
            a. Uchar:=Lookup[Key]
            b. USERNAME:=USERNAME+Uchar
      iv. Website decodes PASSWORD from KEYPRESSES
         1. PASSWORD:=EMPTYSTRING
         2. For Key in KEYPRESSES
            a. Uchar:=Lookup[Key]
            b. PASSWORD:=PASSWORD+Uchar
      v. Website authenticates User
63. Website sends SESSIONID to API Server to delete session storage
   r. API Server deletes SEEDS,USEED,USERNAMEKEYS,PASSWORDKEYS from temp storage Variables and Functions

| Name | Description | Sensitivity |
| --- | --- | --- |
| SESSIONID | Unique ID to identify keypress session | Low |
| TOKEN | Shared token to unlock access to USERNAMEKEYS and PASSWORDKEYS data | High |
| SECRET | Random string used to add entropy to HASH function when encoding KEYPRESSES | High |
| APPTOKEN | HTTP cookie identifying Mobile Device making HTTP request to Password Manager | Medium |
| PASS | HTTP cookie containing passphrase to unlock PRIVATEKEY | Medium |
| PRIVATEKEY | Private key used to decrypt data in conjunction with PASS | Medium |
| USERNAME | Login username for User to log into Website | Low |
| PASSWORD | Login password for User to log into Website | High |
| SEEDS | Array of random strings used to add entropy to HASH function when encoding raw keypress data | High |
| KEYPRESSES | Encoded keypress representation of User PASSWORD encoded by SEEDS | Medium |
| ENCKEYPRESSES | Public key encrypted version KEYPRESSES stored on Password Manager; decrypted with PRIVATEKEY + PASS | Low |
| USEED | Random string used to add entropy to HASH function when encoding USERNAME into USERNAMEKEYS | Low |
| USERNAMEKEYS | Encoded keypress representation of User USERNAME transmitted to API Server | Low |
| PASSWORDKEYS | Encoded keypress representation of User PASSWORD transmitted to API Server | High |
| HASH | One way hashing function eg MD5, SHA1, SHA256, SHA512 | None |

Variable System Visibility

| | User | Mobile Device | Password Manager | API Server | Website |
| --- | --- | --- | --- | --- | --- |
| SESSIONID | | ✓ | ✓ | ✓ | ✓ |
| TOKEN | | | | ✓ | ✓ |
| SECRET | | ✓ | ✓ | | ✓ |
| APPTOKEN | | ✓ | ✓ | | |
| PASS | | ✓ | ✓ | | |
| PRIVATEKEY | | | ✓ | | |
| USERNAME | ✓ | ✓ | ✓ | | ✓ |
| PASSWORD | ✓ | | | | ✓ |
| SEEDS | | ✓ | | ✓ | |
| KEYPRESSES | | ✓ | ✓ | | |
| ENCKEYPRESSES | | | ✓ | ✓ | ✓ |
| USEED | | ✓ | | ✓ | |
| USERNAMEKEYS | | | ✓ | ✓ | ✓ |
| PASSWORDKEYS | | | ✓ | ✓ | ✓ |

Referring to FIGS. 12 to 35, states of an example of the process of the embodiment described in FIG. 10 are shown to set the password.

Figure 12:
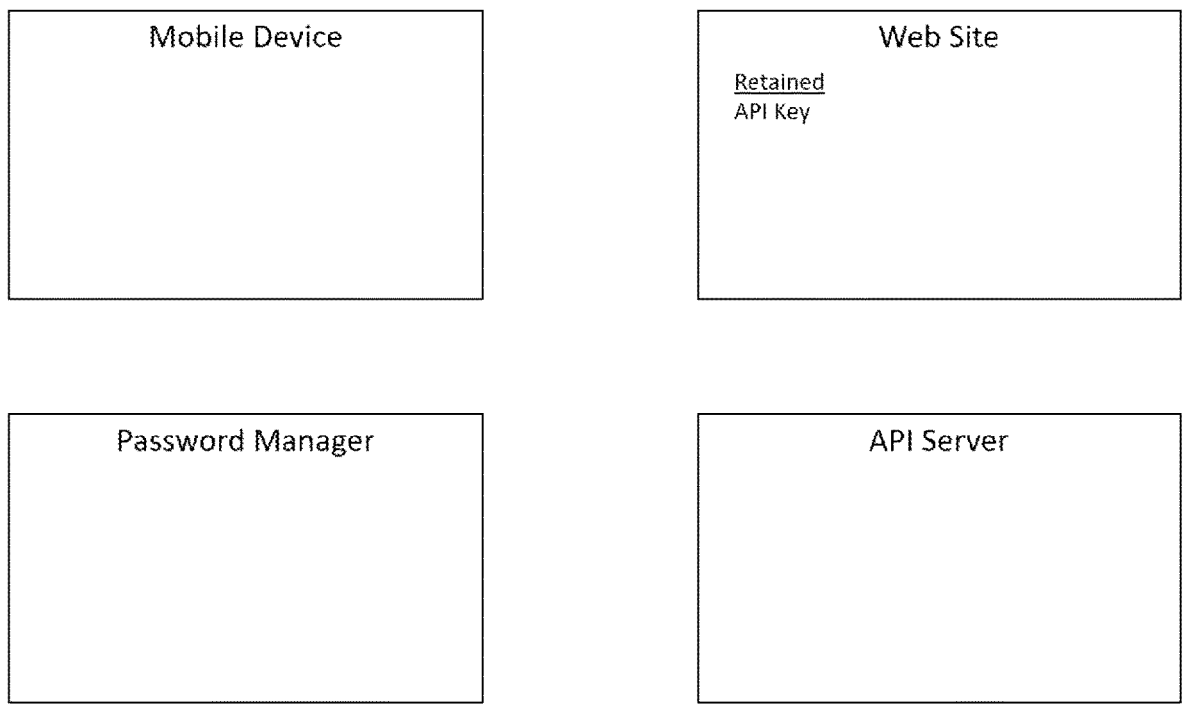

The initial system state is shown in FIG. 12.

In FIG. 13, the user goes to login page to start the login process. The Web Site requests a new session from the API Server with it's unique API Key.

In FIG. 14, the User scans QR code on login page with Mobile Device.

In FIG. 15, the Mobile requests a new user registration. The Password Manager creates a new user identified by User ID, and generates Keypress Password and Seeds Password as random strings. Keypress Private Key is generated with Keypress Password.

In FIG. 16, Seeds Private Key is generated with Seeds Password and saved to the Mobile device.

In FIG. 17, Seeds is generated as an array of random string. Seeds are sent from the Mobile to the API Server to be associated with the session identified by Session ID.

In FIG. 18, Seeds Public Key is derived from Seeds Private Key and Seeds Password.

In FIG. 19, Encrypted Seeds is generated from encrypting Seeds with Seeds Public Key and saved to the Mobile device.

In FIG. 20, the mobile device register authentication data with the Password Manager (ie Webauthn).

In FIG. 21, the Generated array is created by hashing each character of a randomly generated string with a values from the Seeds array.

In FIG. 22, the Detail array is created by hashing each character of user input with a values from the Seeds array.

Figure 23:
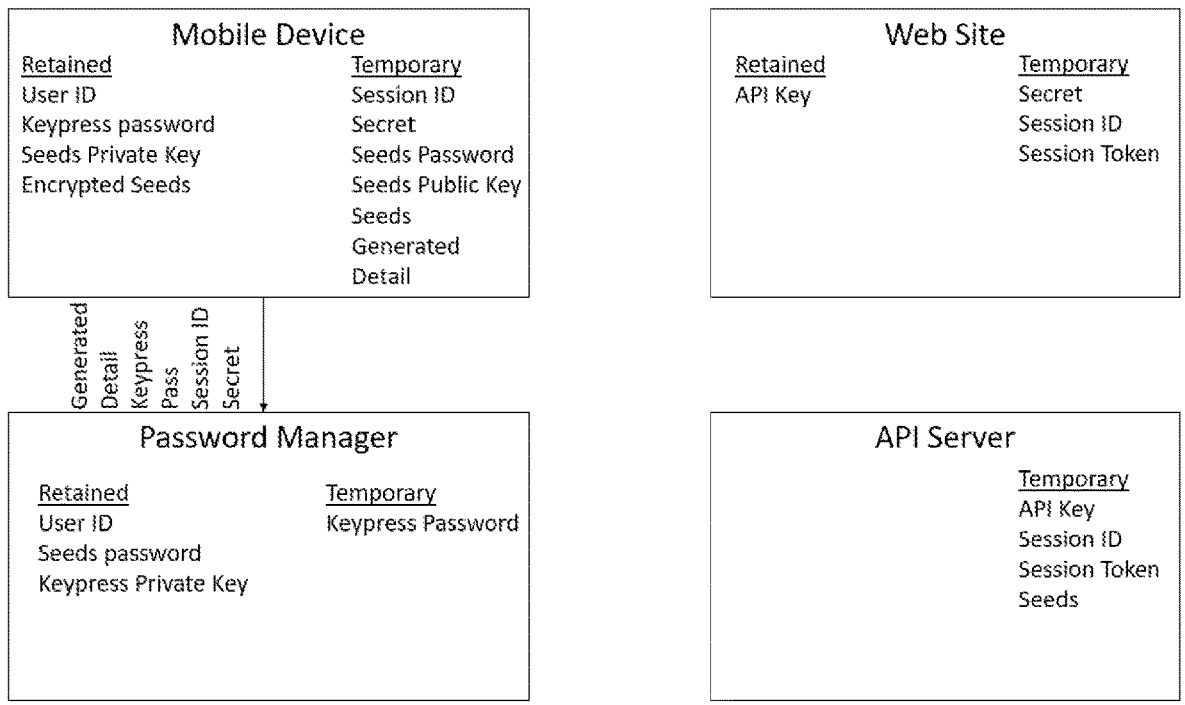

In FIG. 23, the Session ID, Secret, Keypress Password and Generated and Detail arrays are sent from the Mobile to the Password Manager for encrypted and storage.

Figure 24:
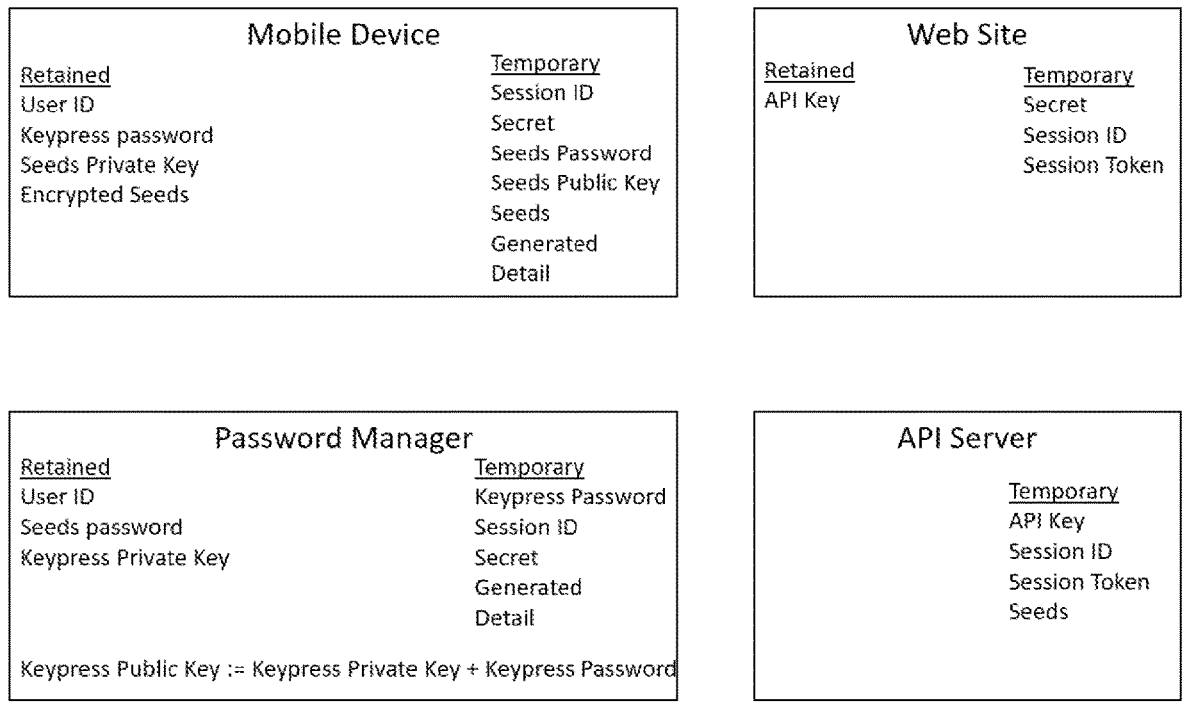

In FIG. 24, the Keypress Public Key is derived from the Keypress Private Key and Keypress Private Key.

In FIG. 25, Encrypted Generated is generated by encrypting Generated with Keypress Public Key. Encrypted Generated is stored on the Password Manager. Encrypted Detail is not stored.

In FIG. 26, the Password Manager creates Session Generated by hashing each entry in the Generated array with Secret. The process is repeated to create Session Detail from Detail.

Figure 27:
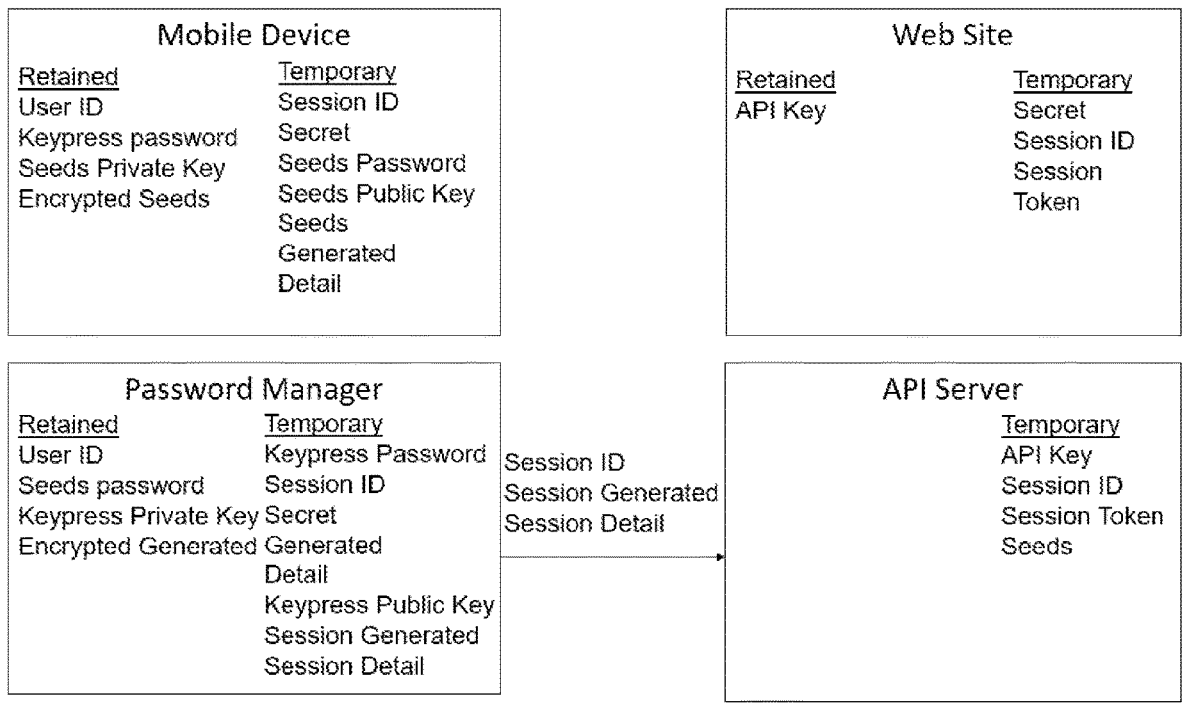

In FIG. 27, Session Keypresses+Session Generated are sent from the Password Manager to the API Server to be associated with the session identified by Session ID.

Figure 28:
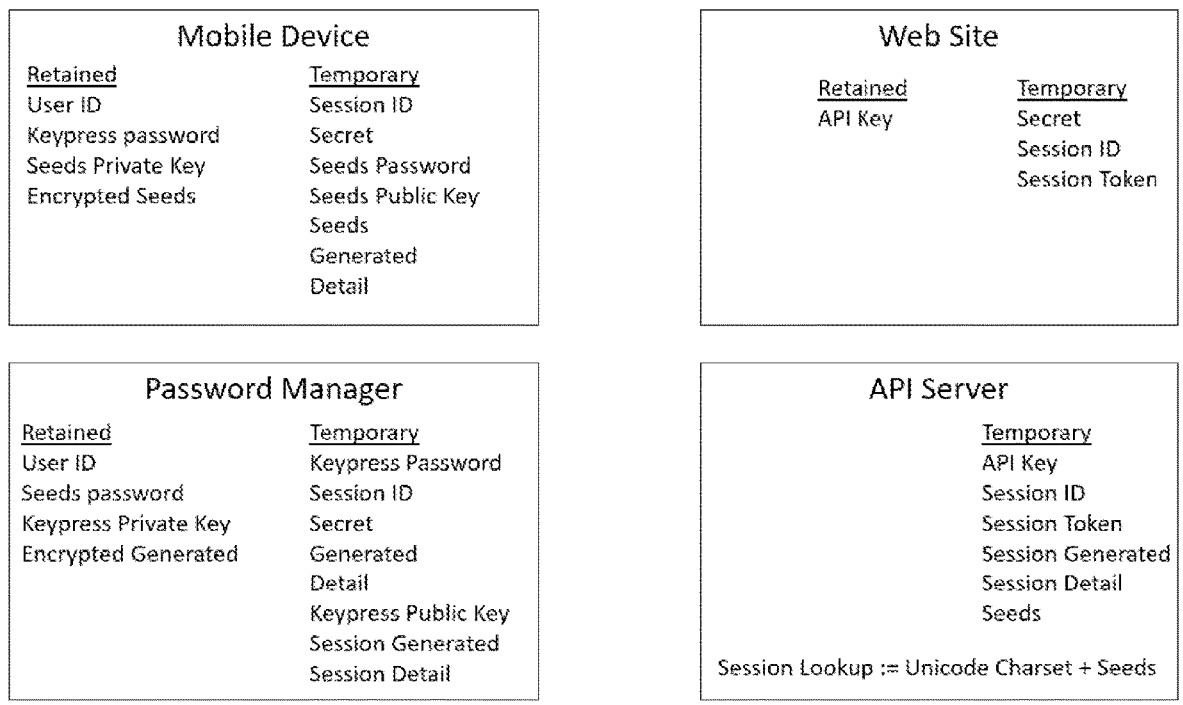

In FIG. 28, a Session Lookup table is generated on the API Server by hashing each entry in the set of Unicode characters with each value in the Seeds array.

Figure 29:
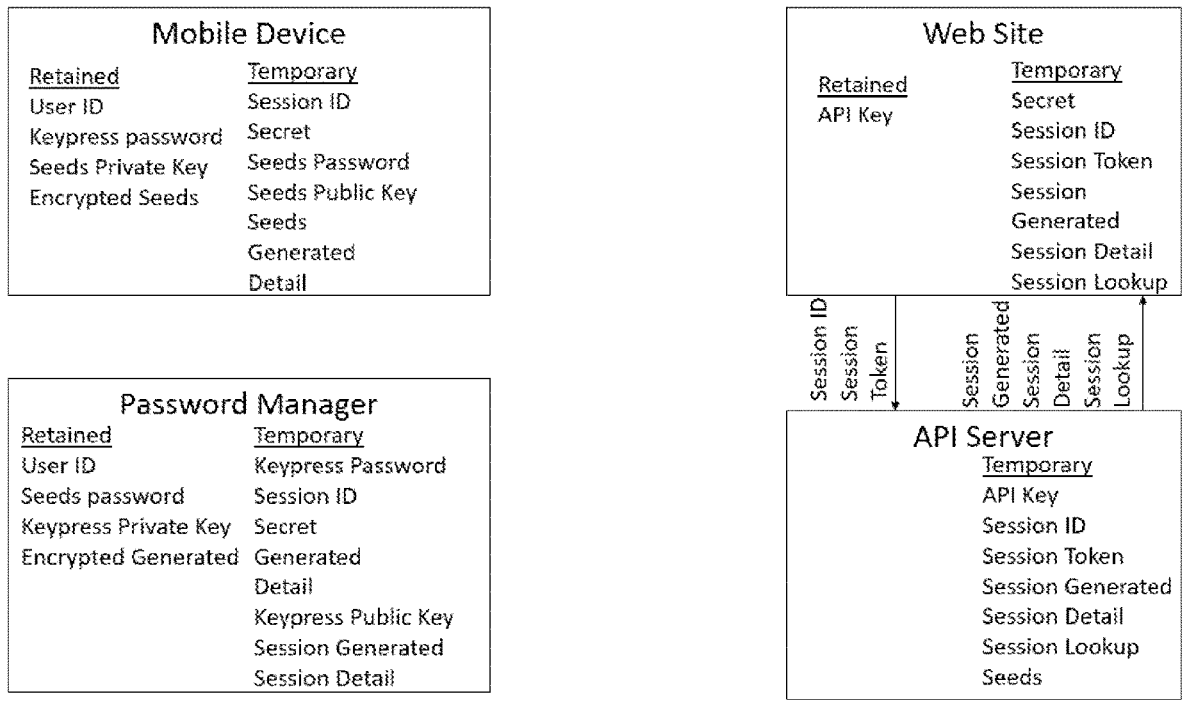

In FIG. 29, the Web Site requests the Session Generated, Session Detail and Session Lookup table from the API Server for the session identified by Session ID and authenticated with Session Token.

Figure 30:
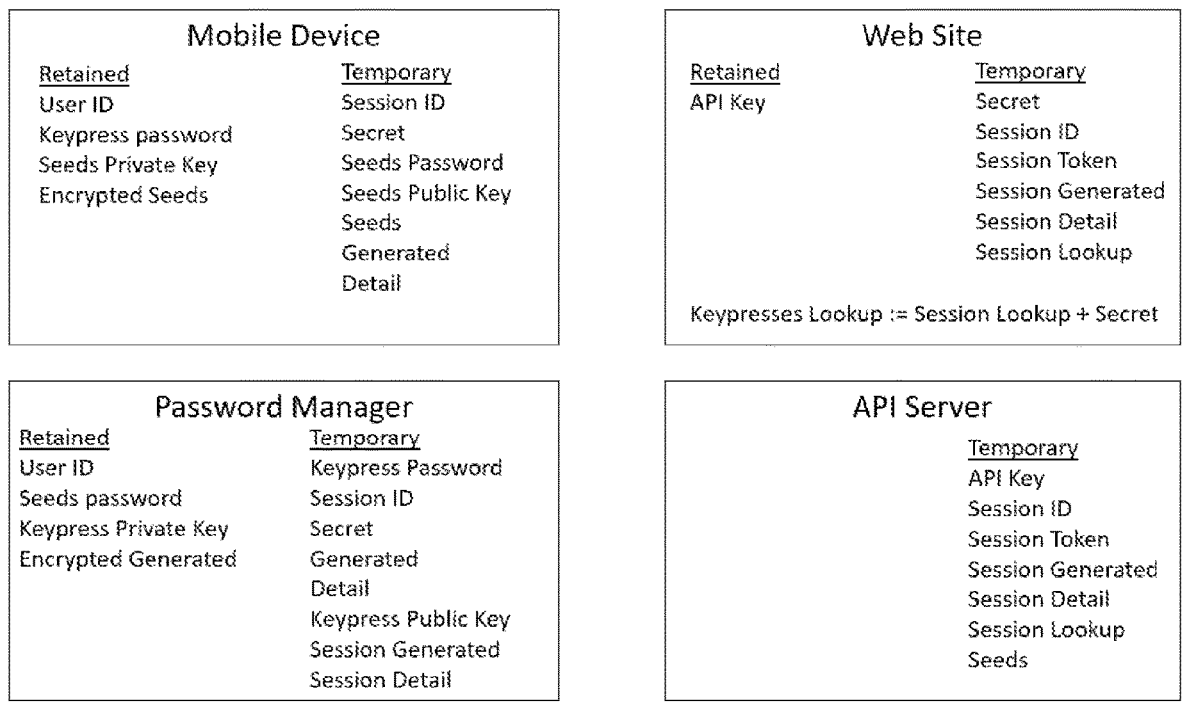

In FIG. 30, the Website generates a Keypress Lookup table by hashing each entry in the Session Lookup table with Secret.

Figure 31:
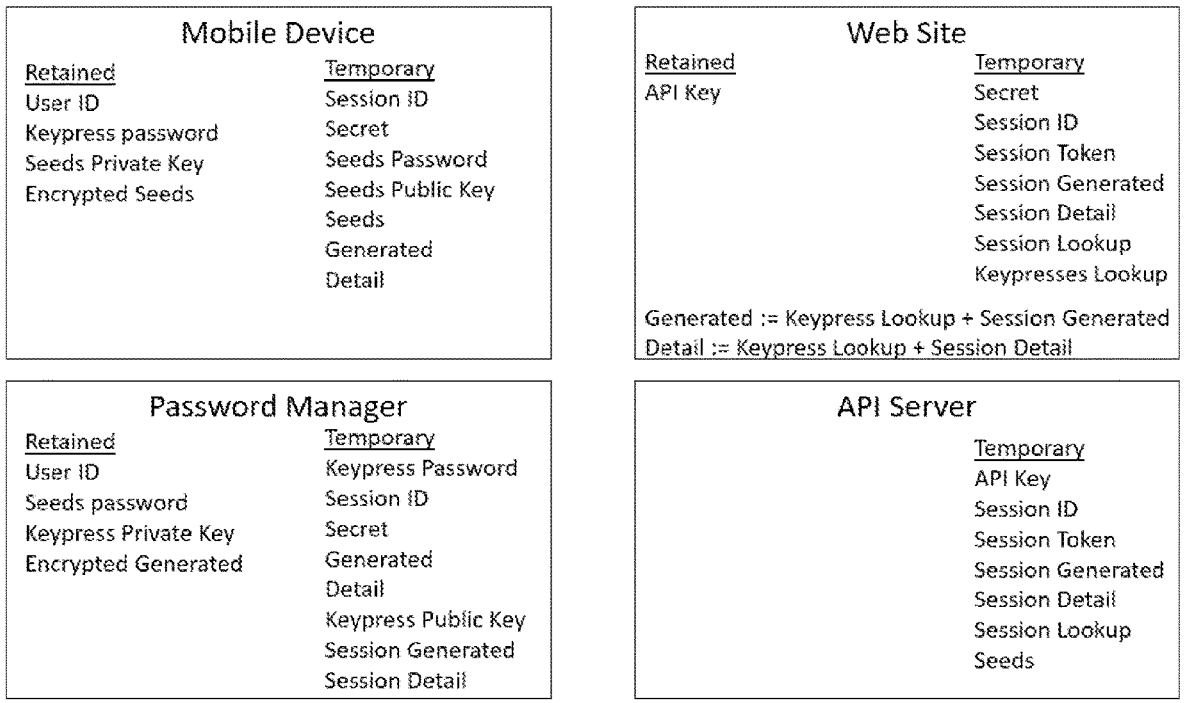

In FIG. 31, the Website decodes the plain text Generated by looking up each entry in the Session Generated array in the Keypress Lookup table. This process is repeated to generate the plain text Detail from Session Detail. The Website creates a new user account and saves Generated and Detail to this user account. Generated may be regarded as the password and the detail may include the username.

Figure 32:
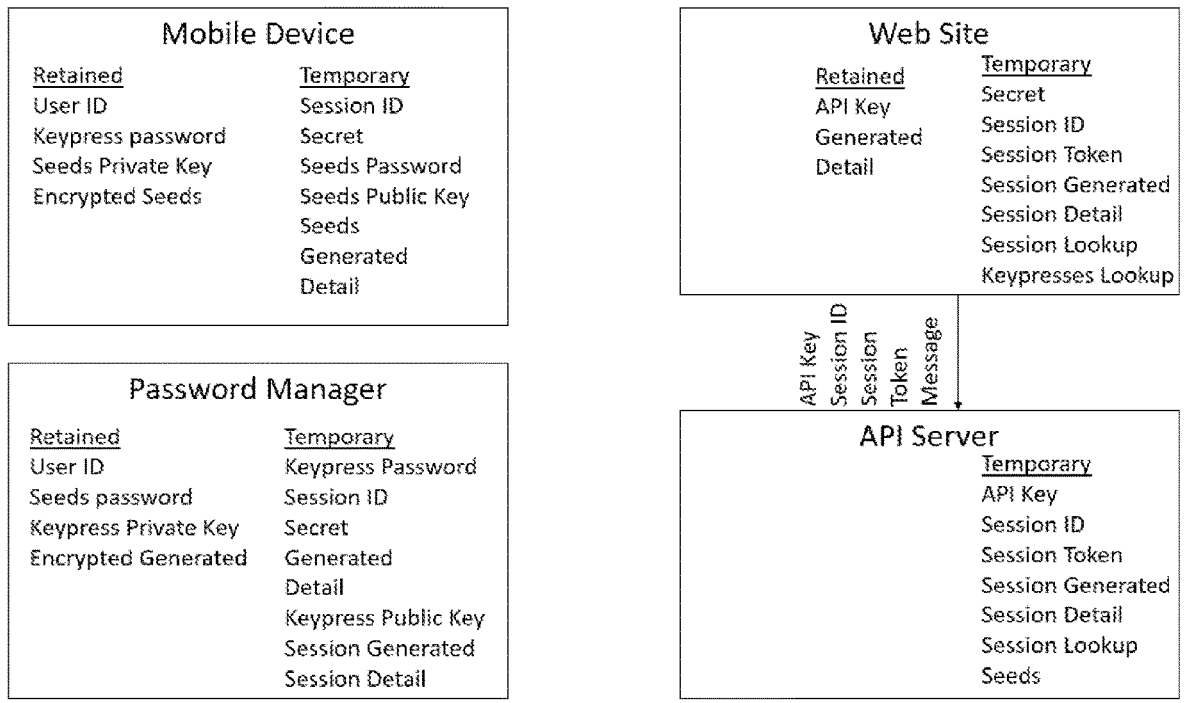

In FIG. 32, the Website sends a message to the Mobile Device connected to the session identified by Session ID via the API server. The Website send the API Key and Session Token as proof that is the owner of this session.

Figure 33:
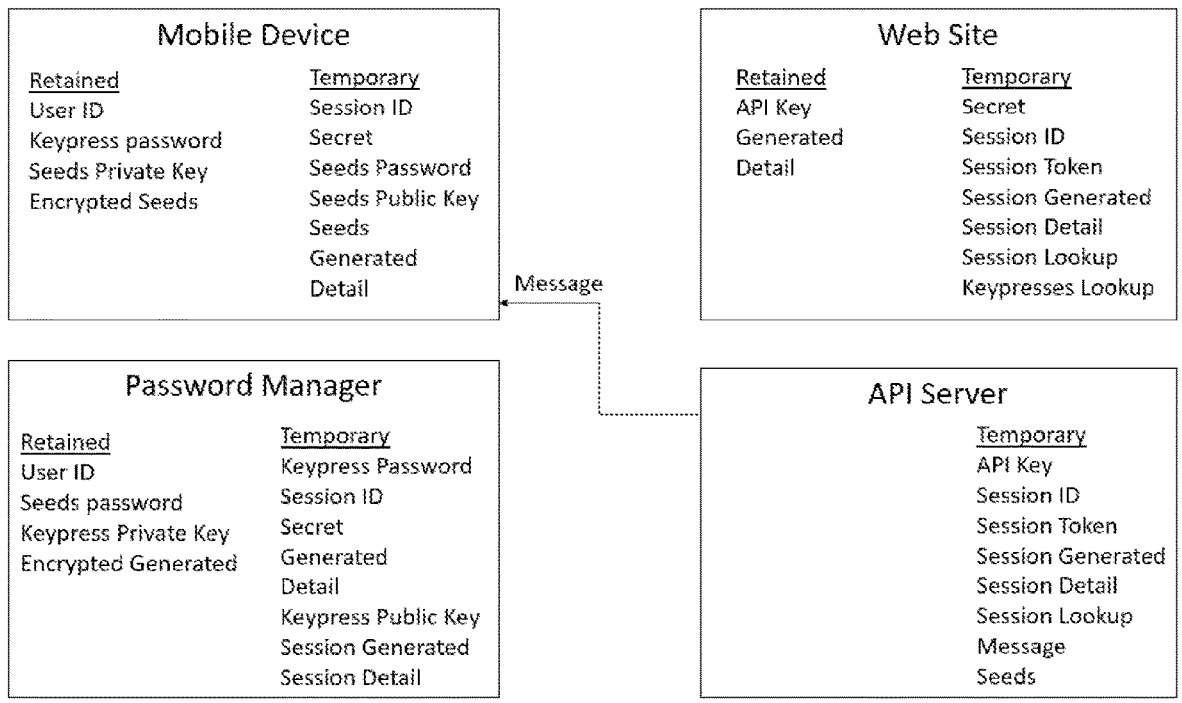

In FIG. 33, the API server sends the contents of Message to the Mobile Device connected to the session identified by Session ID. The Mobile Device displays the contents of Message to the user.

Figure 34:
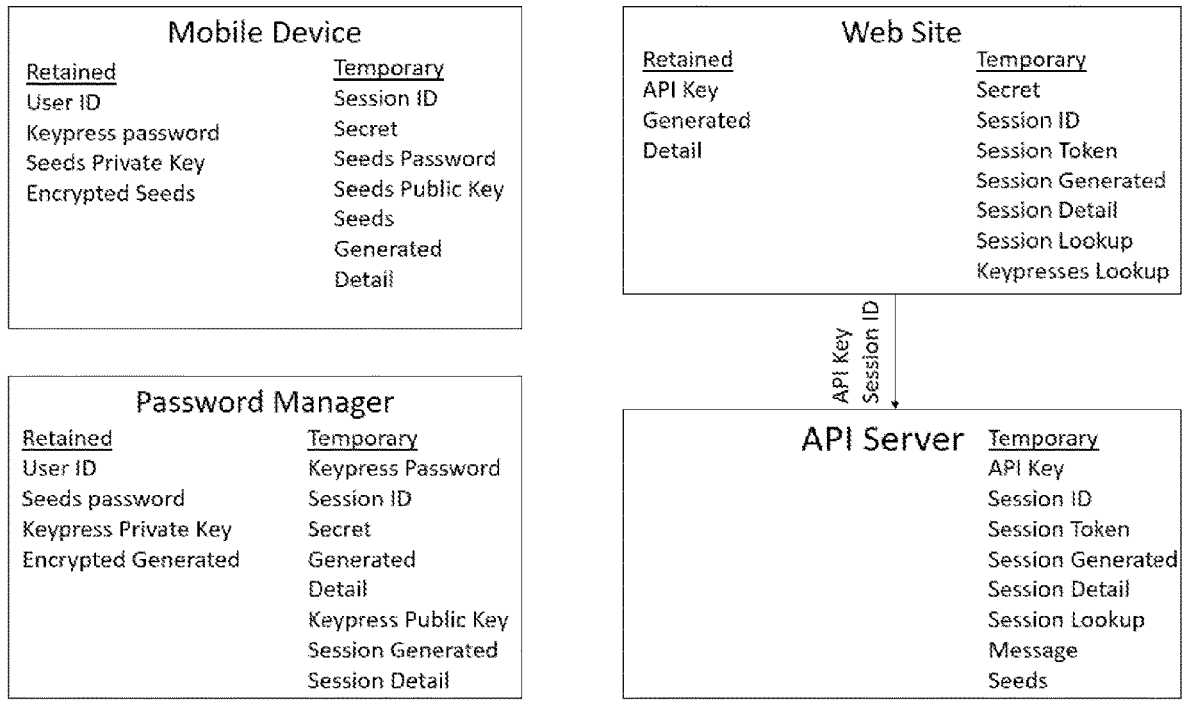

In FIG. 34, the Website sends a DELETE message to the API server to delete the session.

Figure 35:
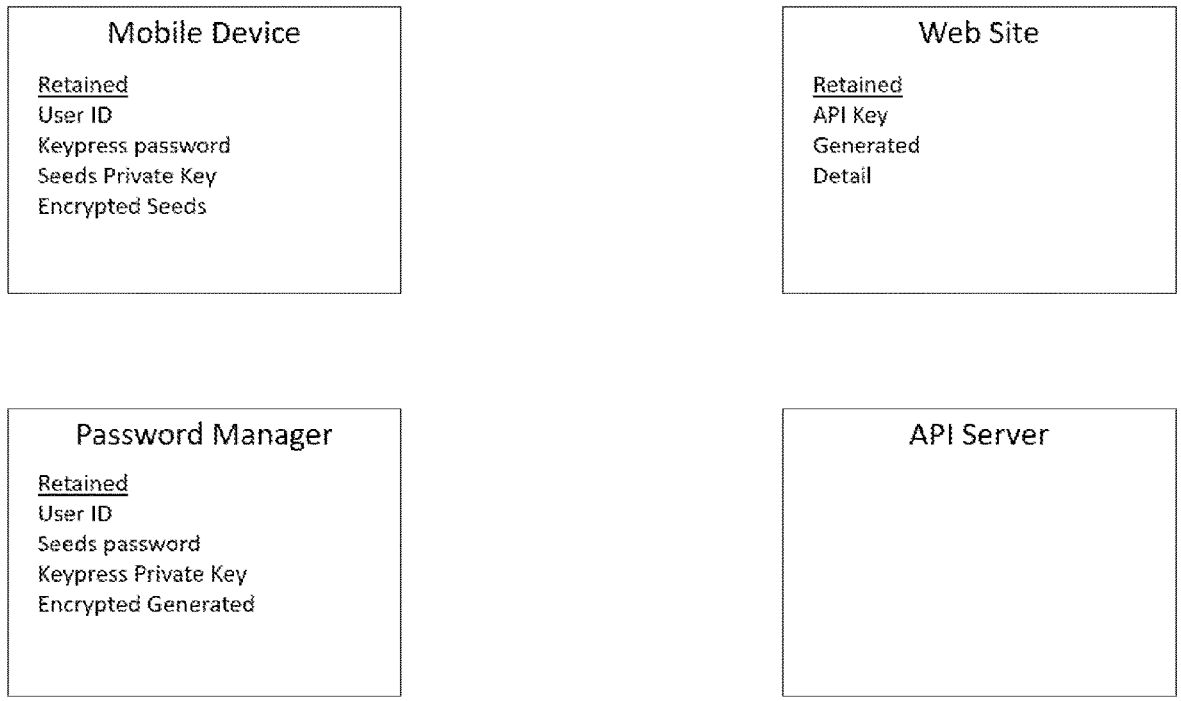

In FIG. 35, the process has finished. All session specific data is garbage collected, and the system reverts to its initial state.

Referring to FIGS. 36 to 53, states of an example of the process of the embodiment described in FIG. 10 are shown once the password is set in subsequent sessions.

Figure 36:
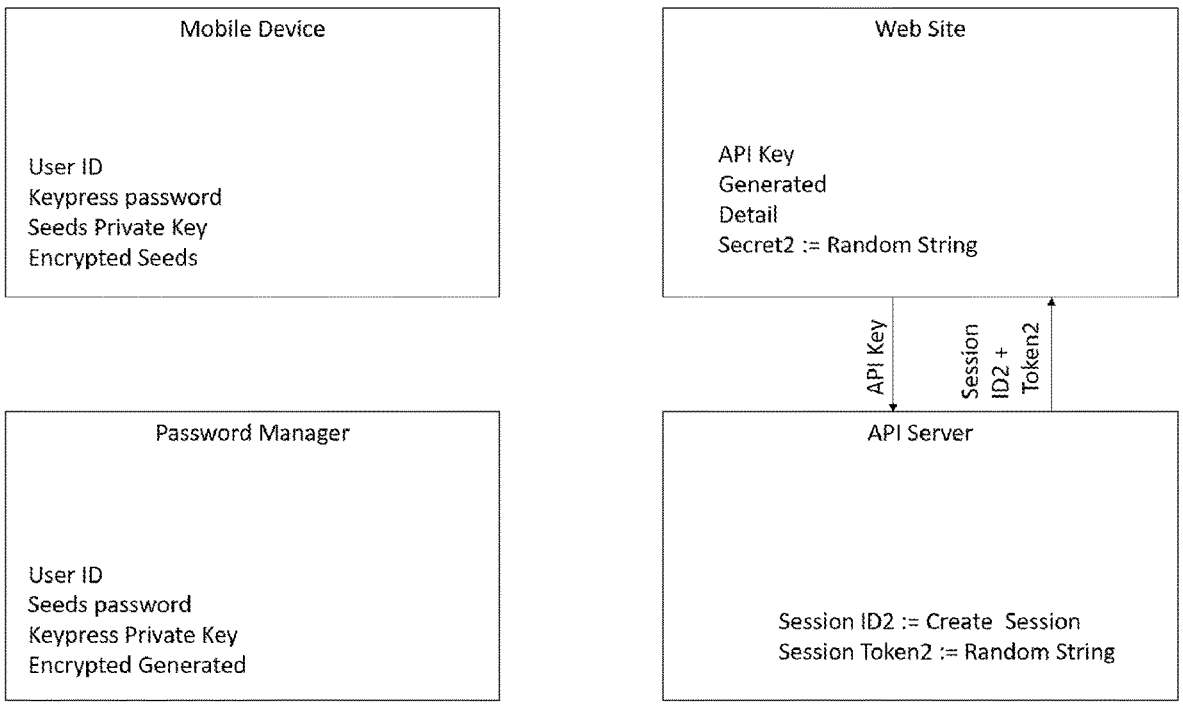

In FIG. 36, the user goes to login page to start a subsequent login process. The Web Site requests a new session from the API Server with it's unique API Key.

In FIG. 37, the user scans QR code on login page with Mobile.

In FIG. 38, the Mobile requests the Password Manager verify the user identified by sending the User ID, the PM verifies that the Mobile device is the expected device for the User ID and if so sends the stored Seeds Password to the Mobile device. Mobile Dev now has the seeds password.

Figure 39:
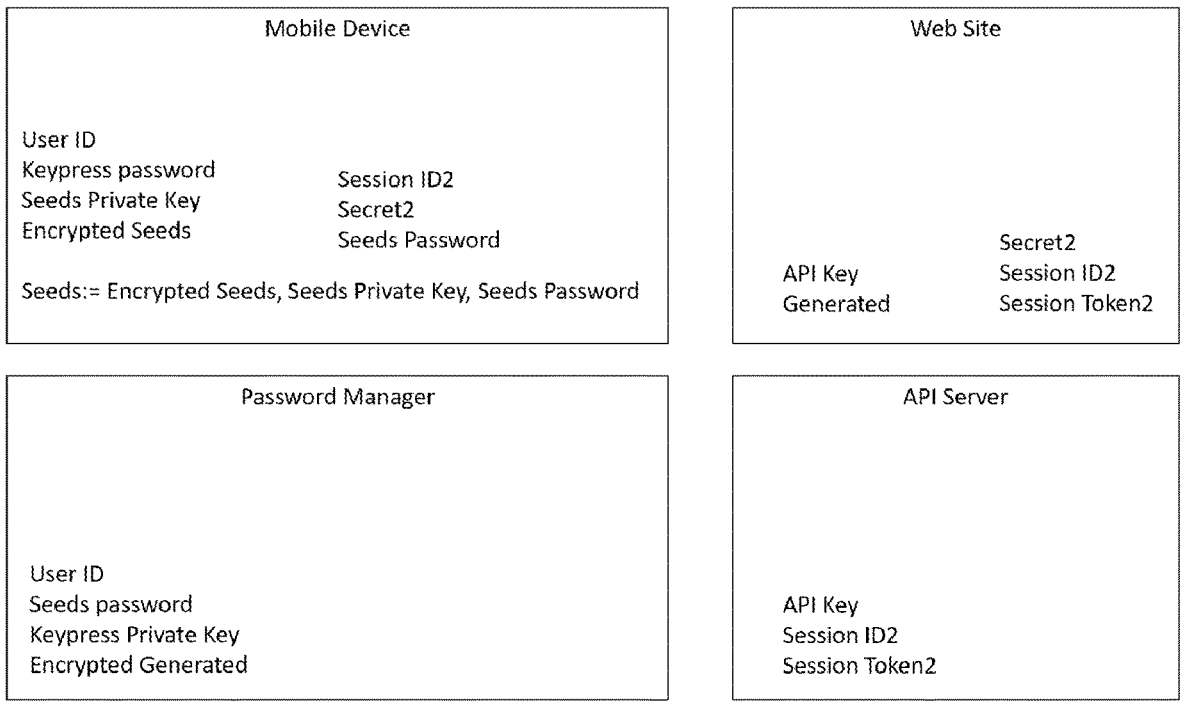

In FIG. 39, Seeds is decrypted from the stored encrypted seeds, seeds private key and the seeds password.

Figure 40:
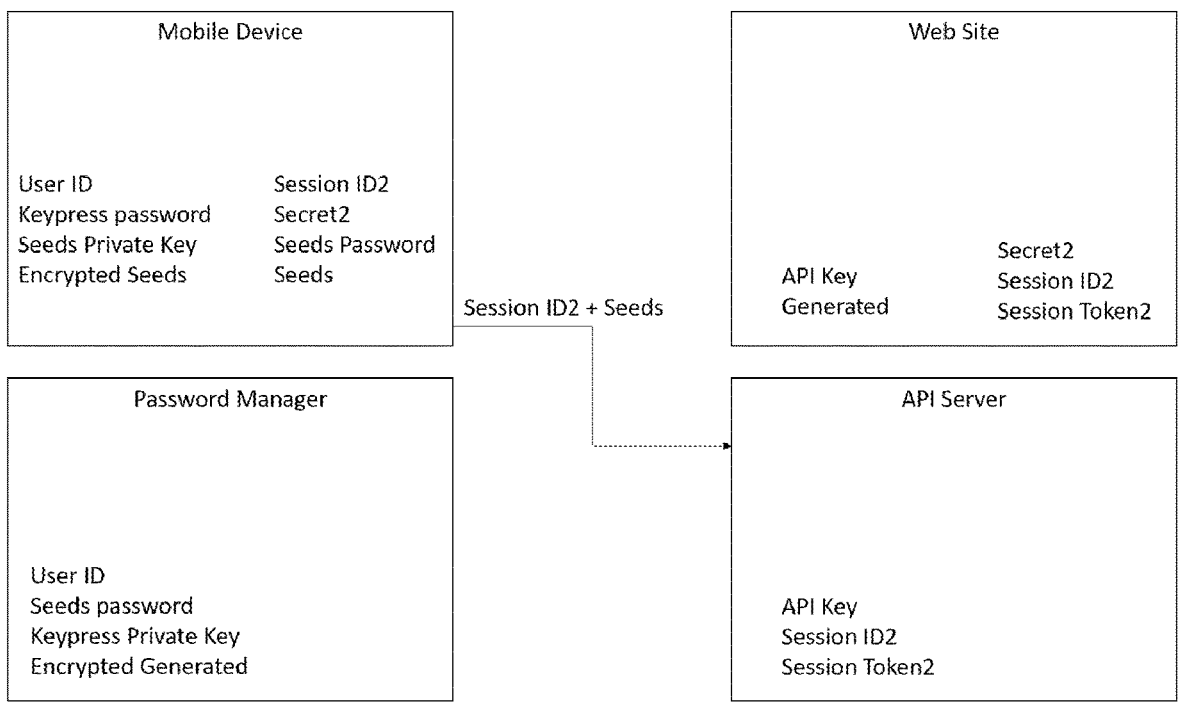

In FIG. 40, Encrypted Seeds are sent from the Mobile to the API Server to be associated with the session identified by Session ID2. API server now has encrypted seeds associated with the session.

Figure 41:
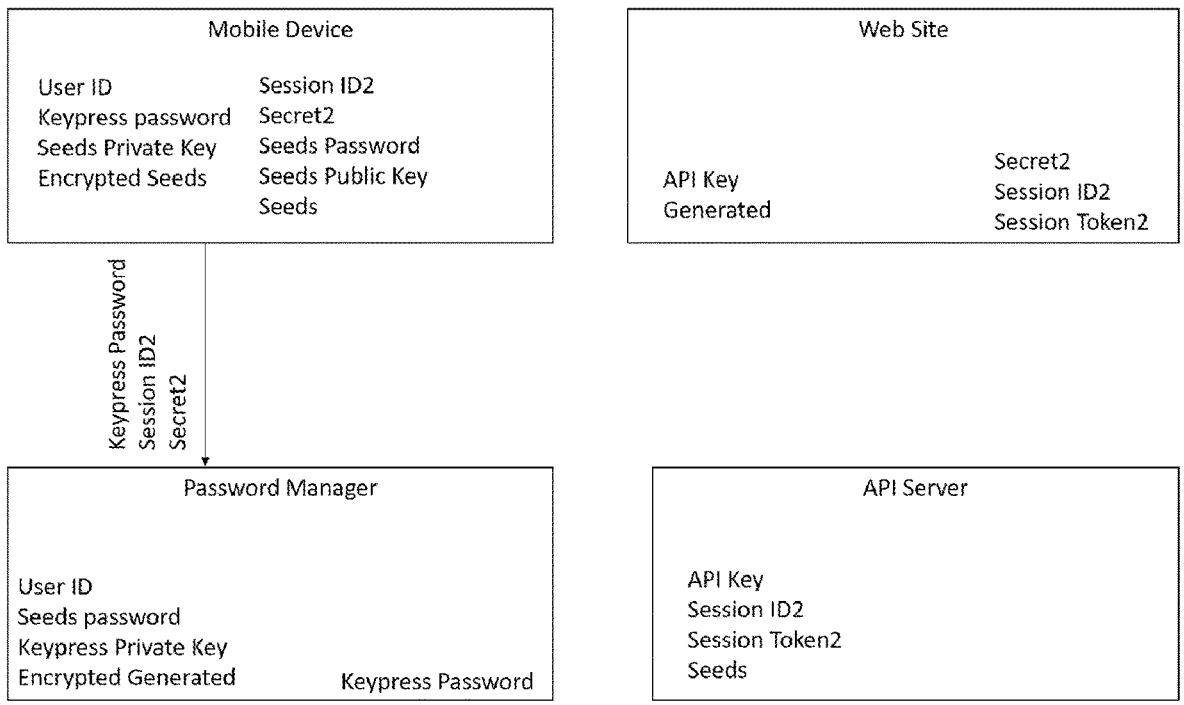

In FIG. 41, Session ID, Secret, and Keypress Password are sent from the Mobile to the Password Manager.

Figure 42:
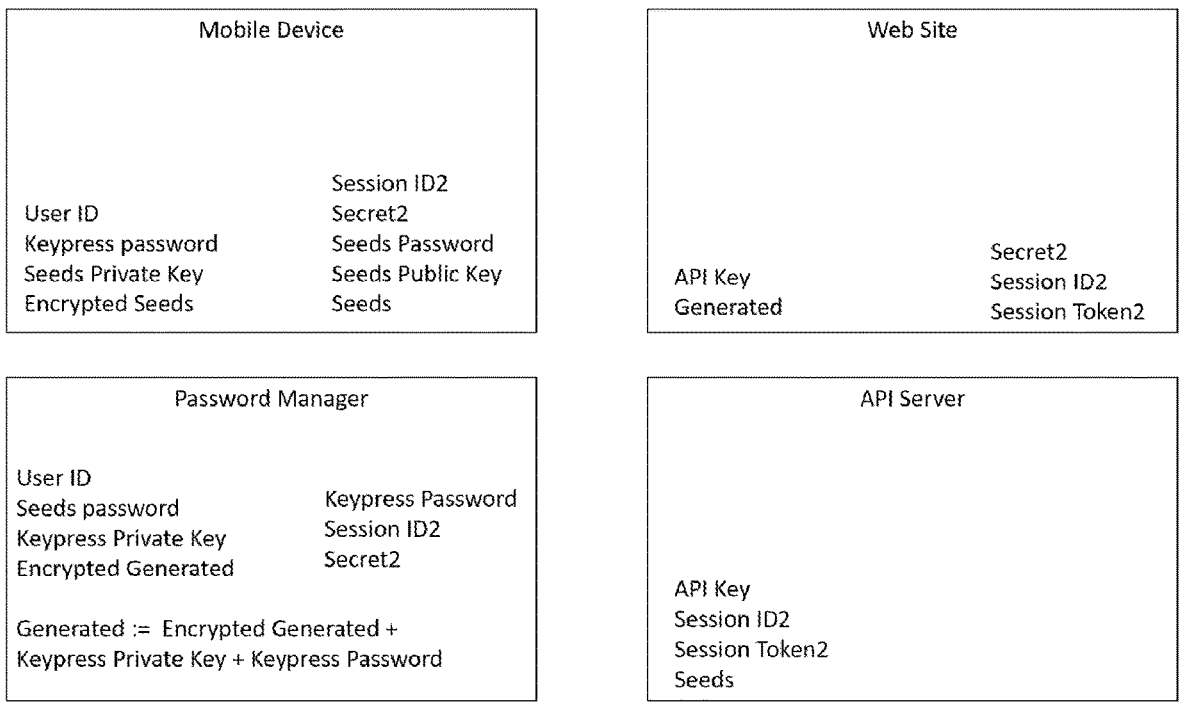

In FIG. 42, Generated is decrypted form generated and keypress private key and keypress password.

Figure 43:
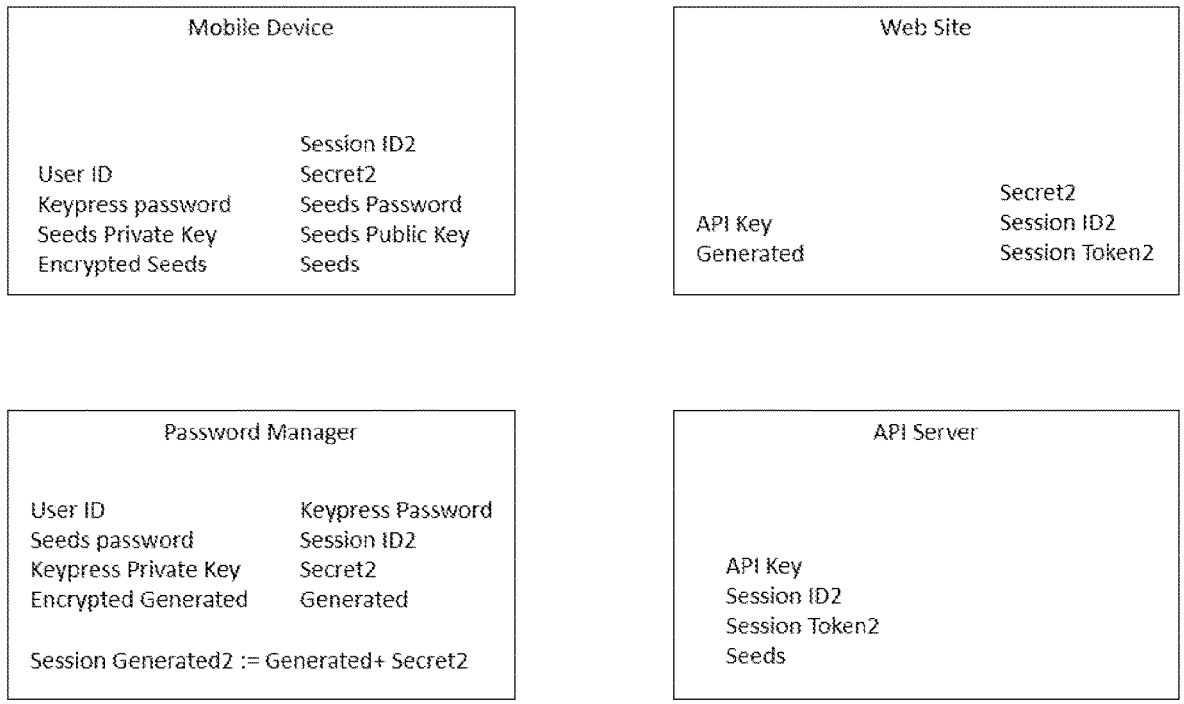

In FIG. 43, the Password Manager creates Session Generated by hashing each entry in the Generated array with Secret.

Figure 44:
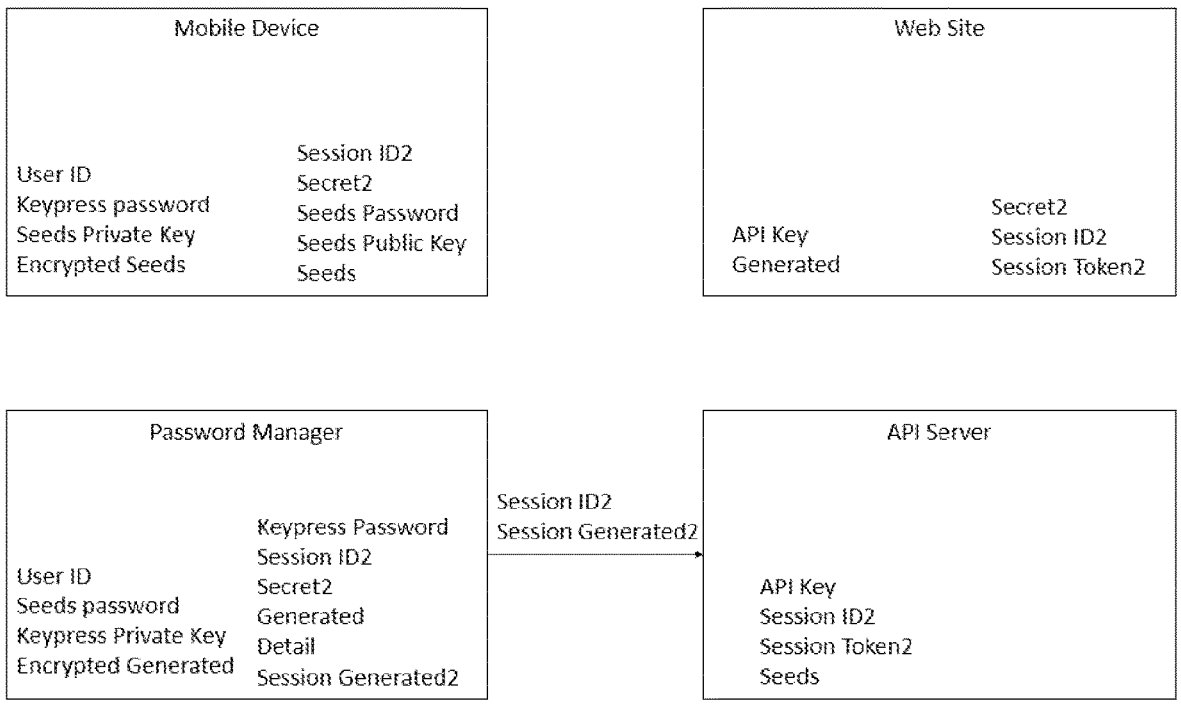

In FIG. 44, Session Keypresses+Session Generated and seeds private key are sent from the Password Manager to the API Server to be associated with the session identified by Session ID.

Figure 45:
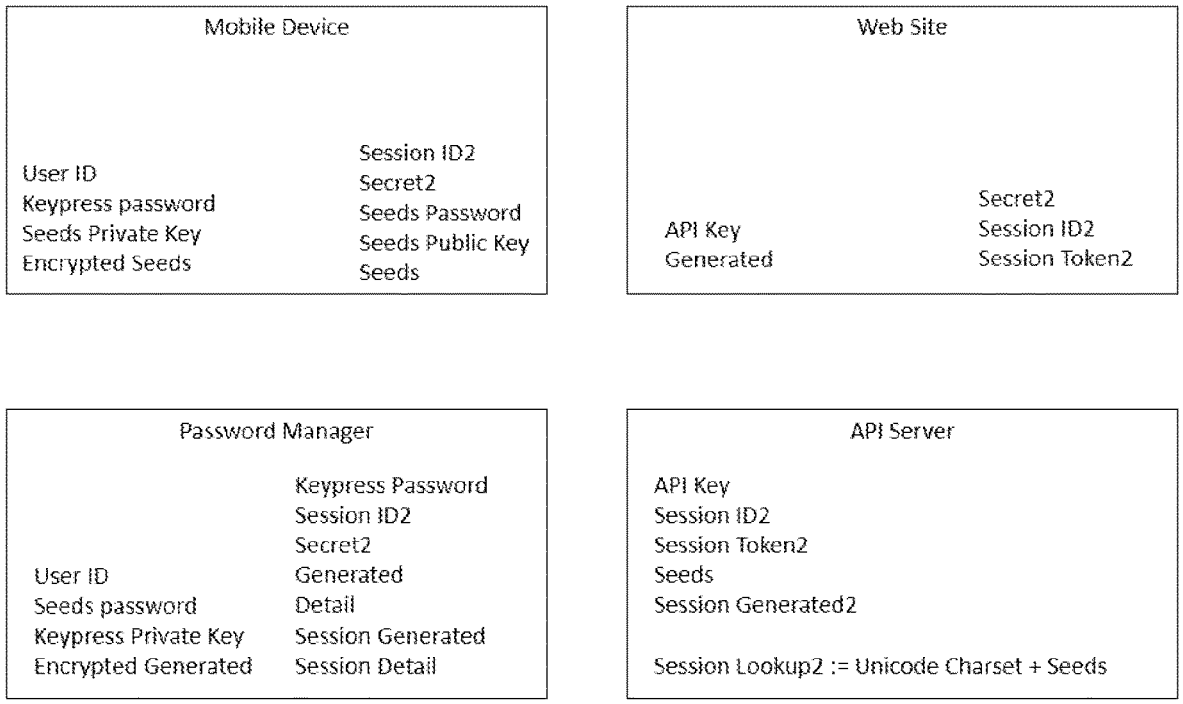

In FIG. 45, a Session Lookup table is generated on the API Server by hashing each entry in the set of Unicode characters with each value in the Seeds array.

Figure 46:
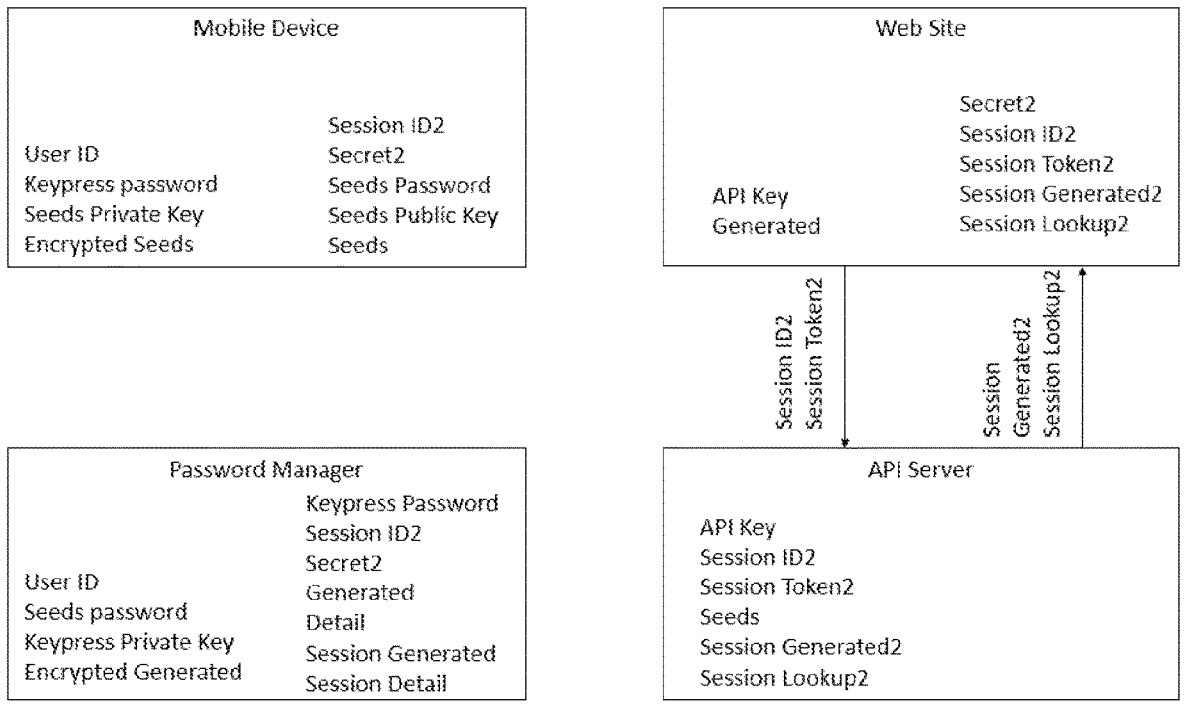

In FIG. 46, the Web Site requests the Session Generated, and Session Lookup table from the API Server for the session identified by Session ID and authenticated with Session Token.

In FIG. 47, the Website generates a Keypress Lookup table by hashing each entry in the Session Lookup table with Secret.

In FIG. 48, the Website decodes the plain text Generated by looking up each entry in the Session Generated array in the Keypress Lookup table.

Figure 49:
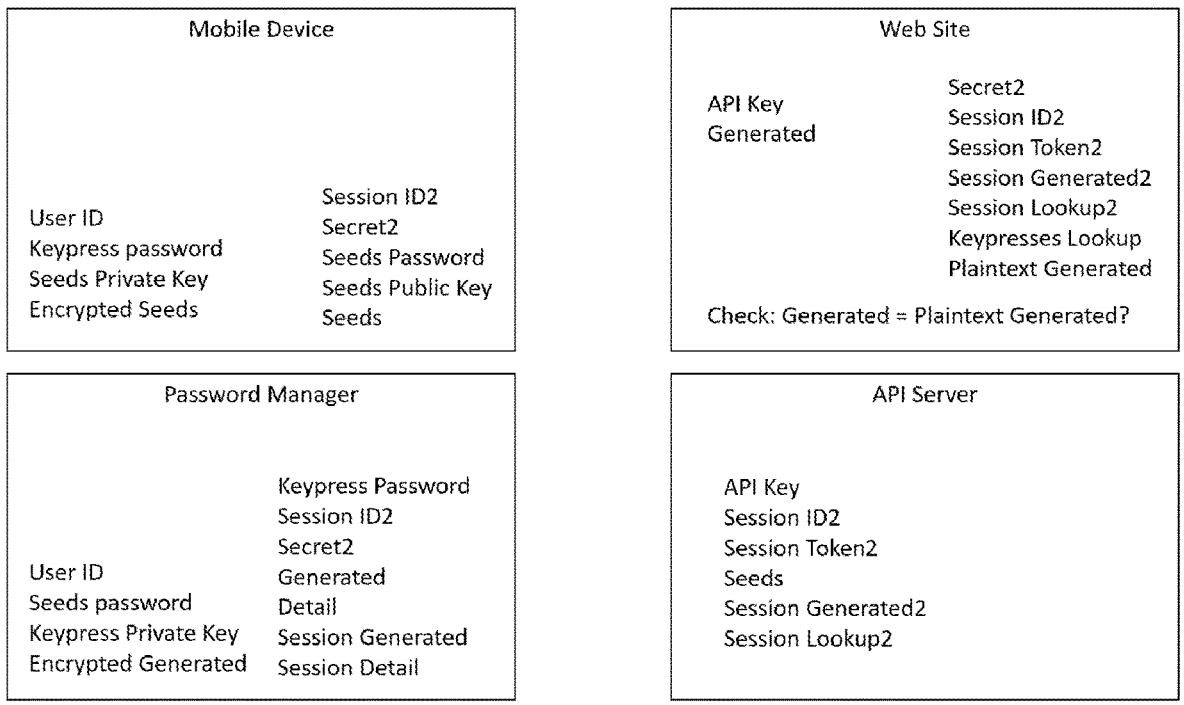

In FIG. 49, the Website checks the user account with the saved Generated against the plantext generated.

Figure 50:
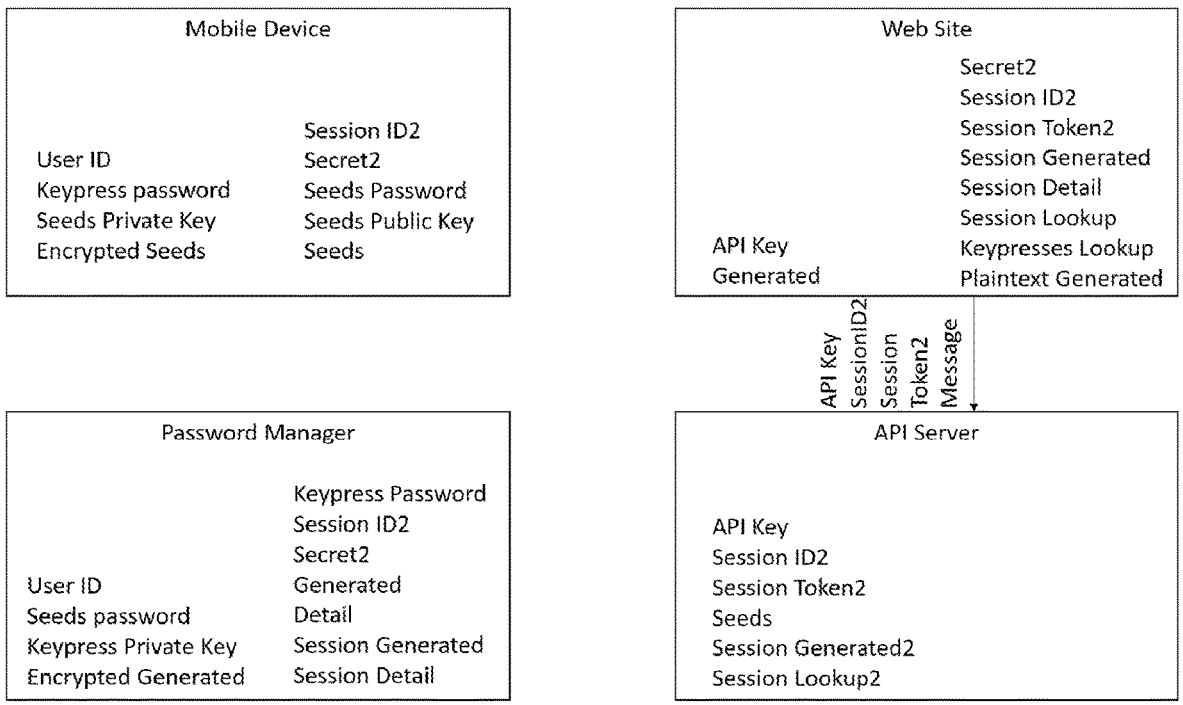

In FIG. 50, the Website sends a message to the Mobile Device connected to the session identified by Session ID via the API server. The Website send the API Key and Session Token as proof that is the owner of this session.

Figure 51:
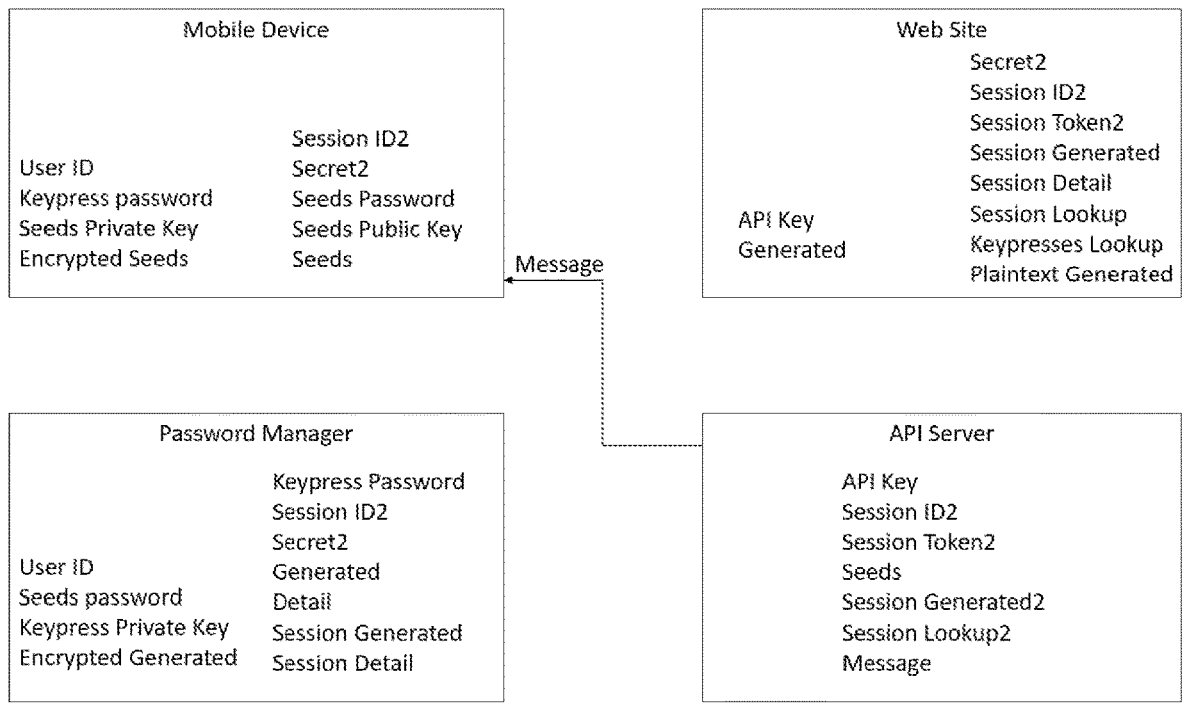

In FIG. 51, the API server sends the contents of Message to the Mobile Device connected to the session identified by Session ID.

Figure 52:
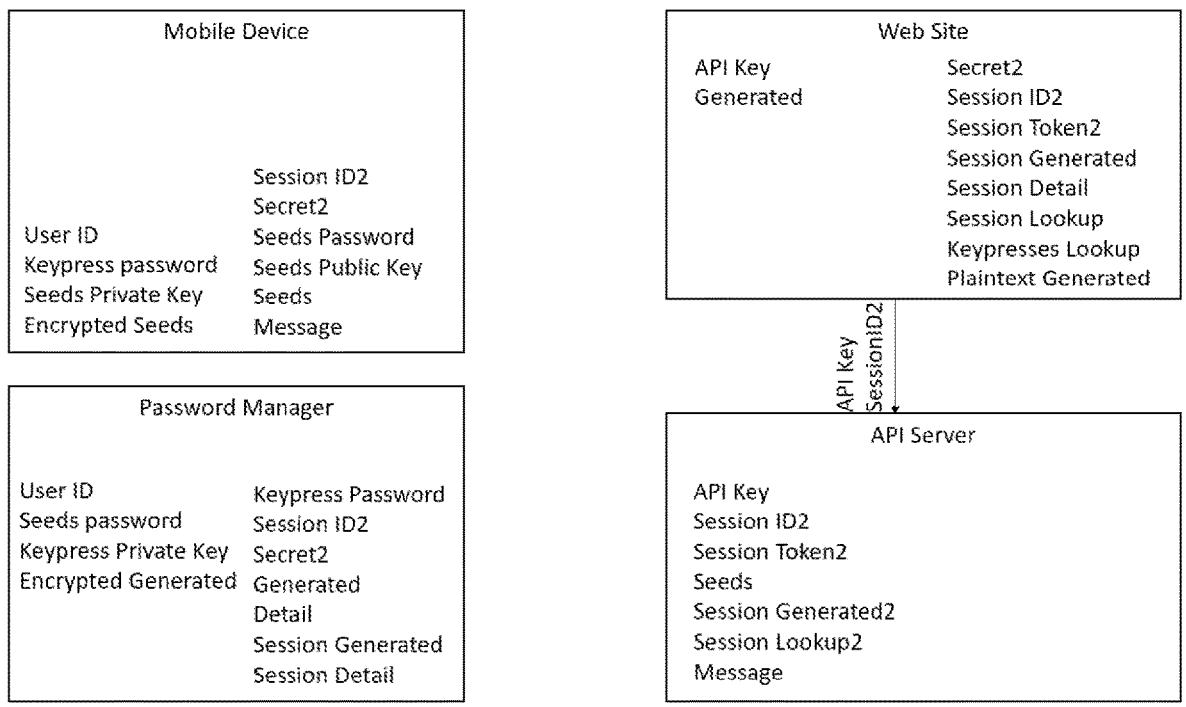

In FIG. 52, the Website sends a DELETE message to the API server to delete the session. Optionally the session Id is sent from the API server to the Password Manager so that is knows it can deleted temporary variables.

Figure 53:
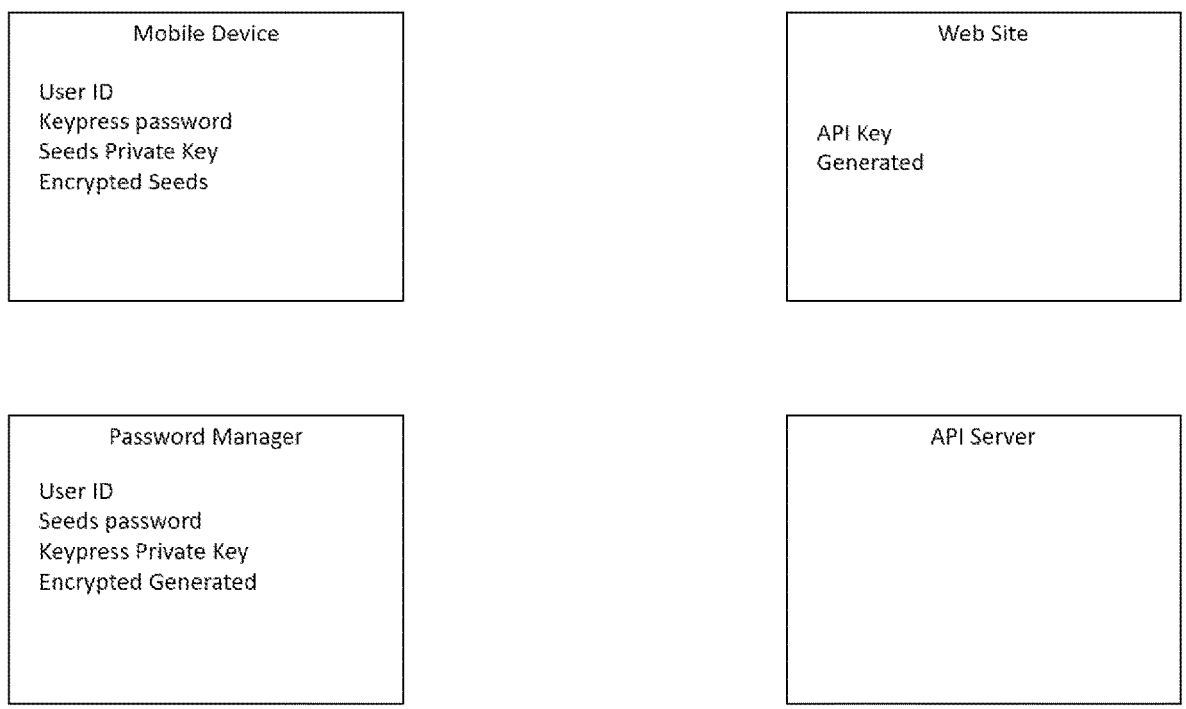

In FIG. 53, the process has finished. All session specific data is garbage collected, and the system reverts to its initial state as per FIG. 35.

Input interfaces associated with keyboards, mice, trackballs, touchpad's, scanners, video cards, audio cards, network cards and the like are known. Output interfaces associated with monitors, printers, speakers, facsimiles, projectors and the like are known. Network interfaces in the form of wired or wireless interfaces for various forms of LANs, WANs and so forth are known. Storage facilities in the form of floppy disks, hard disks, disk cartridges, CD-ROMS, smart card, RAID systems are known. Volatile and non-volatile memory types including RAM, ROM, EEPROM and other data storage types are known. Various transmission facilities such as circuit board material, coaxial cable, fibre optics, wireless facilities and so forth are known.

It is to be appreciated that systems, components, facilities, interfaces and so forth can be provided in several forms. Systems, components, facilities, interfaces and so forth may be provided as hardware, software or a combination thereof. The present invention may be embodied as an electronics device, computer readable memory, a personal computer and distributed computing environments.

In addition the present invention may be embodied as: a number of computer executable operations; a number of computer executable components; a set of process operations; a set of systems, facilities or components; a computer readable medium having stored thereon computer executable instructions for performing computer implemented methods and/or providing computer implemented systems; and so forth. In the case of computer executable instructions, they preferably encode the systems, components and facilities described herein. For example, a computer-readable medium may be encoded with one or more facilities configured to run an application configured to carry out a number of operations forming at least part of the present arrangements. Computer readable mediums preferably participate in the provision of computer executable instructions to one or more processors of one or more computing devices.

Computer executable instructions are preferably executed by one or more computing devices to cause the one or more computing devices to operate as desired. Preferred data structures are preferably stored on a computer readable medium. The computer executable instructions may form part of an operating system of a computer device for performing at least part of the preferred arrangements. One or more computing devices may preferably implement the preferred arrangements.

The term computer is to be understood as including all forms of computing device including servers, personal computers, smart phones, digital assistants, electronics devices and distributed computing systems.

Computer readable mediums and so forth of the type envisaged are preferably intransient. Such computer readable mediums may be operatively associated with computer based transmission facilities for the transfer of computer data. Computer readable mediums may provide data signals.

Computer readable mediums preferably include magnetic disks, optical disks and other electric/magnetic and physical storage mediums as may have or find application in the industry.

Components, systems and tasks may comprise a process involving the provision of executable instructions to perform a process or the execution of executable instructions within say a processor. Applications or other executable instructions may perform method operations in different orders to achieve similar results. It is to be appreciated that the blocks of systems and methods described may be embodied in any suitable arrangement and in any suited order of operation. Computing facilities, modules, interfaces and the like may be provided in distinct, separate, joined, nested or other forms and arrangements. Methods will be apparent from systems described herein and systems will be apparent from methods described herein.

As would be apparent, the method blocks herein described could be viewed in grouped blocks or subdivided blocks. Various flowcharts could be based on the blocks described.

Various embodiments are considered to be advantageous. A number of advantages are discussed in the second entitled Summary of the Invention. Other advantages would be apparent for a reading of the specification as a whole.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including', 'or' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

The invention claimed is:

1. A method of providing identification to one of many online services, comprising:
    providing an interface system and an identifier manager;
    the interface system being configured to provide a secret identifier to a requesting one of the online services in a session, the secret identifier being received from the identifier manager, the secret identifier being stored in the identifier manager;
    the session in which the secret identifier is provided to the online service is identified by a session identifier, the session identifier is provided from the online service to a device which the online service is to be provided, then the session identifier is provided by the device to the identifier manager, then the session identifier is provided by the identifier manager to the interface system and then the session identifier is provided by the interface system to the online service so that interactions provided to the device and which are intended to be provided to the online service are allocated to the session in which the secret identifier is provided to the online service.

2. A method according to claim 1, wherein the interface system does not retain the secret identifier between sessions.

3. A method according to claim 1, wherein the secret identifier is encoded when received from the identifier manager and when sent to the requesting one of the online services.

4. A method according to claim 1, wherein the identifier manager does not interact with the online service.

5. A method according to claim 1, wherein a key for decryption of the stored secret identifier is known to the device to which the online service is to be provided and is not stored by the identifier manager.

6. A method according to claim 1, wherein an encryption key for encryption of the stored secret identifier is known by the identifier manager but is not provided to the online service nor the interface system.

7. A method according to claim 1, wherein the secret identifier is first entered using the device via a virtual machine for enabling the user of the device to enter the identifier.

8. A method according to claim 7, wherein the virtual machine provides the secret identifier to the identifier manager.

9. A method according to claim 1, wherein the secret identifier is generated by the mobile device.

10. A method according to claim 9, wherein the secret identifier is generated by the device based on a random string of characters.

11. A method according to claim 1, wherein the secret identifier is encoded using randomly generated character seeds.

12. A method according to claim 11, wherein the secret identifier is encoded by hashing each character of the random string of characters with a respective one of each of the randomly generated character seeds.

13. A method according to claim 12, wherein the randomly generated character seeds are provided to the interface system, preferably in a point to point secure communication.

14. A method according to claim 1, wherein the secret identifier is encoded using a secret provided to the device from the respective online service.

15. A method according to claim 12, wherein the interface system creates a first lookup table from the randomly generated character seeds.

16. A method according to claim 15, wherein the online service creates a second lookup table from the first lookup table and the secret for decoding the secret identifier.

17. A method of providing a secret identifier to one of many online services:
recognizing a device by an identifier manager;
receiving the secret identifier at the identifier manager for a particular one of the online services from the device;
receiving from the particular online service a session identifier on the device;
sending the session identifier to the identifier manager;
retrieving and decrypting/decoding the secret identifier stored by the identifier manager;
sending the decrypted secret identifier to an interface service in an encoded form for the interface service to provide the secret identifier to the particular one of the online services;
sending the secret identifier from the interface service to the particular online service.

18. A method according to claim 17, wherein the encoding into the encoded form uses a key known to the online service.

19. A method of providing a secret identifier to one of many online services comprising:
in a first session:
recognizing a device by an identifier manager;
receiving at the identifier manager the secret identifier for a particular one of the online services from the device;
storing the secret identifier in an encrypted form;
in a subsequent session:
receiving from the device a request to provide the particular online service with the secret identifier;
recognizing the device by the identifier manager;
receiving a session identifier of the subsequent session by the identifier manager;
retrieving and decrypting/decoding the secret identifier stored by the identifier manager;
sending the decrypted secret identifier to an interface service in an encoded form for the interface service to send to the secret identifier from the interface service to the particular online service.

20. A method according to claim 19, wherein the identifier manager is unaware of a destination that the interface service sends the decrypted secret identifier and/or the identifier manager is unable to send the secret identifier to a destination other than the interface service.

21. A method according to claim 17, wherein the session identifier is sent from the interface service to the particular online service with the secret identifier.

22. A method according to claim 17, wherein the interface service is independent of the device and other devices which are to be provided the online services.

23. A method according to claim 19, wherein the session identifier is sent to the interface service with the encoded secret identifier.

24. A method according to claim 7, wherein the virtual machine runs remotely, wherein input entered on the device is sent to the virtual machine and which is interpreted as input of the secret identifier by the virtual machine, and the interpreted input of the secret identifier is output by the virtual machine as the entered secret identifier.

* * * * *